US009391676B2

(12) United States Patent  (10) Patent No.: US 9,391,676 B2
Sullivan  (45) Date of Patent: *Jul. 12, 2016

(54) NETWORK AUDIO DISTRIBUTION SYSTEM AND METHOD

(71) Applicant: Terence Sean Sullivan, Somerville, MA (US)

(72) Inventor: Terence Sean Sullivan, Somerville, MA (US)

(73) Assignee: RangeCast Technologies, LLC, Ely, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/517,390

(22) Filed: Oct. 17, 2014

(65) Prior Publication Data

US 2015/0071458 A1    Mar. 12, 2015

Related U.S. Application Data

(63) Continuation of application No. 13/789,960, filed on Mar. 8, 2013, now Pat. No. 8,898,329.

(51) Int. Cl.
| | |
|---|---|
| *G06F 15/16* | (2006.01) |
| *H04B 7/00* | (2006.01) |
| *H04N 7/24* | (2011.01) |
| *H04N 21/266* | (2011.01) |
| *H04N 21/2665* | (2011.01) |
| *H04N 21/2668* | (2011.01) |
| *H04N 21/482* | (2011.01) |
| *H04N 21/81* | (2011.01) |
| *H04L 29/06* | (2006.01) |
| *H04L 29/08* | (2006.01) |

(52) U.S. Cl.
CPC .............. *H04B 7/00* (2013.01); *H04L 65/4084* (2013.01); *H04L 65/607* (2013.01); *H04N 7/24* (2013.01); *H04N 21/2665* (2013.01); *H04N 21/2668* (2013.01); *H04N 21/26616* (2013.01); *H04N 21/4825* (2013.01); *H04N 21/8113* (2013.01); *H04L 67/306* (2013.01)

(58) Field of Classification Search
CPC ................... H04N 21/26616; H04N 21/2665; H04N 21/2668; H04N 21/4825; H04N 21/8113; H04N 7/24; H04L 65/4084; H04L 65/607; H04L 67/306
See application file for complete search history.

(56) References Cited

U.S. PATENT DOCUMENTS

| | | | |
|---|---|---|---|
| 6,711,622 B1 * | 3/2004 | Fuller ............... | H04L 29/06027 709/231 |
| 2001/0051958 A1 * | 12/2001 | deVries ............. | G06F 17/30817 715/233 |
| 2006/0126494 A1 * | 6/2006 | Dougall ................ | H04L 1/1851 370/213 |

* cited by examiner

*Primary Examiner* — Benjamin M Thieu
(74) *Attorney, Agent, or Firm* — Dan Brown Law Office; Daniel R. Brown

(57) ABSTRACT

Audio content distribution from audio sources to client terminals through a network. An audio source interface receives raw audio from an audio source, and converts it into a digital audio clip in a digital audio packet, containing a timestamp and a channel identity corresponding to the audio source. A network audio server formats the digital audio packet into a network compliant digital audio file, which is stored at a network address. The network audio server generates a directory packet including the address of the digital audio file, the channel identity, and the timestamp, and, couples the directory packet to a directory server located on the network. The directory server outputs directory packets to a client terminal on the network, which selects a directory packet and sends an audio file request through the network for the digital audio file. The audio file is then sent to the client terminal.

11 Claims, 8 Drawing Sheets

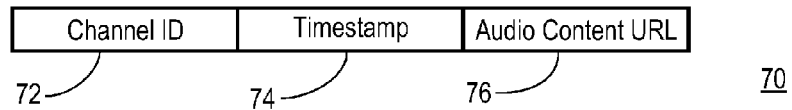
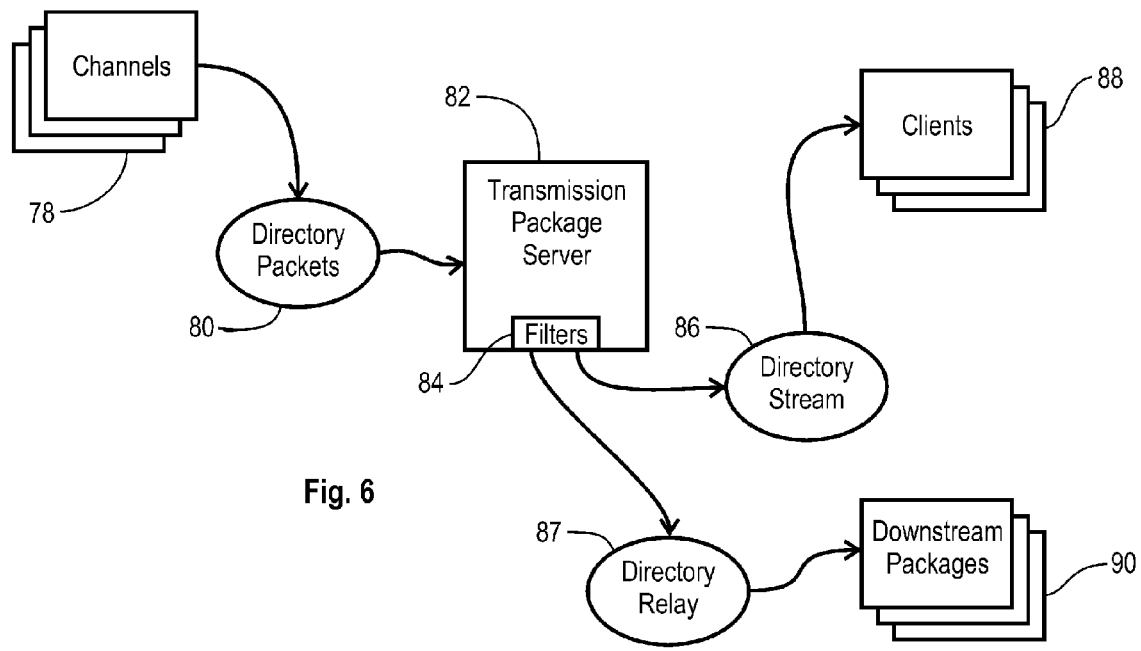
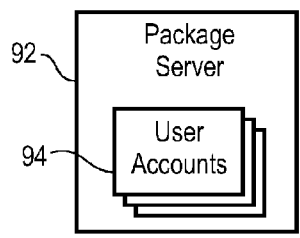

US 9,391,676 B2

NETWORK AUDIO DISTRIBUTION SYSTEM AND METHOD

RELATED APPLICATIONS

This is a continuation of U.S. application Ser. No. 13/789,960 filed on Mar. 8, 2013, which was a continuation of U.S. application Ser. No. 12/432,009 filed on Apr. 29, 2009, which is now U.S. Pat. No. 8,429,287, issued on Apr. 23, 2013.

BACKGROUND OF THE INVENTION

1. Field of the Invention

The present invention relates to distribution of audio content through a network.

2. Description of the Related Art

A first co-pending U.S. patent application Ser. No. 11/418,960 to Barnett et al. filed on May 5, 2006 (hereinafter "Barnett-1"), now U.S. Pat. No. 7,836,183 issued on Nov. 16, 2010, for an Internet Audio Scanner and Method, the contents of which are hereby incorporated by reference, was submitted by the inventors hereof. Barnett-1 discloses an apparatus and method for processing signals produced by signal sources, including a first signal source that is a first server of streaming audio signals, which includes intermittent audio content, and which is located at an address on a network. The apparatus includes a network interface and a processor that selects the first signal source by outputting the address of the first server to the network interface, thereby establishing a network connection. The apparatus also includes a threshold detector coupled to receive streaming audio signals through the network interface, and that has a detector output with an active state that indicates that the intermittent audio content presently meets a threshold value. The processor further couples the streaming audio content to an output circuit if the detector output is active. Where there are plural intermittent signal sources, the apparatus of Barnett-1 can sequentially monitor the plural sources and process the audio content based upon the threshold detector output.

A second co-pending U.S. patent application Ser. No. 11/600,476 to Sullivan et al. filed on Nov. 16, 2006 (hereinafter "Sullivan-1"), now U.S. Pat. No. 8,856,267 issued on Oct. 7, 2014, for a Network Audio Directory Server and Method, the contents of which are hereby incorporated by reference, was submitted by the inventors hereof. Sullivan-1 discloses a system and method of communicating audio through a network. Sullivan-1 addresses certain structure and techniques employed in the network environment. The method includes detecting audio content from an audio source by a first network terminal, sending a directory packet including a network address of the detected audio content to a second network terminal, and requesting the audio content through the network by the second audio terminal. The further step of storing the detected audio content in a buffer for audio packets identified by packet identities is added in some embodiments. The sending of a directory packet step may include sending a packet identity, and the requesting step may include specifying an audio packet according to the packet identity. A further step of sending a source packet including the network address of the detected audio content to a network directory server by the first network terminal may be added. Thusly, the directory server manages the requests and communication of audio content between feed source terminals and receiver terminals.

A third co-pending U.S. patent application Ser. No. 11/809,964 to Sullivan et al. filed on Jun. 4, 2007 (hereinafter "Sullivan-2"), now U.S. Pat. No. 8,125,988 issued on Feb. 28, 2012, for a Network Audio Terminal and Method, the contents of which are hereby incorporated by reference, was submitted by the inventors hereof. Sullivan-2 discloses network audio feed source terminals, receive terminals and methods. Sullivan-2 teaches a receive terminal that includes a network interface that receives network packets and a network packet scanner coupled to the network interface that sequentially scans received network packets in accordance with scan criteria. A content selector is coupled to the network packet scanner, and selects network packets containing units of audio content from the scanned network packets based on selection criteria. An audio content processor is coupled to the content selector, and processes the audio content in the selected network packets. The network packets may include directory packets containing audio content addresses, in which case, the content selector further selects directory packets based on selection criteria. An audio packet requestor is coupled to the content selector and the network interface, and operates to request audio packets through the network identified by the audio content addresses that correspond to the selected directory packets. Sullivan-2 also teaches a network audio feed source terminal, which is used for coupling units of audio content from an audio source to a network. The feed terminal includes a source interface that receives audio content from the audio source and a content monitor that identifies audio content in accordance with monitoring criteria. The feed terminal also includes a means for capturing a selected portion of the identified audio content as units of audio content in accordance with capture criteria, and, a network interface that couples the units of audio content into the network.

A fourth co-pending U.S. patent application Ser. No. 11/980,113 to Sullivan et al. filed on Oct. 30, 2007 (hereinafter "Sullivan-3") for System and Method for Delivering Audio and Data from Plural Sources at an Event to Plural Users Through a Network, the contents of which are hereby incorporated by reference, was submitted by the inventors hereof Sullivan-3 addresses an environment where plural audio sources operate within an event forum, which is distributed to plural individuals interested in activities at the event. Sullivan-3 teaches a system and method of communicating event audio content to plural users through a network using an event feed source, an event network server, and plural receive terminals. The method includes coupling event content indicative of activity related to an event, including audio signals received by plural audio interfaces from plural audio sources and event data that is produced by at least a first data source, to the event feed source, and, sequentially communicating the event content from the event feed source through the network to the event network server. Further, requesting access to event content that has been recently received by the event network server by at least a first receive terminal, and, transferring recently received event content from the event network server to the at least a first receive terminal. Then, subsequently requesting additional event content, based upon previously received event content, by the at least a first receive terminal from the event network server, and, transferring the additional event content from the event network server to the at least a first receive terminal.

The teachings of Barnett-1, Sullivan-1, Sullivan-2, and Sullivan-3 encompass certain illustrative embodiments useful in a range of systems and methods for network audio content acquisition, delivery and reproduction. Generally, these teachings amount to building blocks that can be arranged to yield a wide variety of network audio delivery systems. However, the implementation of a network wide system for audio content distribution to a wide variety of end users presents numerous architectural and protocol challenges, particularly with respect to system access security, reliability and integrity, system growth, and traffic management. Thus, it can be appreciated that there is a need in the art for a system and method for implementing and managing a system of plural network coupled audio sources for audio content and plural end user client terminals seeking access to such audio content.

SUMMARY OF THE INVENTION

The need in the art is addressed by the systems and methods of the present invention. A system for distributing audio content from plural audio sources to plural client terminals located on a network is taught. The system includes an audio source interface that is coupled to receive raw audio from a first audio source, and converts the raw audio into a digital audio clip that is incorporated into a digital audio packet, which further contains a timestamp and a channel identity corresponding to the first audio source. A network audio server is coupled to receive the digital audio packet from the audio source interface, and operates to format the digital audio packet into a digital audio file that is compliant with the network, and store the digital audio file at a network address. The network audio server generates a directory packet that includes the network address of the digital audio file, the channel identity, and the timestamp, and couples the directory packet to a directory server located on the network. The directory server receives the directory packet and generates a directory stream, including at least a portion of the directory packet, and couples the directory stream through the network to a first client terminal. The first client terminal receives the directory stream and selectively identifies the directory packet according to a client profile, and subsequently communicates an audio file request through the network, requesting the digital audio file from the network audio server. Then, upon receipt of the audio file request, the audio server responds by coupling the digital audio file to the client terminal through the network.

In a specific embodiment of the foregoing system, the client terminal receives the digital audio file, reproduces the audio content therein and displays data contained in the digital audio file. In another specific embodiment, the audio source interface is further coupled to receive data related to the raw audio from the audio source, and incorporates the data into the digital audio packet. In another specific embodiment, the directory server generates plural directory streams for delivery to plural client terminals disposed throughout the network. In another specific embodiment, the first client terminal accumulates plural directory packets in a database and subsequently selects directory packets from the database, based on predetermined selection rules indexed to the content of the directory packets. In another specific embodiment, the directory server is assigned a directory server name, and the first client terminal is assigned a unique username that includes the directory server name.

In a specific embodiment, the foregoing system further includes an administrative server that is located on the network, for storing unique device names and network addresses for the network audio server, the directory server, and the first client terminal. In another specific embodiment, the network audio server incorporates a value indicating time ordering of creation of the digital audio clip into the directory packet. In another specific embodiment, the directory packet includes plural additional data fields identifying; a data type, a unique channel code, a duration of the audio clip, a name of the digital audio clip, and at least a first text tag. In another specific embodiment, the directory server inserts the directory packet into the directory stream upon receipt thereof. In another specific embodiment, the directory server inserts the directory packet into the directory stream at a time specified by an independent software process.

In a specific embodiment, the foregoing system further includes a secondary directory server that generates a secondary directory stream, and couples the directory stream to the secondary directory server. In another specific embodiment, the channel identity contained in the directory packet includes one or more data fields descriptive of the first audio source, which may be selected from these data fields; an alpha-numeric field that uniquely defines the first audio source, an identity of a radio frequency receiver; a geographic descriptor, a political jurisdiction, a government service function code, a code identifying an owner of the raw audio content, a code identifying a particular communication channel, and a unique identity of the audio source interface.

In another specific embodiment of the foregoing system, the client terminal is configured in accordance with a client profile that defines the directory server as the client terminal's source for system information and the directory stream, includes directory packet selection criteria, and defines the content and appearance of information displayed on a display in the client terminal. In a refinement to this embodiment, the client profile is stored in the directory server, and is addressed for access by the first client terminal according to a directory server name, a client terminal name, and a client profile name. In another refinement to this embodiment, the directory packet selection criteria includes plural user-defined banks of audio sources and channel identity matching filters used to select audio files to download.

In a specific embodiment of the foregoing system, the first client terminal sequentially identifies plural directory packets from the directory stream, and sends plural audio file requests to corresponding network audio servers, and, the first client terminal reproduces plural digital audio files received in response to the plural audio file requests in time ordered sequence according to timestamps stored in the plural digital audio files. In another specific embodiment, the audio source interface periodically queries the first audio source for audio content. In another specific embodiment, the audio source interface is responsive to a squelch status of the first audio source to determine when the raw audio is available.

In a specific embodiment of the foregoing system, the digital audio packet is assigned a file name by the audio source, and, the file name includes plural descriptive fields selected from among the following descriptive fields; a channel code identity, a descriptive text tag, a time of capture, a duration of the digital audio clip, an identity of the audio source interface, and an identity of the directory server. In another specific embodiment, wherein the network is the Internet, the network address of the digital audio file is an Internet URL, and, the directory server will not send a URL to any client terminal that is not authorized by the directory server. In a refinement to this embodiment, the network audio server requires an access code from the first client terminal prior to sending the digital audio file. I another refinement, the network address of the digital audio file includes a time of capture, thereby obscuring the predictability of the network address.

The present invention also teaches a method of distributing audio content from a first audio source to a first client terminal located on a network, utilizing an audio source interface, a network audio server, and a directory server. The method includes the steps of coupling raw audio from the first audio source to the audio source interface, and converting the raw audio into a digital audio clip, and then assembling a digital audio packet by the audio source interface that contains the digital audio clip, a timestamp and a channel identity corresponding to the first audio source. The steps continue by coupling the digital audio packet from the audio source interface to the network audio server, and formatting the digital audio packet into a digital audio file that is network compliant by the network audio server, and then storing the digital audio file at a network address. Then, generating a corresponding directory packet including the network address of the digital audio file, the channel identity, and the timestamp, and then coupling the directory packet to the directory server. The method continues by generating a directory stream by the directory server that includes at least a portion of the directory packet, and coupling the directory stream to the client terminal located on the network. Then, receiving the directory stream by the first client terminal and selectively identifying the directory packet according to a user profile, and subsequently communicating an audio file request through the network from the first client terminal to the network audio server requesting the digital audio file. Finally, coupling the digital audio file from the audio server to the first client terminal in response to receipt of the audio file request.

In a specific embodiment, the foregoing method includes the further steps of receiving the digital audio file be the first client terminal, reproducing the audio content in the digital audio file by the first client terminal, and also displaying the data contained in the digital audio file. In another embodiment, the method includes receiving data related to the raw audio by the audio source interface from the audio source, and incorporating the data into the digital audio packet. In another embodiment, the method includes generating plural directory streams by the directory server, and delivering the plural directory streams to plural client terminals disposed throughout the network.

In a specific embodiment, the foregoing method includes the further steps of accumulating plural directory packets in a database in the first client terminal, and subsequently selecting directory packets from the database based on predetermined selection rules indexed to the content of the directory packets. In another embodiment, wherein the directory server is assigned a directory server name, the method includes assigning the first client terminal a unique username that includes the directory server name. In another embodiment, wherein an administrative server is located on the network, the method further includes storing unique device names and network addresses for the network audio server, the directory server, and the first client terminal in the administrative server, and accessing the administrative server to determine the network address according to the unique device names.

In a specific embodiment, the foregoing method includes the further steps of incorporating a value indicating time ordering of creation of the digital audio clip into the directory packet by the network audio server. In another embodiment, the method adds the steps of including plural additional data fields into the directory packet, identifying a data type, a unique channel code, a duration of the audio clip, a name of the digital audio clip, and at least a first text tag. In another embodiment, the method includes the step of inserting the directory packet into the directory stream upon receipt thereof by the directory server. In another embodiment, the method includes inserting the directory packet into the directory stream at a time specified by an independent software process.

In a specific embodiment, the foregoing method, wherein a secondary directory server is disposed upon the network, the methods includes the further steps of coupling the directory stream from the directory server to the secondary directory server, and generating a secondary directory stream to at least a second client terminal by the secondary directory server. In another embodiment, the added step includes one or more of the following data fields descriptive of the first audio source in the directory packet; an alpha-numeric field that uniquely defines the first audio source, an identity of a radio frequency receiver, geographic descriptor;

a political jurisdiction, a government service function code, a code identifying an owner of the raw audio content, a code identifying a particular communication channel, and a unique identity of the audio source interface.

In a specific embodiment, the foregoing method includes the further steps of assigning a client profile to the first client terminal, thereby defining the directory server as the first client terminal's source for the directory stream, the source for system information, and configuring the first client terminal in accordance with the client profile, thereby establishing directory packet selection criteria and defining the content and appearance of information displayed on a display in the first client terminal. In another specific embodiment, the method includes the further steps of storing the client profile in the directory server at an address according to a directory server name, a client terminal name, and a client profile name, and accessing the client profile by the first client terminal.

In a specific embodiment, the foregoing method includes the further steps of including plural user-defined banks of audio sources and channel identity matching filters in the directory packet selection criteria, and requesting audio content for download according to the directory packet selection criteria. In another specific embodiment, the method includes sequentially identifying plural directory packets from the directory stream by the first client terminal, sending plural audio file requests to corresponding network audio servers, and reproducing plural digital audio files received by the first client terminal in response to the plural audio file requests in time ordered sequence according to timestamps stored in the plural digital audio files.

In a specific embodiment, the foregoing method includes the further step of periodically querying the first audio source by the audio source interface for audio content. In another specific embodiment, the method includes determining the presence of raw audio in the first audio source by testing the squelch status thereof by the audio source interface. In another embodiment, wherein the network is the Internet and the network address of the digital audio file is a URL, the method includes declining to send audio content by the directory server to any client terminal that is not authorized by the directory server. In another embodiment, the method includes requiring an access code from the first client terminal prior to sending the digital audio file from the network audio server. In another specific embodiment, the method includes the further steps of including a time of capture in the network address of the digital audio file, thereby obscuring the predictability of the network address.

The present invention also teaches a system for distributing audio content gathered from plural audio sources to plural client terminals, using plural packages of software processes running on plural processors distributed about a web connected network. The system includes; (a) at least a first client terminal addressable on the network to receive directory streams of directory packets, and to store a portion of the directory packets in a directory index, and that can selectively recall at least a first of the directory packets from the directory index based on selection criteria, and then request audio content stored on the network based on a network address within the directory packets. The system further includes; (b) plural audio source interfaces that receive raw audio from corresponding plural audio sources, and that executes a gateway process that incorporates the raw audio into digital audio packets as digital audio clips, each with a corresponding timestamp and a channel identity of the corresponding one of the plural audio sources. The system also includes; (c) a feed source administrative package, that further includes a file monitor process that receives plural digital audio packets from at least one of the plural audio source interfaces, and that formats the plural digital audio packets into plural digital audio files stored at network addressable locations, and further generates plural directory packets corresponding to the plural digital audio packets, each including a corresponding timestamp, a corresponding channel identity, and a corresponding network addresses, which are subsequently forwarded to at least a first predetermined transmission package. The feed source administrative package also includes a web server process that receives audio file requests through the network from the plural client terminals, wherein each audio file request includes a network addresses of a corresponding digital audio file, and in response thereto, communicates the corresponding digital audio file to the requesting client terminals. The system further includes; (d) a transmission package, which includes a directory server process that receives directory packets from the feed source administrative package, stores the directory packets in a directory packet database, and generates at least a first directory stream, including at least a portion of the directory packets, and couples the directory stream through the network to the at least a first client terminal. The transmission package also includes a first registrar process that maintains a database of client terminal account information for determining content and controlling delivery of directory streams of directory packets and for controlling access to the directory packet database by the plural client terminals. The system further includes; (e) an account management package, which includes a second registrar process that maintains a database of the network address and system functions of the plural packages of processes, and a database of the plural client terminal network addresses and selection criteria, and also contains a root process with a database of absolute network addresses of member packages and processes, thereby enabling client terminal check-in requests.

In a specific embodiment of the foregoing system, the first registrar process authenticates client terminal system login requests, and provides a client terminal profile containing the selection criteria in response thereto. In another specific embodiment, the second registrar process further includes intra-package network connectivity addressing data, and the second registrar process assigns connection requests to appropriate member processes. In another specific embodiment, the administrative package distributes directory stream provision tasks amongst plural transmission packages, thereby managing network traffic and transmission package load. In another specific embodiment, the administrative package distributes audio content distribution tasks amongst plural feed source administrative package, thereby managing network traffic and feed source administrative package load.

In a specific embodiment, the foregoing system further includes a secondary directory server process that receives a directory stream of packets from the directory server, stores the directory packets in a secondary directory packet database, and generates secondary directory streams to at least a second client terminal. In another specific embodiment, the system further includes an historian process that searches the directory packet database in response to requests from client terminals and other processes, and provides search results thereto. In another specific embodiment, the directory packets include a value indicating ordering of transmissions, and the first client terminal reproduces the audio content in accordance with the value indicating ordering of transmissions.

In a specific embodiment of the foregoing system, the channel identification data in the directory packets includes data fields selected from; an alphanumeric field that uniquely defines the first audio source, an identity of a radio frequency receiver; a geographic descriptor, a political jurisdiction; a government service function code, a code identifying an owner of the raw audio content, a code identifying a particular communication channel, and a unique identity of the audio source interface. In another specific embodiment, the directory server process generates the directory stream by selectively filtering the plural directory packets in the directory packet database according to a portion of the data contained in the channel identification codes. In another specific embodiment, the portion of the data contained in the channel identification codes is defined by the selection criteria. In a refinement to this embodiment, the selective filtering includes data wildcards.

In a specific embodiment of the foregoing system, the first client terminal selection criteria are defined by a client terminal profile. In a refinement to this embodiment, the client terminal profile determines the content and appearance of a user interface display. In another refinement, the client terminal profile is stored by the first registrar package, and is named according to a name of the transmission package, a name of the client terminal, and a package name. And, in another refinement, the client terminal profile defines a corresponding transmission package for the client terminal, defines the selection criteria for the client terminal, and controls the appearance of a user interface display on the client terminal.

BRIEF DESCRIPTION OF THE DRAWINGS

FIG. 5 is a directory packet data diagram according to an illustrative embodiment of the present invention.

FIG. 6 is a transmission package functional block diagram according to an illustrative embodiment of the present invention.

FIG. 7 is an account management package functional block diagram according to an illustrative embodiment of the present invention.

DESCRIPTION OF THE INVENTION

Figure 1:
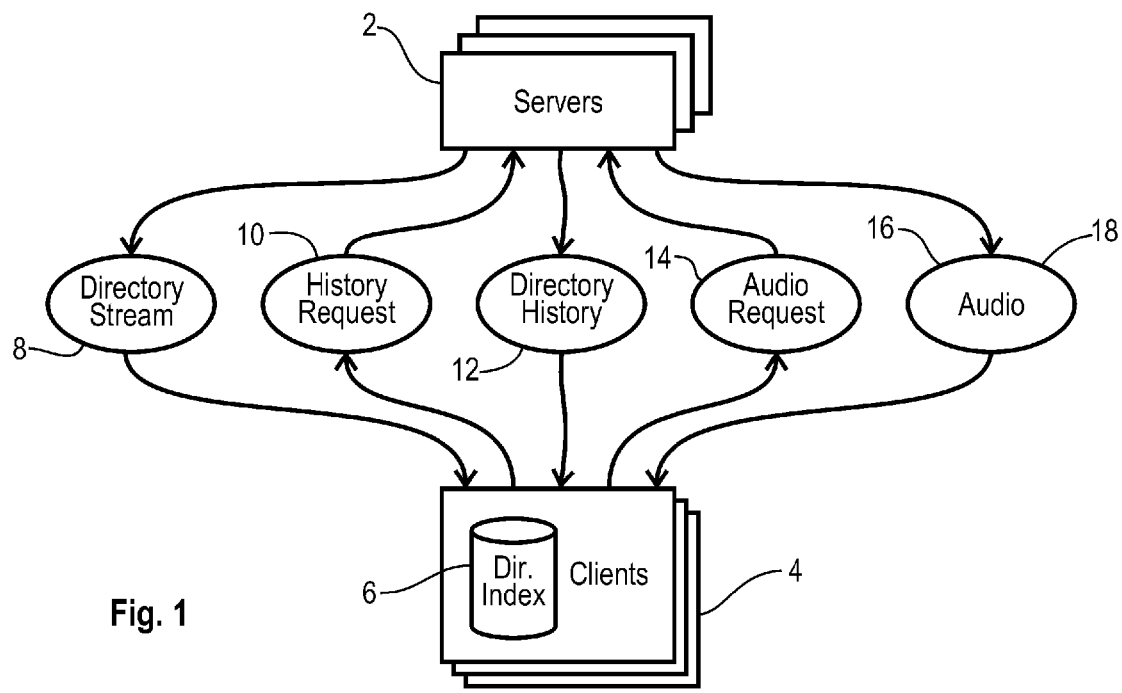
FIG. 1 is a system diagram according to an illustrative embodiment of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof and additional fields in which the present invention would be of significant utility.

In considering the detailed embodiments of the present invention, it will be observed that the present invention resides primarily in combinations of steps to accomplish various methods or components to form various apparatus and systems. Accordingly, the apparatus and system components and method steps have been represented where appropriate by conventional symbols in the drawings, showing only those specific details that are pertinent to understanding the present invention so as not to obscure the disclosure with details that will be readily apparent to those of ordinary skill in the art having the benefit of the disclosures contained herein.

In this disclosure, relational terms such as first and second, top and bottom, upper and lower, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a" does not, without more constraints, preclude the existence of additional identical elements in the process, method, article, or apparatus that comprises the element.

The illustrative embodiments of the present invention are designed to operate in the Internet environment, using the addressing schemes, protocols, and connectivity models supported by the various Internet protocols. The applicants have coined a brand name for the implementation of the systems and methods of the present invention, and it is referred to as the "NetScanner" systems and methods. This name is owing to one illustrative embodiment's similarities with convention police scanner radios and the network environment in which this system and method operates. Generally speaking, NetScanner is a system and method for the gathering, distribution and reception of discrete audio communications, each of limited duration, and each associated with an audio source identity and time of creation, or broadcast time. The systems and methods are applicable to a wide variety of audio content types. In one embodiment, these communications may be individual two-way radio transmissions from multiple concurrently monitored public safety radio frequencies or channels. In another application, these communications may be individual voice journal entries in the context of a social networking website. A multitude of other applications will become evident to those skilled in the art upon review of the teachings contained herein.

NetScanner is a server and client network application, primarily intended for use over the Internet. Unlike prior art techniques for distributing audio feeds through the Internet, NetScanner does not rely on streaming audio techniques. At its core, NetScanner is an index-based system and method. The distribution process is broken into two elements. In the first element, the client terminal is made aware of audio content available on the network, and the client terminal then has control over the selection of audio content from amongst all of the audio content the terminal is made aware of. In the second element, the client terminal requests the audio portion of selected content, unless that audio content has not already been locally buffered. The client terminal is made aware of audio content through deliver of a directory packet, and then requests the associated audio content with an audio content request into the network.

The NetScanner systems and methods employ an index of discrete packet transmissions. These packets are called "directory packets", as a collection of directory packets provides a directory of audio content available for request and playback. Audio content is stored as discrete digital audio files on audio file servers, using any suitable audio encoding format, such as WAV, OGG, MP3 or SPEEX, and each discrete digital audio file is available to client terminals via network download at a specific network address, such as a URL in the case of the Internet. Since audio content is preserved in a digital audio file, audio content can be obtained by the client terminals at any time, not just for access in real time, as is the case with prior art streaming audio distribution. Therefore, the present invention contemplates inclusion of the time of audio transmission as a third key data element in a NetScanner directory packet.

In certain embodiments, directory packets are provided to client terminals in real time within a stream of directory packets called a directory stream. Thusly, the client terminal is promptly notified of newly available audio content as it is created and input to the NetScanner system. In other embodiments, enabling access to previously submitted audio content, a server provides historical records of directory packets recorded at a prior time, in the form of a file download to the client terminals, and this is referred to as a "directory history". This structure enables client terminals to access current audio content as it becomes available on the NetScanner system, and also enables the client terminals to acquire audio content the was created and made available at a prior point in time.

Since the directory packets are identical regardless of whether they are delivered in a real time directory stream or in a directory history transfer, directory packets received in either manner are brought together in a collection called a "directory index". The directory index is a database that is accessed to select specific audio content for request, download, and playback, based on various selections rules, under control of the user of a client terminal. When the selection rules indicate that the selection process should use information not currently present in the directory index, for instance searching for content on audio channels or at times not reflected in this index, then the client terminal can augment the directory index with requests for directory history packets from a server, or the acquisition of a certain directory stream. This enables seamless monitoring of audio content over numerous channels, for any time from real time to the distant past, to the extent that this information is retained on the file servers.

A dominant application of the NetScanner systems and method is the ability to provide real time monitoring of new audio content at the client terminals. If the host network could provide unlimited data bandwidth, every client terminal could be notified of all new audio content, so a single directory stream would suffice. However, as a practical matter, the total volume of audio content and corresponding directory packets overwhelms network connection bandwidth capacities. For example, in one illustrative embodiment, each directory packet has a length of 250 bytes. Over a 64 kilobits/second streaming data connection, which is comparable in bandwidth to typical audio streams, this bandwidth allows about 32 directory packets per second. Although this can be increased with higher bandwidth, such scaling of bandwidth is not a generally viable solution strategy. Note that at the time of writing, certain mobile Internet service providers cap download capacity at 2 GB/month, and a 64 kb/sec directory stream would exhaust this capacity in under three hours average daily connection time, not even factoring in bandwidth consumption from audio content download.

In an example, where an average audio source communications channel carries one transmission per minute, a single directory stream would reach a capacity limit if it was serving about 2,000 audio source channels. Directory packets can be structured in a more compact form, but even with an order of magnitude reduction down to 25 bytes/packet, the directory stream capacity is still under 20,000 audio channels, and this assumes a bandwidth that is prohibitively wide for most mobile users. In the case of a NetScanner system deployed over a large geographic area, and limited to just public safety audio communications, these bandwidth limitations could easily be exceeded. Therefore, the generalized solution is to divide the total audio content into multiple directory streams, each with a design capacity within practical network limitations.

In the illustrative embodiments of the present invention, directory streams are arranged such that the actual throughput, expressed as packets per second, is significantly lower than the theoretical maximum described above, and within the bandwidth limitations of the host network infrastructure. Narrower directory streams consume less bandwidth, particularly when directed to mobile units that have account transfer limits, and are more reliable under conditions of poor mobile radio reception, where the actual bandwidth capacity to a mobile terminal is temporarily reduced, and produce a smaller volume of content that is easier to buffer for a reasonable period of time in units with limited memory resources. Focused directory streams are also easier to administer with respect to security permissions and feed management, and stream content separation reduces the risk of interactions where activity on one system affects users monitoring a different system, which will be more fully discussed hereinafter.

The architecture of the illustrative embodiment NetScanner system includes several major components. Raw audio is captured from radio receivers at an audio feed source, or other types audio sources, which includes a feed source computer. The captured raw audio is converted to a digital audio clip, if necessary. The digital audio clip is uploaded to a network audio server. Uploaded audio content is first detected by a file monitor process on that computer, which places the file in an appropriate download directory, made visible over the Internet through an Apache web server. The file monitor process announces the new content through transmission of a directory packet to a particular location, called an injection point in the NetScanner system, specified by the feed source software. This directory packet is sent through a chain of one or more directory servers, according to the system configuration, and may eventually be transmitted to a client terminal over a directory stream, thereby achieving near real time monitoring, or reported in a directory history, thereby enabling archival monitoring by the client terminal. The client terminal may then download selected audio content stored in the network audio server by specifying a URL delivered in the directory packet, and then reproduce and play the audio content returned.

Reference is directed to FIG. 1, which is a system diagram according to an illustrative embodiment of the present invention. FIG. 1 is a generalized illustrative embodiment, useful in conjunction with the foregoing system architecture discussion. Plural server computers 2 provide directory streams of directory packets 8 to plural client terminals 4, which store the directory packets into directory indexes 6 in the plural client terminals 4. From time to time, some of the client terminals 4 may make directory history requests 10 to the servers 2. In response to such requests, the servers 2 provide directory history 12 transmissions of directory packets to the requesting client terminals 4, which again store those directory packets in the directory index 6. Through application of selection rules in the client terminals 4, from time to time, the client terminals 4 may submit audio requests 14 to one or more servers 2. The servers 2 respond by transferring the requested audio 18 to the requesting terminals 4, which then reproduce and play the audio content for the user. Note that the functional block diagrams of FIG. 1 appear to by physical devices, such as computer servers. Since the NetScanner system is distributed about a network, there is no firm relationship between physical devices and processes running within the network. Processes are free to address each other across the network, and functions may be distributed about plural physical servers. For example, each physical server 2 in FIG. 1 may be a network audio server, an audio source interface, a directory server, an administrative server, another processing function, or a combination, as will be more fully discussed hereinafter.

In an illustrative embodiment, the various processes operating in the NetScanner system and methods are accomplished with several software elements configured for the various processing tasks. In a particular embodiment, these include a 4,200-line "server" program written in PHP, implementing the file monitor process and all of the directory server processes. There is a 7,900-line "client" program written in Java, implementing the client terminal user interface. In addition, there is a 65-line "proxy" program, written in PHP, that provides an HTTPS interface to the server program. There is a 700-line "feed source" program written in Liberty Basic, for capturing audio content from an audio source, such as a radio receiver. There is a 10-line "gather" program written as a BASH shell script, for moving uploaded audio files between processes. This is a 150-line webpage written in PHP, for providing an applet frame to the NetScanner PC version, and for other support functions. Apache web server software is used for providing audio content, and for inbound connections to the proxy. SOX software is used for converting audio between formats, and performing other operations to improve the effective quality of the audio files. PuTTY software is used to transfer audio content between a feed source and audio file server, via SFTP. Thus it can be appreciated that the software processes are all rather compact, and modular in form, enabling various system architecture implementations and system scalability. Those skilled in the art will appreciate that other programming languages, operating systems, and software utilities could be employed to achieve similar structure results.

The client terminals include a client software process that is registered through the network with a unique username in the NetScanner system. This username is typically selected by the user, but in some circumstances may be automatically assigned, assigned by other processes, or redirected from another username. No two instances of client software can be simultaneously online while using the same NetScanner username. The username is used internally as a unique key to manage network connections, and prohibition of multiple logins is beneficial in controlling access to various processes in the system and for security purposes.

The function of client terminal processes is somewhat analogous to a web browser, in that it can be used to receive directory packets and audio content from anywhere in the NetScanner system, and follow links from page to page. A client terminal "profile" is conceptually the NetScanner equivalent of a webpage, in that a profile is a short text configuration file that defines the content and visual appearance of the client terminal user interface. When in receive mode, the client terminal always has a single selected active profile. The profile internally references a single "package" in the NetScanner system, from which directory packets are acquired, and defines a series of channels, or combinations of channels, that are made available through separate client terminal user interface controls. Client terminals can access any profile in the system, either by following "links", which are positions on a profile that, when selected, load an indicated profile, or by directly entering the desired profile address in the client terminal's "address bar".

Figure 15:
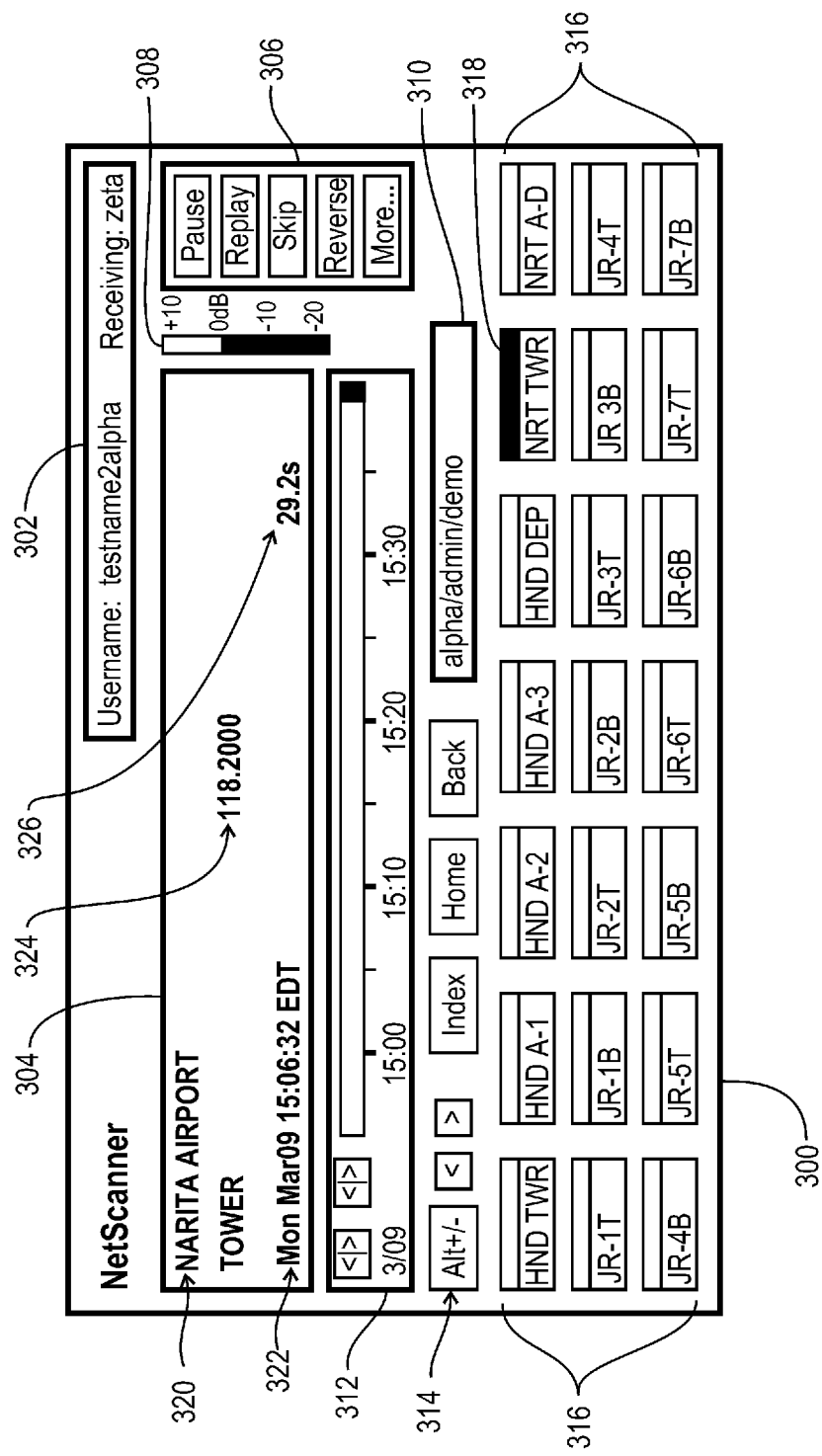
FIG. 15 is a user interface display diagram according to an illustrative embodiment of the present invention.

For the benefits of portability, the client terminal software is primarily written using a subset of Java found in both J2SE, for use on PC's, and J2ME, for use on wireless devices, with a common core that is used in both environments. This core is surrounded by a wrapper written for each particular variant of Java, providing services that are not practically expressed in a common form for both J2SE and J2ME. Those skilled in the art will appreciate that other programming languages and environments could readily be applied to achieve the same or similar functionality. FIG. 15 is a drawing of a typical user interface display on a client terminal, using the J2SE client, with a profile defined in particular exemplary layout, graphic scheme and appearance. The elements of FIG. 15 will be more fully described hereinafter.

Figure 2:
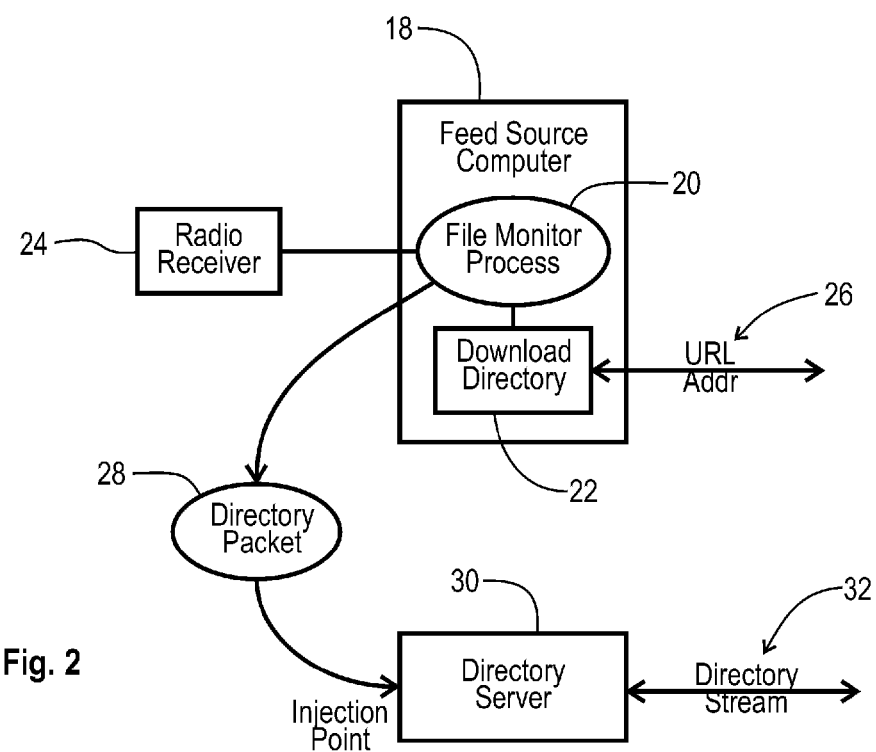
FIG. 2 is a unified package functional block diagram according to an illustrative embodiment of the present invention.

In the NetScanner systems and methods, a "package" is an administrative building block for various server processes. Packages are configured to fulfill a wide variety of roles, including (a) storage and distribution of directory packets for a specific collection of audio source channels; (b) storage and management of a group of client terminal user accounts, under common administration; (c) ownership and distribution of keys, for controlling access to secure content; (d) command and control functions over other directory server processes, and placement of uploaded audio content. Each individual package will typically have a well-defined functional objective within the NetScanner system, serving a predetermined and limited number of these functions. By way of example, a straightforward package is illustrated in FIG. 2. Some of the details of the functional components presented in FIG. 2 are provided hereinafter. FIG. 2 a functional block diagram of a package that gathers raw audio content from a radio receiver 24, such as a scanning radio receiver, delivers a stream of corresponding directory packets 32 to client terminals (not shown), and services audio content request and downloads 26 to client terminals. A feed source computer 18 hosts a file monitor process 20 and a directory of URL addressable digital audio files 22. The file monitor process 20 provides directory packets 28 corresponding to each digital audio file as it is created. A directory server process 30, which may run on the same or a different physical computer, functions as the injection point for directory packets, and assembles the directory packets 28 into a directory stream 32 that is fed to client terminals. The client terminals select audio content through analysis of the directory packets, and then place corresponding audio file download request 26.

In an illustrative embodiment, each NetScanner package has a unique alphanumeric name having up to eight characters. Packages that are used for internal system administrative processes typically have names with a leading underscore character so they are readily discernable. A package may contain one or more directory server processes, that is, separately running instances of the NetScanner server software. Each process is bound to a unique network address, defined by a server IP address and port number, for receiving commands. A special text file, with a copy accessible to all processes, lists all processes in the NetScanner system with their package name, process type that identifies the role of this specific process within the package, host server domain name or IP address, and port number.

In an illustrative embodiment where a physical server is configured to function as a NetScanner system audio file server, there are typically three separate processes executing. If audio is supplied by feed source computers and uploaded via SFTP, then for security, the SFTP login account does not include the NetScanner server processes, or the online NetScanner audio files. This protects against misuse of the SFTP login username/password, with all software and content segregated from the SFTP account, which is less secure, since the SFTP login information is distributed to feed sources which may be outside the physical control of the system or package administration. Now, with respect to the aforementioned three NetScanner processes, reference is directed to FIG. 4, which is an audio file server package 50 functional block diagram according to an illustrative embodiment of the present invention.

The first executing program is a "gather" shell script 52, which detects new uploaded files 66, and moves them to the account with the NetScanner administrative package 60 for further processing. The gather script 52 may be omitted, particularly where audio content is only uploaded directly from client terminals, which communicate directly with an administrative package and do not utilize an SFTP login. If separate SFTP logins are issued for audio content from different sources, then a gather script instance might execute for each login account, or a single gather script could sweep all login accounts for new content.

The second executing program is the NetScanner server, actually several instances running as part of the administrative package for this physical server. A specific file monitor process 54 places new digital audio files in the appropriate web-visible directory 58, and sends a directory packet 68 announcing the new audio content to the appropriate directory server (not shown in FIG. 4) in a transmission package designated for that channel.

The third executing program is the Apache web server 62, for handling audio file download requests 64 for the audio content. Apache is a standard web server program, and audio is made available through a traditional download process, not through the NetScanner servers themselves.

Figure 4:
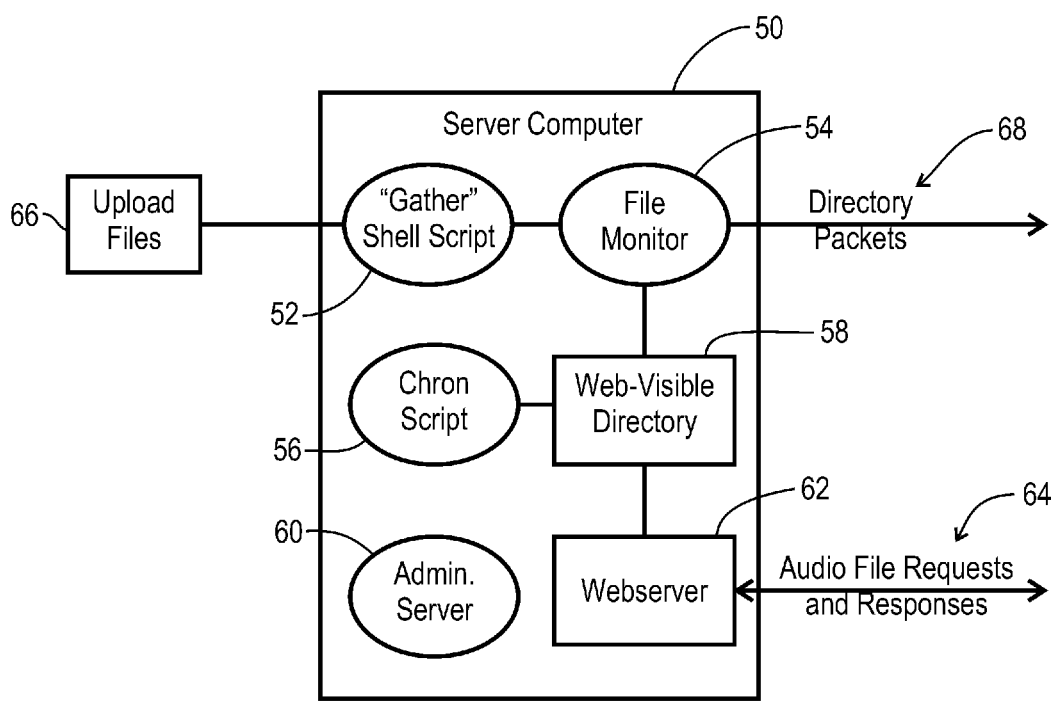
FIG. 4 is an audio file server package functional block diagram according to an illustrative embodiment of the present invention.

In addition, in FIG. 4, a shell script 56 for automatically deleting expired audio content is included in the file server's "cron" directory, for automatic and periodic execution at a regular time. For example, a script may delete all files older than 3 days from specific directories, where this cleanup process executes automatically once a day, under the direction of the operating system.

Figure 3:
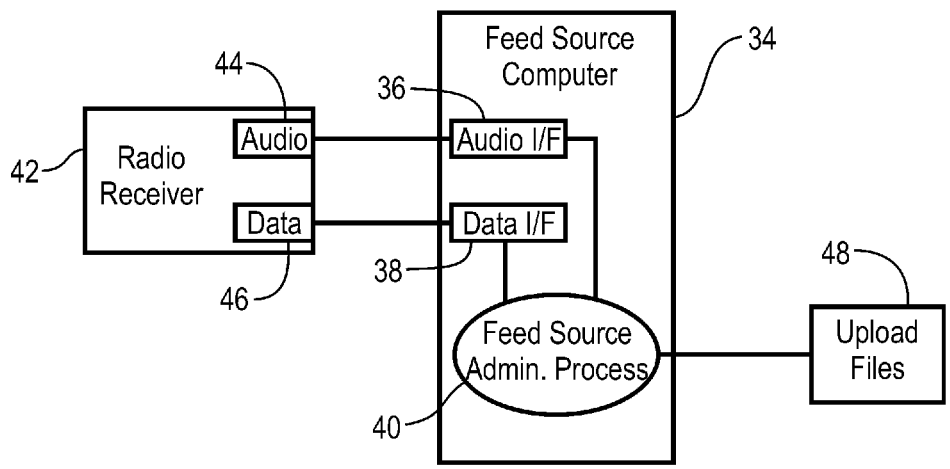
FIG. 3 is a feed source package functional block diagram according to an illustrative embodiment of the present invention.

In an illustrative embodiment where audio content is obtained from demodulated radio frequency signals, such as a scanning radio receiver, a "feed source" computer is connected to a radio receiver, and configured to execute NetScanner processes so as to capture audio content as a raw audio file, format it, and then transmit the audio content to a file server. Reference is directed to FIG. 3, which is a feed source package 34 functional block diagram according to an illustrative embodiment of the present invention. The physical computing device 34 includes an audio signal interface 24 that is coupled to the audio output 44 of a connected radio receiver 44. If the radio receiver includes a data output 46, this is coupled to a data port interface 38 of the feed source computer 34. For example, the data port may be an RS-232 or USB serial interface. The data available may include the radio frequency of reception, squelch control codes or radio fleet talk groups, the status of the squelch gate of the radio, time, and other data as is known to those skilled in the art. The raw audio received from the audio interface 36 is digitized to an digital audio clip and transferred to a feed source administrative server process 40, which incorporates the digital audio clip into a digital audio packet further containing a timestamp and a audio source channel identity corresponding to the audio source 42. The timestamp may include the time of capture, the duration of the audio clip, the end time of the capture or other time reference data. The channel identity may be may include data transferred trough the data interface 38 of the feed source computer 34. The completed digital audio files are uploaded 48 to a corresponding audio file server package (not shown in FIG. 3).

The NetScanner systems and methods rely upon various processes and packages to enable the illustrative embodiment. As discussed, the feed source and network audio server work in conjunction with one or more directory servers to deliver both directory streams and audio files to client terminals. A package administrator process is used to coordinate the various processes in each given package. As the NetScanner system is scaled to larger size and capacity, plural packages are linked through the network to increase functionality and distribute network loading. In this scenario, it is useful to employ a system administrator process. The system administrator is an administrator affiliated with the NetScanner system as a whole, managing the performance of the entire system. A package administrator is an administrator affiliated with a user of the NetScanner system who has obtained rights to a package, and has administrative rights over this specific package.

Directory packets are sent from a directory server to client terminals in either a directory stream or a directory history. In addition, directory packets may also be sent from process to process, or from package to package. And example of this function is when a primary directory server sends directory packets to a secondary directory server in a load distributing process, which will be more fully discussed hereinafter. Reference is directed to FIG. 5, which is a directory packet data diagram according to an illustrative embodiment of the present invention. The directory packet 70 is a basic unit of information in the NetScanner system, describing a single audio transmission stored as a digital audio file at a network addressable location in a network audio server. The principle information includes the channel identity 72 of the transmission, a timestamp 74, which is more generally a value indicating the ordering of transmissions on the system, and the network address of the corresponding audio content 76, which is typically an Internet URL.

Directory packets are transmitted in three distinct transmission modes in the illustrative embodiment. The first mode is the aforementioned directory stream that is carried on an open Internet connection, from a directory server to a client terminal. This is the mode used to deliver near real time information to the client terminals about newly available audio content. The expression "near real time" is owing to the inherent capture and network transmission latency in what would otherwise be a true real time communication. Hereinafter, this may simply be preferred to as "real time". When a directory packet is received at a package, it is transmitted to each open directory stream originating at that package, provided the packet passes a set of conditional filters that reflect security permissions governed by the package's administrative rules and the client username, and any restrictions in the client's request for a stream, both filters limiting the stream content transmitted to a particular user, all of which will be more fully discussed hereinafter.

The second directory packet transmission mode is that aforementioned directory history, which is a text file generated by a directory server process in a package, containing a series of previously recorded directory packets from a package's history logs. The directory history request is subject to the same types of filters as a directory stream connection, and a client terminal will only be issued directory packets that fall within its permissions, according to the package's security settings. This is how a client terminal obtains information about packets that were issued before the client terminal went online, or otherwise connected to the relevant stream. Similarly, if the client terminal has purged directory packets from its directory index due to space limitations, a directory history request is how the client terminal can repopulate that portion of the directory index, if needed to select audio content.

The third directory packet transmission mode is the "directory relay." A directory relay is an inter-process communication, from one NetScanner directory server process to another. This mode is how a directory server always receives directory packets. A directory relay transaction is used for the first injection of a directory packet, from a file monitor to the appropriate originating, or primary, directory server. In some package configurations, multiple directory server processes are available for stream connections so as to support a large number of users, and relay connections are then used to send directory packets from one directory server process to another within the package. When a package imports content from another package, for example where it carries channels where the directory packets are copied from another package, a directory relay connection is used for the inter-package communication. Generally, a directory relay connection is used for all directory packet transactions within the NetScanner server architecture. In a directory relay transaction, the directory packet contents are encoded in the URL, using a standard GET format request, discussed more fully hereinafter. Thus, the transaction appears at the receiving node as an Internet socket connection request, interrupting a blocking state where the process waits to receive new connections. The connection is closed as soon as the packet is transferred, and directory relay connections are not left open so that each directory packet transaction is a stand-alone and independent event.

Reference is directed to FIG. 6, which is a transmission package functional block diagram according to an illustrative embodiment of the present invention. FIG. 6 presents a graphical representation of the distribution of directory packets in the aforementioned modes in the illustrative embodiment. Plural audio content source and related interfaces are presented as conceptual audio channels 78 that provide directory packets 80 to a transmission package server 82, which is the primary directory server in this illustrative embodiment. The directory packets sent out are passed through a set of content and security filters 84, which will be more fully discussed hereinafter, and are forward to plural client terminals 88 as one or more directory stream 86 and to one or more downstream NetScanner packages 90 as directory relays.

In an illustrative embodiment of the present invention, directory packets have a standard format in a 250-character string, separated into predetermined data fields with certain lengths, and having the intervening spaces removed. The following list is an exemplar directory packet in the illustrative embodiment.
  a) AFURL
  b) 1218242582590
  c) USMA0105-P..G4.-471762-00-12-alpha . . .
  d) 00007109
  e) iscan.rangecast.com/cc-audio/000/alpha/1218242/ns_000_alpha~~~_12_1218242568927
  f) B
  g) *
  h) 471.7625
  i) MA Framingham Police
  j) x The data fields contain the following information:
  a) Data Type: "AFURL". This field specifies an audio file URL on the Internet. Other data sequences can be used to denote other data types, or a directory format in a different format.
  b) Timestamp: "1218242582590". This field represents the time when this directory packet was first processed and made available at this package, or, when it was written to the directory stream by the package's primary directory server, expressed as milliseconds since the standard epoch of the system timestamp. Although the actual reception time reported by the feed source is available, the processing time at the server is the preferred time reference for two reasons. First, if a feed source clock is not calibrated correctly, the apparent reception time may be inaccurate. Given the variety in possible feed source types, and potential lack of administrative control over their clocks, this makes the reported time potentially untrustworthy. Second, a consistent ordering for directory packets within a package, covering both directory stream and directory history references, simplifies the logic for maintenance of time-windows in the client terminal, periods for which it is known that all packets are in the directory index. It is possible for transmissions to be reported on a directory stream out of the actual broadcast order, particularly if there is greater processing latency in the reporting of some channels.
  c) Channel Code: "USMA0105-P..G4.-471762-00-12-alpha . . . ". This field uniquely identifies a specific feed source, or channel, in the NetScanner system. The code is broken down into several elements. In the example, "USMA0105" is a geographic code specifying a particular jurisdiction, in this case saying that the transmission is from the USA, in Massachusetts, and associated with the city of Framingham (0105). The "P.." is a function code, identifying the classification of channel content, in this case a radio broadcast channel from a police department. The "G4." is an owner code, identifying the particular owner of the channel, in a format subject to scope limitations based on the jurisdiction and function type, city government in this example. The "471762" is a code identifying a particular channel operated by the indicated owner, often using the broadcast frequency or talkgroup ID of a trunked radio system, thereby ensuring uniqueness, although any arbitrary string can be used. The "00" is in a field reserved for future use, for accommodating adjustments to the channel code format, and for security purposes distinguishing channels that are subject to special restrictions in distribution to streams or downstream packages. The "12" is a feed source identity, for optionally indicating the particular feed source, although this value is preferably not dynamic, so as to maintain the one-to-one correspondence between channel codes and actual channels. This field is particularly useful when a single actual channel is simultaneously recorded at different locations. Certain values in this field are used to denote "talknet" channels, where some or all receiving clients are authorized to send audio into the NetScanner system for distribution on the channel. Finally, the "alpha . . . " identifies the initial package where the directory packet was reported, the original owner of the channel.

In most cases, when following recommended guidelines for constructing channel codes, the package identity, feed source identity, and frequency are sufficient to uniquely identify a particular feed source. Under some conditions, the NetScanner system automatically assigns a channel code based on these elements, with null symbols written into the remaining fields. This enables feed source channels where the content type is unknown, or has not yet been registered with the system.

Note that the same actual broadcast channel, monitored at different locations, will be reported with different channel codes. For example, if the same broadcast channel is reported by two feed sources belonging to different packages, then the two feeds of this channel are guaranteed to diverge in the package identity field. If the same broadcast channel is monitored by two feed sources within the same package, for example FRS, short-range, radio pickups at multiple locations in a city, then if correctly configured, the feeds may be distinguished by the feed source identity. Being able to separate and distinguish transmission reports from different feeds of the same channel is intentional. First, the feeds may have different quality or reliability, and it may be desirable to select a particular copy of the feed. Second, if a single package carries two feeds of the same channel, and the client is configured to receive both feeds, transmissions will be heard twice, once from each source. Treating the feeds as different channels, within NetScanner, allows for the selective reception of a single copy of channel transmissions.

d) Duration: "00007109". This filed provides the duration of the audio content in milliseconds. By making this information available in the directory packet, a client terminal with limited memory can manage an audio buffer more efficiently. For example, when space is needed for a new download, an appropriate quantity of older material can be removed from the buffer, with the quantity based on the size of the new transmission.
  e) URL: "iscan.zt . . . 8927". This is the Internet URL from which the digital audio file can be obtained. The address omits the file type extension (e.g. ".wav" or ".ogg"). Different NetScanner client terminals support varying audio formats, depending on the client terminal platform's format support, therefore, it is presumed that the client terminal will append a proper suffix for its preferred audio file type. The client terminal knows what file types are generated by the NetScanner system, and therefore available at the audio file server.

f) Relay Counter: "B" . . . This counter starts at "A" and is incremented every time a directory packet is received at one package from another package. If the counter is too high, the packet will not be relayed further to any downstream packages. This prevents infinite loops, where a directory packet is transmitted along a chain of packages that forms a closed loop, or chains of packages that are excessively long. The relay counter is not incremented for intra-process relay transactions, from one directory server to another within the same package. It is presumed that the package registrar process is responsible for preventing infinite loops within a package directory server distribution tree. Advancing the relay counter in this stage could create inconsistent behavior with respect to the maximum supported chain, since it is undetermined at what level in a package's distribution tree an outbound inter-process relay will originate.

g) Max Hop Counter: "*". This data field contains a counter for the maximum number of remaining hops allowed for the directory packet, as the transmissions from one package to another. The default value "*", which indicates no limit aside from the basic relay counter. A package configuration option allows for setting the max hop counter in all outbound inter-process relay packets to a defined value. For example, if set to "1", other packages may import directory packets, but only with permission to provide these packets directly to client terminals, while barred from relaying further downstream to other packages.

h) Short Name: "471.7625". This data field is a short descriptive name for the channel, in a maximum of twelve characters, with eight characters being preferred. In this example, a number indicating the broadcast frequency, in megahertz, of the radio station being monitored is used. The short name data field is primarily intended as a method for a package importing channels from another package to learn a default name for new channels, sized for presentation on a button option in the user interface of the client terminal.

i) Text Tags: "MA Framingham Police". This data field includes three 17-character fields for describing the channel contents in great detail. It is intended as a place to provide a hierarchal description of the channel. This information is presented on the client terminal user interface when the transmission is played. It is generally expected that the text tags for a given channel will be stable and constant between transmissions, but that is not required, and there are situations where it is useful to transmit more specific descriptive contents in these fields regarding a particular transmission, not merely the channel. For example, on "talknet" channels where NetScanner client software is allowed to submit audio contents for distribution on the channel, the username of the client terminal generating content is presented in one of these fields, so other users know who originated the particular transmission.

j) Alignment Mark: "X". The end of the packet is marked with an "X" character, for alignment and verification purposes.

In certain illustrative embodiments, the last three fields in the directory packet, the short name, text tags, and alignment mark, are for convenience, and are not necessarily required. In the situation where the directory server provides the client terminal a list text tags for each relevant channel, indexed by channel code, then the client terminal is able to independently reproduce the text tag for any transmission by reference to the channel code. This includes the text tag, and is particularly beneficial for relay connections where the channel text tag is potentially unknown at the target package, for instance at the file monitor, which may have no way of knowing if a particular transmission is the first content on a new channel. However, it may be more efficient to provide directory packets in a shorter format, particularly on stream connections where bandwidth is more likely to be limited. With respect to directory packets send to a client terminal, there us no benefit from sending the relay and max hops counter, so these may be omitted from a short format.

The URL in a directory packet may be compressed by storing all files in locations that support a standardized URL format. The domain name can be replaced with a code that is inserted into a particular place in a fully qualified domain name. For example. "1234" can replace "1234.example.com". The initial portion of the path may also be standardized across the NetScanner file servers, and omitted from the path. The next three folders in the example path, the audio group, injection package, and time range, replicate information already present in the filename. Thus, the URL can be condensed to a domain code and filename, where the client regenerates a complete URL required to submitted an audio file download request. Additionally, other fields in the directory packet can be omitted in certain illustrative embodiments, for example, the time duration can be omitted without interference with the basic functions of a directory packet.

In other illustrative embodiments, directory packets, or reference information associated to channel codes provided in directory packets, include geographic information, such as a latitude and longitude of the broadcast transmitter, broadcast licensee, or feed source receiver. This enables geographic rule construction and use in selection and distribution of directory packets. For example, if the client terminal is aware of its geographic location, a selection rule can match all channels within 10 miles of the client terminal's present location.

In addition to directory packets, the NetScanner system distributes other types of packet data and information. In one illustrative embodiment, packets containing text messages are distributed in a text message packet format. Such messages can be delivered to all client terminals system-wide, to all client terminals connected to a particular directory stream, or addressed to groups of client terminals configured to receive text message content description codes, which is roughly analogous to a channel code. Text messages are passed between packages, in a manner analogous to directory packets. Packets, including both directory packets and text message packets, are addressed to a particular user, and either not distributed to, or not utilized by, other client terminal recipients. Packets addressed to an individual user, or group of users recognizable to the directory server, can be printed to only the streams of the addressees.

Considering the scaling of the NetScanner system to larger and wider implementation, and considering the volume of directory packet and audio content such an environment produces, and considering the needs and desires of users who access the system from both the client terminal and system administration perspectives, and considering information security aspects that may be necessitated, it becomes apparent that selective control of who gets what information is warranted. Therefore, in certain illustrative embodiments of the NetScanner systems and methods, directory packets are passed through filters according to the channel code of each transmission, which filters match packet content on certain channels while not matching packets referencing content on other channels. For example, a filter can be applied at a server to control the distribution of content from a package, or at a client to test whether a transmission falls within scope of current client terminal selection criteria, which indicates channels of interest to a user. Other applications of filters will become apparent to those skilled in the art upon review of the following disclosure.

The discussion of the filtering process will typically be described as filtering or matching certain "channels", while it will be understood that what is actually being filtered or matched are portions of directory packet content of directory packets that reference audio content on these channels. In the specific context of constructing or describing filter rules, a filter is applied against an actual list of channels, not directory packets, to provide the user with information about what content would be passed by a filter so constructed. In any event, the meaning will be evident to those skilled in the art by context in which it is presented.

Channel identities, also referred to as channel codes, are constructed according to position-sensitive rules, corresponding to the data fields discussed in the prior section describing an exemplary directory packet. For example, transmissions on channels originating from the state of Florida, disregarding channel function for now, begin with the sequence "USFL". All transmissions from fire departments, irrespective of geographic location, have the character 'F' in the 10th position. Channel code structures describe an idealized environment. In practical illustrative embodiments, it may be impossible to apply rules with rigid consistency. For example, an audio feed source operator may not know the function of a particular channel, or multiple functions of an input source may prevent determination of the proper classification of individual transmissions. In general, it is recommended that special characters representing "unknown" be applied in fields where no specific classification within the NetScanner channel code construction guidelines would be appropriate or accurate. Thus, the selection of a nomenclature, or filter grammar, for channel codes is based on the anticipated content carried in the audio distribution system, which may be adapted as trends develop and evolve. The specific channel code system described herein is meant as illustrative only, and other formats will be evident to those skilled I the art, in the application of the system in particular circumstances.

A basic filter rule can match exactly one channel in the NetScanner system, and no other channels. In this case, the filter rule is written exactly like the channel code. To match an associated group of channels, a filter rule may substitute a wildcard character (e.g. "?") in any character position. When the filter has a wildcard for all remaining positions, the filter rule string is terminated immediately at that point. However, a filter must contain at least one character, so the filter to match all channels is a single wildcard symbol (i.e. the filter string "?"). In a further example, the filter to match all channels associated with Florida is "USFL", and the filter rule to match all fire department transmissions is "?????????F" The filter to match all fire department transmissions in Florida is "USFL?????F" This filter grammar allows for the construction of filter rules that combine tests of multiple criteria from the channel identity nomenclature. A filter rule that matches multiple channels, either by explicit wildcard characters or termination before the full length of a channel code, is called a "wildcarded" filter rule. Evaluation of a filter rule is performed by evaluating each character position in the filter, and continuing if the position passes. A position passes if the filter and subject, for example the channel identity in a directory packet, are identical, or if the filter has a wildcard value in that position. If all positions in a filter rule are tested, and all positions passed, then the filter rule is said to pass, and the subject is said to match the filter.

A single filter may include several filter rules, with a separator character (e.g. ':') between the rules. This allows for the construction of a filter that matches a set of channels where the lowest generalization of common channel code properties would include unwanted content. For example, channels associated with Framingham, Mass. begin "USMA0105", and channels associated with Natick, Mass. begin "USMA0116". The lowest generalization of common channel code properties, "USMA01", would also include channels associated with other cities and towns, such as Concord, Mass. To match only channels from Framingham and Natick, the multi-rule filter "USMA0105:USMA0116" may be constructed. Evaluation of a multi-rule filter is performed by evaluating the filter rules independently. The filter is said to match the subject if any of the rules within the filter match. If all filter rules are evaluated, and none match, then the filter is said to not match the subject.

In a conceptually simple form, a multi-rule filter can be constructed that explicitly lists each desired channel by full channel code. However, if a significant number of channels are included, the resulting rule will become rather long, and therefore more resource-intensive to evaluate and more difficult to verify or understand by eye, if reviewed manually. Therefore, it is preferable that wildcards be used to generalize a filter for a group of channels, wherever possible, instead of very specific multi-rule filters. The use of wildcards also ensures that new similar channels, not known at the time when the filter was constructed, will automatically match the filter. In general, when constructing filters, care should be taken to consider whether future channel additions to the package should be included or excluded.

In the case where a filter is defined as a composite of several filter rules, one filter rule will have no effect if all included content also falls within the scope of a second filter rule. For efficiency, at many points in the NetScanner operation, a filter is "reduced" by evaluating its rule components, and striking any rules that have no practical effect for this reason. This results in shorter filters, and more efficient processing of information.

In the NetScanner systems and methods, a package is a structural element in a network of servers, and as discussed above, there are several distinct functions that may be given to a package. A list of typical package functions includes; a transmission package, an account management package, a key management package, a feed source administrative package, a root package, and other combinations of packages. Packages are also assigned certain roles in the NetScanner system, which will be more fully discussed hereinafter.

A transmission package is assigned the task of storage and distribution of directory packets for a specific collection of channels. The transmission package is associated with the particular channels carried on its 'directory stream, and the primary administrative functions involve defining and acquiring these channels, and setting security rules governing access to directory packets issued by the package. Conceptually, this package can be thought of as a "broadcasting" or "transmitting" package. The transmission package generates a single directory stream, identified by the package name. Directory packets are sent to individual client terminal, or to other downstream packages that import channels from this transmission package for redistribution. Outbound transmission of packets, both to client terminals and downstream packages, are filtered in accordance with security rules established by the package administrator, and also filtered in accordance with rules sent by the receiver in the request for content, so the actual received contents of a stream may be a restricted subset of the stream's full contents.

Figure 11:
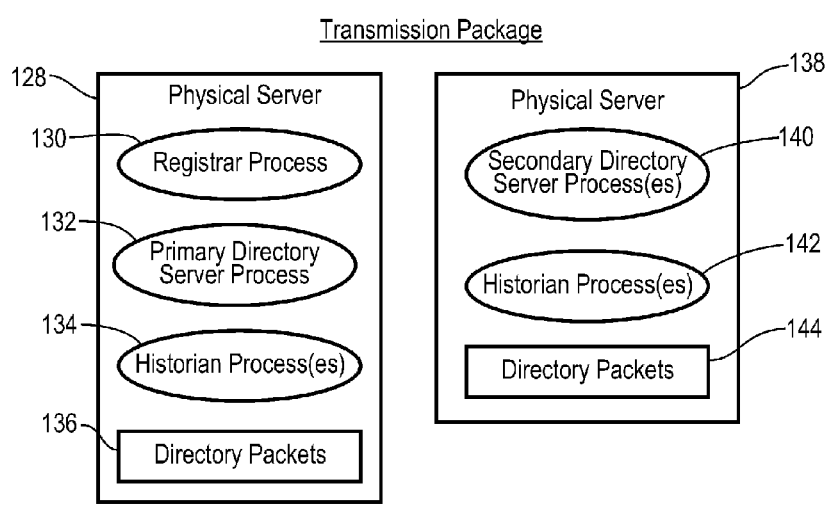
FIG. 11 is a transmission package functional block diagram according to an illustrative embodiment of the present invention.

Reference is directed to FIG. 11, which is a transmission package functional block diagram comprising two transmission packages according to an illustrative embodiment of the present invention. The first of these is a primary transmission package in a system that runs on a physical server 128, such as a personal computer processor. This package includes a registrar process 130, a primary directory server process 132, an historian process 134, and a database of directory packets 136. The second transmission package runs on a second physical server 138, and functions as a secondary transmission package in the NetScanner system. The secondary transmission package includes a secondary directory server process 140, an historian process 142, and a database of directory packets 144. Note that the intercommunication between these packages and the management of directory packets in the databases will be more fully discussed hereinafter.

An account management package in the NetScanner system is assigned the task of storage and management of a group of client terminal accounts, also referred to as user accounts. This package stores all files and records associated with particular user accounts, that is, accounts authorized to run NetScanner client terminal software. For each username, this information can include a login password, account service level, a "homepage" (initial profile loaded after login), and user-administered profile definitions. NetScanner login usernames have the format "username@package", where each field (username and package) is alphanumeric and limited to eight characters. Conceptually, this package can be thought of as a "user account management" package that provides the profile used by a client terminal to receive directory streams and access to audio content, as well as the graphical presentation on the user interface of a client terminal.

All NetScanner profiles, including account management package page configurations, are stored in an account management package, and are identified by a unique NetScanner address in the form of "package/username/profile". Each field is alphanumeric and limited to eight characters. A single profile is limited to a single directory stream from a transmission package for acquiring directory packets, which can be any transmission package in the entire NetScanner system. Each client terminal user account can store any number of profiles. All profiles can be loaded by any NetScanner client terminal, and not just the profile user for whom the profile was created in a particular package. However, access to directory packets may be restricted by the transmission package based on the connecting client username so that access to the directory stream for a given profile can be limited, if desired.

The more basic forms of transmission package security rules, governing who may receive content, are broadly directed to affect all users with accounts on a specific package. Therefore, it is generally helpful if accounts on reception packages are given to users with similar qualifications. This is similar, for example, to the practice of giving e-mail accounts in corporate domains to legitimate users from that organization, so the e-mail address may be used as a way to confirm the other party's organizational affiliation.

Reference is directed to FIG. 7, which is an account management package functional block diagram according to an illustrative embodiment of the present invention. The physical server computer 92 host a database of user accounts 94, which can be accessed through network connectivity. Other software applications may also run on the same server 92.

Figure 8:
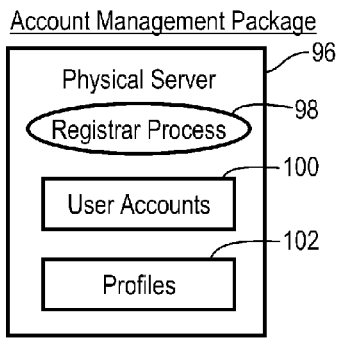
FIG. 8 is an account management package functional block diagram according to an illustrative embodiment of the present invention.

Additionally, reference is now directed to FIG. 8, which is another account management package functional block diagram according to an illustrative embodiment of the present invention. The physical server 96 in FIG. 8 also hosts other related package functions of the NetScanner system. A registrar process 98, which will be more fully discussed hereinafter, acts as the host of the account management process. A database of user accounts 100 and plural user profiles 102 are stored on the physical server 96 and are accessed by the registrar process 98 as needed to service information requests from elsewhere in the NetScanner system.

Another package utilized in certain illustrative embodiments of the NetScanner system is the key management package. A key management package is a package used to manage the ownership and distribution of keys. The package administrator accredits other packages. The administrators of accredited packages are authorized to issue keys, owned by the key management package, to its user accounts. This function may be combined with traditional transmission or account management packages, or for an accrediting organization, the key management function may be an independent activity. The design and application of NetScanner keys will be more fully discussed hereinafter.

A feed source administrative packet in the NetScanner system provides command and control functions over other directory server processes. The package provides system administration means for monitoring the health of processes running on the same physical computer, administratively starting or stopping these processes, automatically triggering routine housekeeping and maintenance tasks in these processes, and similar functions. In the illustrative embodiment, there is one feed source administrative package on every physical server running NetScanner processes. For servers used to store audio content, the feed source and administrative package is also responsible for placement of uploaded audio content. In this case, the package monitors an upload directory for newly reported audio content, and/or receives user-submitted audio through a network connection from NetScanner client terminals. The package places new audio content file into a web directory visible over the Internet at a distinct URL, and sends a directory packet reporting this new content to a specific transmission package, designated as the injection point for this NetScanner channel.

A single channel, for instance as monitored by a feed source, typically stores audio at multiple servers, with each individual audio file uploaded to a quasi-random server for load balancing. For this reason, there will typically be no single administrative package handling all audio content from a single feed source. Similarly, a single server will typically host content from a variety of unrelated sources, so a single administrative package will typically handle unrelated audio content from various sources. However, to isolate storage or administration of audio content for a particular package, there may be situations where an administrative package is supporting exactly one transmission package.

Figure 9:
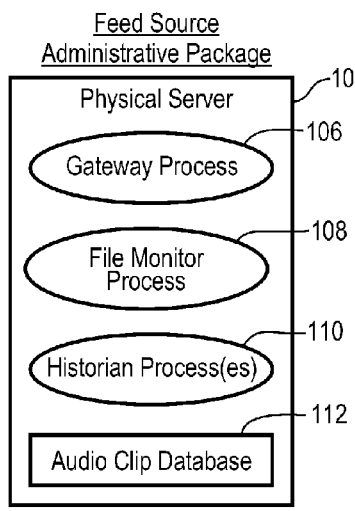
FIG. 9 is a feed source administrative package functional block diagram according to an illustrative embodiment of the present invention.

Reference is direct to FIG. 9, which is a feed source administrative package functional block diagram according to an illustrative embodiment of the present invention. A physical server 104 hosts several NetScanner processes and a digital audio clip database 112. The processes include a gateway process 106 that receives audio from a feed source interface (not shown in FIG. 9). Other processes include a file monitor process 108 and an historian process 112. Both the historian process 110 and the file monitor process 108 accesses the audio clip database 112. Further details of the specific process functions will be more fully discussed hereinafter.

The NetScanner system employs a single root package, which is responsible for certain system wide administrative responsibilities distinct from an administrative package, as described hereinafter in the description of a root process.

Figure 10:
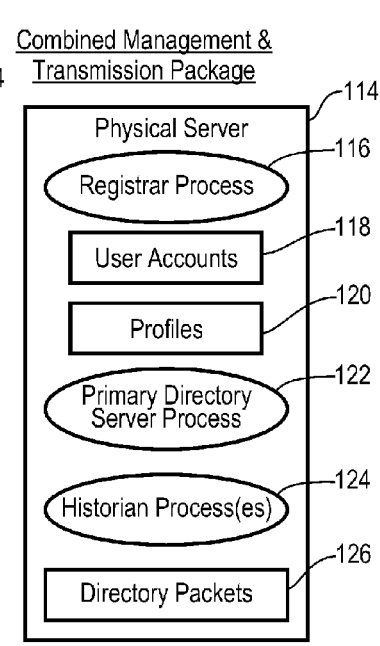
FIG. 10 is a combined account management and transmission package functional block diagram according to an illustrative embodiment of the present invention.

A single package can be configured to perform both the account management and transmission functions of both generating directory packets and hosting user accounts. This combination is referred to as a combined package. This illustrative embodiment is applicable for small organizations with user accounts and a small number of channels, able to fit comfortably into a single directory stream. A particular advantage of a combined package is that some additional security rules become available when transmission and reception are co-administered in the same package, for narrowly targeting authorization for sending content on specific channels to specific users. Reference is direct to FIG. 10, which is a combined account management and transmission package functional block diagram according to an illustrative embodiment of the present invention. A single server computer 114 hosts the registrar process 116 as well the user account 118 and user profile 120 databases. These form the account management portion of the combined package. A primary directory server process 112 and an historian process 124 access a database of directory packets 126 to comprise the transmission package portion of the combined package. The processes in these packages will be more fully discussed hereinafter.

Figure 12:
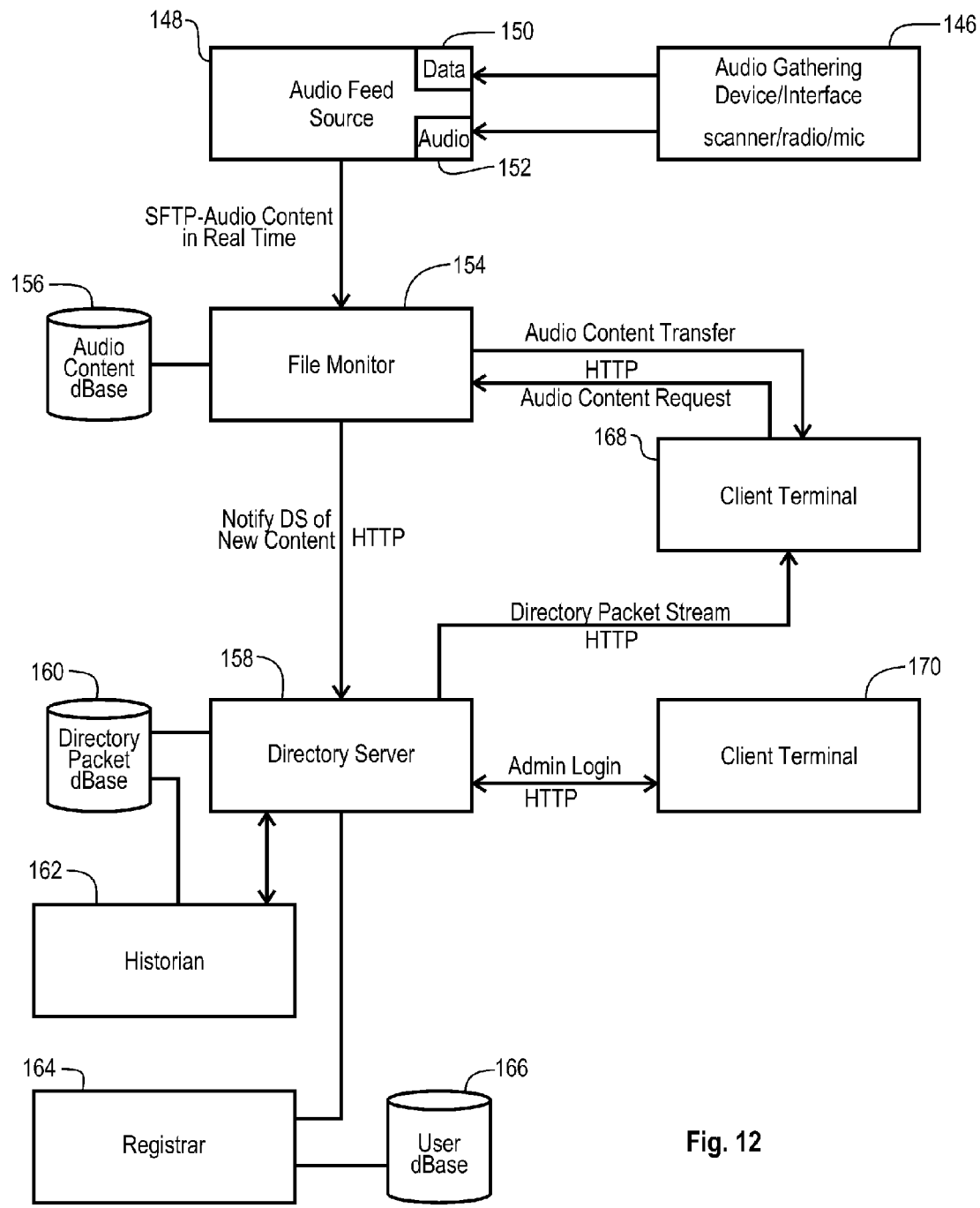
FIG. 12 is a system level functional block diagram according to an illustrative embodiment of the present invention.

The illustrative embodiment NetScanner systems and methods can be viewed from the perspective of a system of functional components performing certain functions, as a method comprised of various step that follow a sequence to achieve the desired functions and outputs, or as a collection of processes distributed about a network of processors, with inter-process communications coupling them together. Reference is now directed to FIG. 12, which is a system level functional block diagram according to an illustrative embodiment of the present invention. This illustration presents a simple NetScanner system with one audio source 146 distributing audio content to one client terminal 168, using an audio feed source 148, and file monitor 154, and a directory server 158, as have been discussed hereinbefore. In addition, a second client terminal 170 illustrates an administrative login process with the directory server 158. Some of the inter-component elements are more fully discussed hereinafter, but will be presented in summary at this juncture. The audio gathering device 146, which may be a scanning radio receiver, is electrically coupled to an audio feed source 148 using an audio interface 152 and a data interface 150. Raw audio and audio source data are thusly coupled into the NetScanner system. The audio feed source 148 converts the raw audio into an digital audio clip with data concerning the identity of the source 146, 148 and the time at which the audio was captured, to the file monitor 154 using the Internet Secure File Transfer Protocol ("SFTP"). This action occurs essentially in real time. The file monitor 154 packages the digital audio clip and data into a digital audio file and stores it at a network addressable location (by URL) in an audio content database 156. At the same time, the file monitor 154 generates a directory packet corresponding to the received digital audio clip, and transfers this to the directory server 158 using convention Internet HTTP transfer techniques.

The directory server 158 stores the directory packet in its directory packet database 160, and also communicates the directory packet to a first client terminal 168 within a directory stream of directory packets using the HTTP protocol. An historian component 162 also has access to the directory packet database 160 and can communicate requests and search results to and from other elements in the system. From time to time, the first client terminal 168 selects a directory packet based on certain selection criteria, and places an audio content request with the file monitor 154, using the URL of the desired audio content, determined from the directory packet of interest. The file monitor 154 recalls that audio content from the audio content database, and forwards the audio content to the first client terminal 168 using HTTP communications. The audio terminal can the reproduce the audio content for the user. Thusly, the audio content is propagated from the audio gathering device 146 to the client terminal 168.

Additionally, in FIG. 12, the client terminal account management and access security features of the illustrative embodiment are introduced. In order to register and gain access to the system, the second client terminal 170 contacts the directory server 158 using the HTTP protocols for an administrative login. The directory server 158 communicates the login request to a Registrar 164, which queries a user database to validate the second client terminal's previous entry into the user database 166. Once found, the second client terminal is registered for access to a directory stream on the system. In an alternative embodiment similar is structure to that in FIG. 12, the historian 162 and directory server 158 processes aren't actually in direct communication. Rather, the historian reads data from the database 160 that is written into by the directory server. The client terminals, when seeking older records, directly consult the historian process, thereby bypassing the directory server. In this embodiment, the historian is a separate process, which is useful to reduce loads on the main directory server process by completely offloading the task of searching database records. Note that the client terminal is assigned an historian by the registrar, to balance loads among historians.

Figure 13:
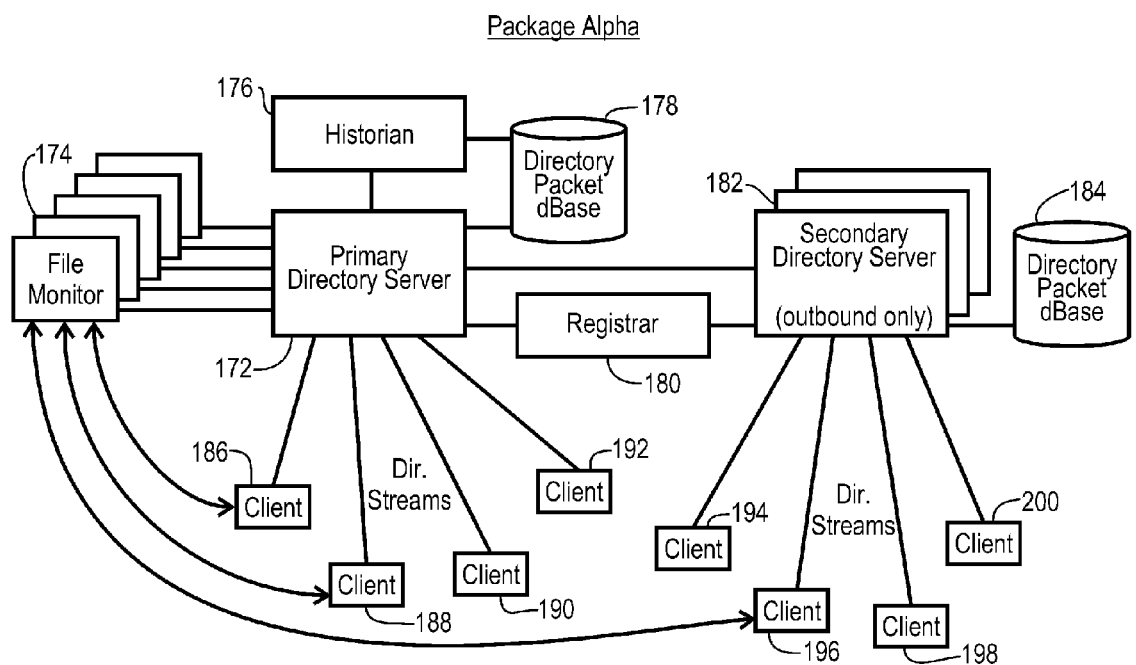
FIG. 13 is an integrated package system diagram according to an illustrative embodiment of the present invention.

Reference is directed to FIG. 13, which is an integrated package system diagram according to an illustrative embodiment of the present invention. FIG. 13 presents a more complex package, called Package Alpha, again presented in functional block diagram form. In Alpha package, there are plural file monitors 174 receiving audio content from plural corresponding sources (not shown). The plural file monitors 174 store digital audio files produced from time to time in network addressable databases. At the same time each new audio file is created, a corresponding directory packet is sent to primary directory server 172 in the Alpha package. The primary directory server 172 stores the directory packets in a directory package database 178, and simultaneously sends the directory packets within directory streams to certain client terminals 186, 188, 190, 192 based on certain filters, as will be more fully discussed hereinafter. The client terminals monitor their respective directory streams and select directory packets of interest according to certain selection rules, as will also be more fully discussed hereinafter. In FIG. 13, client terminals 186 and 188 submit audio content request to the corresponding file monitor 174 and receive the corresponding digital audio files in return.

The client terminals 186, 188, 190, 192 in FIG. 13 may seek content that is not already stored within their memories, such as content that occurred at an earlier point in time. To satisfy this need, the client terminal communicates the requested content from the primary directory server 172, for recollection from the directory packet database 178. Since the primary directory server is tasked with handling a great deal of real-time processing tasks, requests from historic content have handled by an historian 176, which also has access to the directory packet database 178, and is able to recall and forward the desired information to the requesting client terminals. A registrar 180 maintains a database of user accounts, and manages access control and security issues from the package and for control of the plural client terminals. The registrar functions will be more fully discussed hereinafter.

In a substantial package, such as illustrated in FIG. 13, there may be so much traffic that a single primary directory server 172 is unable to meet the real-time demands placed upon it. This problem is mitigated with the additional of one or more secondary directory servers 182 to the package. The primary directory server couples the directory packets to the secondary directory servers, which populate their own directory packet database 184. In essence, the secondary directory servers 182 mirror the primary directory server 172. The registrar 180 assigns certain client terminals 194, 196, 198, 200 to receive their directory streams from a secondary directory server. Note that the audio content associated with directory packets still resides within the plural file monitors 174. Thus, if a client terminal 196 assigned to a secondary directory server 182 seeks audio content, it communicates a request for audio content directory to the file monitor 174 address identified in the directory packet that stimulated the audio content request.

Figure 14:
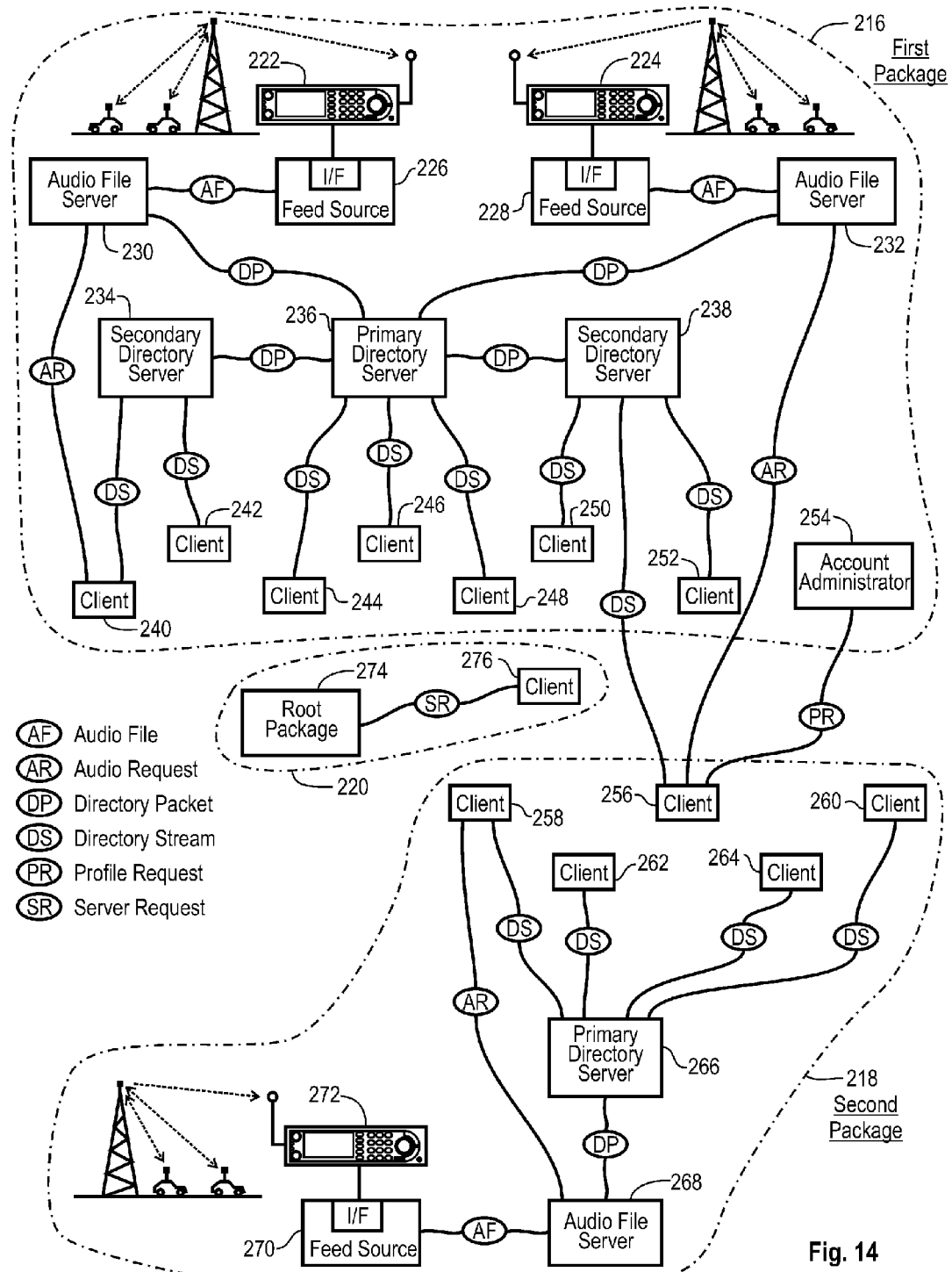
FIG. 14 is a system diagram according to an illustrative embodiment of the present invention.

Reference is directed to FIG. 14, which is an integrated multiple package system diagram according to an illustrative embodiment of the present invention. FIG. 14 comprises three package, all presented in functional block diagram form. The first package 216 includes multiple audio sources, multiple directory servers and an account administrator. The second package 218 includes a single audio source and a single directory server. The third package is a root package 274. The many client terminals are assigned to either the first package 216 or the second package 218, but are also enabled to roam between the packages, with certain permissions. The root package 274 is accessible through the host network (not illustrated) and contains network address listings for the various servers and processes that comprise the packages in FIG. 14. The client terminals are preprogrammed with the address of the root package 274 so that each client terminal can contact the root package 274 for package assignment and address information. For example, client terminal 276 after initial power-up and before it has received any package assignment, sends a server request to the root package 274, requesting assignment to a package. The root package 274 responds by providing the contact address from the account administrator 254 in the first package 216. The client terminal 276 is thusly enabled to contact the account administrator 254 and logon to the second package 216, request profiles and directory stream connection, and so forth.

The first package 216 in FIG. 14 includes a first radio scanner 222 and a second radio scanner 224 that monitor intermittent radio broadcasts of respective trunked radio systems, such as the police and the fire departments in the local community. A first feed source 226 is interfaced to the first radio scanner 222, and couples discrete audio files to a first audio files server 230. Similarly, the second radio scanner 224 is interfaced to a second feed source 228 that couples discrete audio files to a second audio file server 232. Both audio file servers 230, 232 couple directory packets corresponding to the discrete audio files to a primary directory server 236, which serves as the injection point into the directory servers and directory stream distribution processes. The primary directory server assembles the directory packets it receives into directory streams, which are sent to the plural client terminals 244, 246, 248 over the network resources. Additionally, the primary directory server 236 sends copies of the directory packets to a first secondary directory server 234 and a second secondary directory server 238. The first secondary directory server 234 assembles directory streams and couples them to plural client terminals 240, 242. The second secondary directory server 238 assembles directory streams and couples them to plural client terminals 250, 252. From time to time, a client terminals 240 selects a directory packet of interest and decides to make an audio request to the network address of the stored audio content, which is in the first audio file server 230 in this example. The first audio file server responds by delivering the requested audio content to the requesting client terminal 240, which can then reproduce the audio content for the user. The first package also includes the aforementioned account administrator, which contains the listing of client terminal identities, client terminal reception profiles, process addresses, and certain filters and security parameters.

The second package 218 in FIG. 14 consists of a radio scanner that monitors local broadcast radio system, and that is interfaced to a feed source 270, which couples discrete audio files to an audio file server 268. The audio file server 268 generates directory packet corresponding to the discrete audio files and forwards the directory packets to a primary directory server 266. The primary directory server assembles plural directory packets into directory streams that are forwarded to plural client terminals 258, 262, 264. From time to time, a client terminals 258 selects a directory packet of interest and decides to make an audio request to the network address of the stored audio content, which is in the audio file server 268. The audio file server 268 responds by delivering the requested audio content to the requesting client terminal 258, which can then reproduce the audio content for the user.

In FIG. 14, client terminal 256 is assigned to the second package 218. However, the client terminal is enabled to contact the account administrator 254 of the first package 216 and make a request for a profile. This action temporarily enables the client terminal 256 to receive a directory stream from the second secondary directory server 238 in the first package 216. When a directory packet of interest is received, the client terminal then makes an audio request to the second audio file server 232 in the first package 216, which responds by providing the requested audio content to the client terminal 256. This example illustrates the ability of client terminals to "roam" to packages other than their assigned "home" package.

As has been discussed, the several packages in a NetScanner system are comprised of various servers or processors, communication facilities coupled to a network, database and memory arrangements, and software processes, all of which are arranged to form the illustrative embodiment systems and methods. This leads to a discussion of the various server process roles. An illustrative embodiment simple package contains a single process, which is a separately running instance of the NetScanner server software. More complex illustrative embodiment packages contain a group of processes running cooperatively to provide greater performance than would be possible with a single process. Every running process has a designated role, specifying what kinds of functions are fulfilled by that process within the overall package. Every process is associated with a network address, which is used for inter-process communications, and sometimes for client to server communications. The optimum structure of any package, including the number, roles and relationships of processes within the package, depends on the package's overall functional requirements. In an illustrative embodiment, a system configuration file, named "processes.txt" lists all NetScanner processes, and provides the domain name for its designated server, port address on that server, package name, and role type, using a symbolic code. For each of the processor roles, which description of each follows, an appropriate symbolic code for the illustrative embodiment is given.

The gateway server process role, which is denoted with a "-g" naming suffix, is a manager of all other NetScanner processes running on a single physical server. A gateway process is only used in administrative packages, where it also fulfills the functions of a "registrar". There is exactly one gateway process on each physical server. The primary function of a gateway process is to send, at regular intervals, a "ping" message to each running process on physical server, to trigger various housekeeping tasks. By watching for an acknowledgement to these pings, the gateway process verifies that other processes are responsive and healthy. When problems are detected, a summary, which may be as simple as an error flag or count, is provided to the root node, to help direct the NetScanner system administrator to any potential performance issue. In the one illustrative embodiment, the gateway process sends ping messages to all local processes every 20 seconds.

The gateway process ordinarily holds in a blocked state, waiting for a remote socket connection. To initiate ping messages at regular intervals, a companion shell script is executed to trigger an appropriate HTTP request at regular intervals, giving the gateway an opportunity to execute periodic functions. When a ping is sent to a server, it triggers various events, potentially including a cascade of trace messages when a primary is pinged. To distribute this ping-triggered load with time, it is advantageous to send pings to various servers at a relatively even rate, instead of all at once. For this reason, a shell script wakes the gateway at intervals substantially shorter than the ping periodicity. Another function of the gateway is keeping track of free "extra processes" (discussed hereinafter) that can be assigned for use on the gateway's physical server, and automatically issuing the system commands to start or stop these extra processes as needed. In addition, the gateway process provides the system administrator a reliable gateway interface to administrative command and control functions on the server, including the ability to start and stop other running NetScanner processes on the same physical server.

The registrar server process role, which is denoted with a "-r" naming suffix, is the central manager for a given package. In general, the registrar is given those package commands that do not require knowledge of directory packets, and that can be quickly fulfilled so as to not detract from other responsibilities of the process. A package can have only one registrar process. The registrar is responsible for maintenance of the given package structure. This includes knowledge of all member processes, awareness of their current health and availability for new assignments, monitoring of intra-package connectivity, assignment of connection requests, both internal and external, to appropriate member processes, and load balancing between those member processes with a similar role. The registrar is also responsible for maintenance of client terminal user account information, for all client terminals with accounts at the given package. This includes authentication of NetScanner client terminal login requests, authentication of active NetScanner client terminals for other processes and packages, awareness of the identity of the directory streams to which these client terminals are connected, and exclusive write permissions to the data files containing a client terminal's user profiles. Naturally, these functions only apply if the given package has user accounts, and it should be noted that a transmit-only or administrative package would typically have no user accounts.

The primary server process role, which is denoted with a "-p" naming suffix, also referred to as a "primary directory server", is the entry point for all package content, such as directory packets or text messages. The primary directory server creates the directory stream, and writes the files used to fulfill directory history requests. Whenever a directory packet is rewritten, for example, advancing the relay counter, applying a timestamp, etc., this is done by the primary directory server when the packet is initially processed. The product of the primary directory server is considered authoritative for defining the content of a package. A package can have only one primary server process role. The primary directory server fulfills requests for content, including stream connections from client terminals or relay connections to other NetScanner processes. However, when a package also includes secondary directory server or extra processes, it is preferred that these other processes handle these requests. In general, the load on the primary directory server should be minimized, so that it may focus on its main responsibility of receiving incoming content.

The secondary server process role, which is demoted with a "-s" naming suffix, also referred to as a "secondary directory server", is a mirror of the primary directory server for distribution of package content. The secondary directory server receives content via a relay connection, from the primary directory server, or another secondary directory server, and is available for fulfilling requests for this content via directory stream or directory relay. A package may contain any number of secondary directory servers, and since a secondary directory server never references files, there is no requirement that a secondary be co-located on the same physical server as any other NetScanner process.

The primary directory servers and secondary directory servers, in combination, form a content distribution tree for a package. The primary directory server forms the base of the tree, and content flows node-to-node through the tree until all secondary directory servers have received the content. Each secondary directory server has a single upstream connection, and the assignment process for inter-process connections ensures that there will be no infinite loops, where a process feeds content, possibly through intervening nodes, back to itself. In essence, the package content distribution tree forms a fully connected directed acyclic graph, under the direction of the package registrar. One benefit to a proliferation of secondary directory servers is that the total number of outgoing connections from the package can be increased, essentially without limit, to support whatever level of demand exists for its content. Since secondary directory servers can operate on different physical servers, the package can utilize the outgoing bandwidth capacity of a server farm, or other network scaling technology. If a package has no secondary process roles, then any requests for stream or relay connections will be directed to the primary process role.

The extra server process role, which is demoted with a "-e" naming suffix, is normally not assigned to any specific package, and is not running. If a package registrar determines that additional capacity is required, it requests the temporary assignment of an extra process to this package. The root and gateway packages govern a pool of extra processes, and make such assignments upon request. When an extra process is assigned to a package, the process is started running, and then behaves functionally like an additional secondary directory server within the package. However, the registrar only makes directory stream or directory relay assignments to an extra process when there are no other secondary directory servers available. Minimizing the load on an extra process can simplify the process of shutting it down when no longer required.

The historian server process role, which is demoted with a "-h" naming suffix has no regular tasks, and is available for certain requests that may require considerable time to fulfill. This allows other processes to shunt time-consuming requests to a process that can be tied up without adverse consequences. A package can have any number of historian processes. In a transmission package, the main function of a historian role is fulfilling client terminal requests for a directory history, a list of directory packets that were previously transmitted on the package directory stream. The request may specify a time range, or a starting time together with a direction for search, forward or backwards, and desired number of directory packets. The request may specify a selection filter, particularly useful when the client is 'holding' on a single channel and wants a list of transmissions on this particular channel only, although the concept evidently has more general applicability. An administrative filter is also applied, specifying what content may be provided, but subject to package administrator permissions, to this particular client terminal. To fulfill such requests, the historian process role must review files of packets that have been written by the primary directory server. Depending on the request, this may involve scanning numerous files, and therefore the process may be relatively slow. Since the historian process role must review files written by the primary directory server, both processes should be running on the same physical server.

In the case of an administrative package, the primary function of an historian process role is to receive user-generated audio, but without a SFTP connection and transfer process. This is done, for example, to receive "talknet" audio submissions from a NetScanner client terminal. In this application, the process is tied up for the entire duration of the recording process, as the client terminal uploads to the historian process role in real time during the audio recording process. As this may last for a significant duration, it is important to ensure that a sufficient number of historian process roles are available in certain administrative packages to support user-generated audio submissions. Note that such uploads are not directed to the package that is named in the channel code, and is most evidently connected with the transmission; they are directed to an administrative package, where the audio may be directly placed in a network-visible directory, such as when standard audio is obtained from remote feed sources. For this reason, a historian process role can be responsible for directory history requests at a transmission package or user-generated audio uploads at an administrative package, but a typical historian will not be responsible for both types of time-consuming functions.

The historian process role can be given other responsibilities, such as retrieval of profiles, or on-request creation of special profiles that are automatically generated from other information (e.g. 'source', as described below). However, such additional responsibilities should only be given to the historian if it is running on a physical server with access to any files necessary to fulfill the request. If a package has no historian, the registrar process, or, equivalently for administrative packages, gateway process, fulfills the functions that would otherwise be taken by a historian process role.

The file monitor server process role, which is demoted with a "-f" naming suffix, is applicable to administrative packages, and on physical servers hosting audio content. A file monitor process routinely checks for new audio files in a specific upload directory. New files can be placed in that directory by a historian, for user-submitted audio that is sent directly from a NetScanner client, or by a 'gather' shell script, which moves the content from an upload directory, where the content was sent via SFTP by a feed source. When the file monitor detects this new content, it places the content in an appropriate network-visible directory, creates a directory packet, and reports the content to the appropriate directory server, as specified by the feed source in the original uploaded audio filename.

The root server process role, which is demoted with a "-x" naming suffix, is unique in that the NetScanner system has just a single root process, in a special root package, named "_root", managing the entire NetScanner system in the illustrative embodiment. The root process sends "ping" messages, at regular intervals, to each gateway process. This lets root act like a "super-gateway" for monitoring the health of the NetScanner system, including detection of physical servers that have become unresponsive, and accumulation in one place of trouble reports gathered by the gateway processes. The root also manages the pool of extra servers, and when an extra server is requested, determines which physical server should be given this load.

The most visible function of the root process is acting as a central directory for the locations of other NetScanner processes, especially for NetScanner client terminals, for example when retrieving a profile or connecting to a directory stream. If a client terminal has no information regarding the Internet addresses for various packages throughout the NetScanner system, it will have the address of the root process, and can obtain the needed information from the root on request. However, in principle, this information can be provided by any NetScanner process, provided all physical servers have access to a reference file listing all NetScanner processes and their Internet addresses. Therefore, it is preferred that client terminals to direct such requests to their home registrar, a historian in the root package, or some other location in the system, so as to avoid a limitation in the root node's capacity for handling large volumes of requests across the system. However, by default, if a client terminal has been given no information about how to find any NetScanner package or process, for instance, through an applet frame, the root is the starting point.

The bootstrap server process role, which is demoted with a "-b" naming suffix can be started from a command line, and is not part of any other package. This process will provide administrative functions for starting and stopping other processes on the physical server, and is used to initially start processes running on that computer. It is intended as a temporary process, only active while in use by the system administrator.

The unified server process role, which is demoted with a "-u" naming suffix, is a special designation for a process that fulfills the functions of both registrar process and primary directory server, and in the absence of any historian processes in the package, those functions as well. This is typically used for small packages where transmission (directory stream) and account management (user account/profile) are commonly administered. It is also commonly used for management-side only packages, where there is no directory stream, so that the process serving as "primary" is well defined, even if it has no directory packet content.

NetScanner server processes capable of providing a directory stream, including the primary directory server, secondary directory server, and extra processes, are sometimes collectively referred to collectively as "directory servers." From the perspective of a NetScanner client terminal, these server types are indistinguishable, and fulfill the same function.

Now with regards to NetScanner package structure and configurations, an account management package for user account and client terminal profile management will typically consist of a single process to perform registrar functions, although it will typically be styled as a unified' process so that the target of any operations expecting a primary directory server is well-defined. This type of package can include a historian to assist with reading and delivering profiles, but that is generally not required.

A transmission package typically includes a registrar process used to supervise outgoing permissions and to manage package connections and structure, a primary directory server used to generate the directory stream, one or more historian processes used to support time-intensive directory history queries, and one or more secondary directory servers used to provide additional connection points in the case where there is significant demand for this content. Small transmission packages may omit the secondary directory servers, and even combine the registrar process and primary directory server functions into a single unified process. It is advisable to employ at least one historian process so that any time-consuming directory history requests have minimal impact on real time directory stream generation. However, in certain many circumstances the historian process can be omitted, thereby reducing the entire package to a single unified process.

In the illustrative embodiment, it is preferred to locate registrar, primary and historian processes for a single package on the same physical server, so that the historians can access files written by either the registrar or primary processes. In the case of a package with heavy traffic loads, most bandwidth will be associated with outgoing stream connections, which can be distributed with secondary directory servers placed on other physical servers. In variations on the illustrative embodiment, the registrar and primary processes can be located separately, and if desired, each may be given appropriately configured historian processes. In still another embodiment, selected secondary directory servers that are not co-located with the primary directory server can also record files of packets, so that co-located historian processes are available for handing directory history request, thereby reducing the load of historian processes on the server hosting the package primary process. Those skilled in the art will appreciate the great flexibility this architecture provides with respect to traffic management, time considerations, memory management, and system growth and scaling. An embodiment that combines transmission and account management functions will structurally look like a transmission package, as its configuration is well suited for supporting all functions related to managing user accounts and client terminal profiles.

Administrative packages typically include a gateway process to administer the physical server, a file monitor process used to detect content uploaded from feed sources, and several historians used to capture content uploaded from clients. If user-generated content, which is received directly from client terminals, is not ever directed to such a server, the historian processes can be omitted. If there is no audio content stored on this server, the package may be reduced to include only the gateway process.

NetScanner server processes may be started in any order. If any process is stopped and re-started, or a non-essential process is stopped, for example an historian, secondary or extra process, there is no need to reset any other process. If the package content distribution tree is disrupted, it will automatically reorganize itself, under the direction of the registrar process.

Interrupting processes, however, can cause undesirable side effects. For example, if the registrar is stopped, the tokens (discussed more fully hereinafter) for all client terminals with this home registrar will be lost, and these client terminals will receive authentication error messages and be required to log back into the system. If the primary is stopped, generation of the directory stream will be disrupted. Content with this package as the initial injection package may be lost while the primary is offline, as the feed monitor will find no primary process to which a directory packet may be transmitted. There may be other brief anomalies if a secondary or historian is taken offline, for the few seconds until the registrar is aware of the change, if users are directed to communicate with processes that are no longer operational. If desired, many of these issues may be avoided by preserving the state of certain tables in a file, for example tokens, identifying a fallback primary for a package where content is buffered or alternatively delivered into the distribution tree, or other similar variations on the package architecture. Thusly, system reliability and robustness can be augmented for critical applications of the NetScanner technology.

Audio content and its corresponding directory packet can be created or submitted from plural sources of plural types. A transmission package can have three primary sources for content. Two of these sources relate to original content, not previously reported in the NetScanner system. First, audio feed sources capture audio content from some external audio device and submit the audio content via SFTP to an audio file server, triggering injection of a new directory packet from a file monitor process to the package primary directory server. Second, NetScanner client terminal software, or other appropriately configured software, captures audio (e.g. from a microphone) and transmits the contents to a NetScanner server process for storage on an audio file server, again triggering injection of a new directory packet from a file monitor process to the package primary.

The third source for audio content is where a directory packets is imported from another NetScanner package. In this case, the downstream package receives and re-distributes directory packets sent from an upstream package. In effect, the downstream package selects channels that are carried by an upstream source, and integrates those channels into its own bundle of channel offerings. Other sources referencing audio content are contemplated in certain illustrative embodiments. Packets can be injected through a script, or other automated process, at regular intervals, at specific preplanned times, or in response to an external event such as an e-mail trigger to a NetScanner package. The audio content would be prerecorded, or attached with a triggering message. Preplanned directory packets, for instance, may be used as a reminder service, alarm, or audio clock.

A home package is of notable importance the illustrative embodiment of the NetScanner systems and methods. A home package is the package where an individual client terminal's "user" account is hosted. Another notable package type designation is the source package. A source package is the package from which a client terminal obtains directory packets, typically as specified in a content profile. Depending on the circumstances, these packages may be the same, or they may be different.

Client terminal profiles, also referred to as user profiles or simply "profiles", have been briefly mentioned hereinbefore. A profile is used to configure the content and appearance of the NetScanner client terminal while that particular profile is presently loaded in the client terminal. While using the client terminal, the user can select and change its present profile at any time. This is analogous to changing web pages while using a standard web browser. If a profile contains links, the user can select those links to go to (i.e. load) another specified profile. Alternatively, the client terminal also presents an address bar showing the address of the current profile within the NetScanner system, and the user can enter and select any other profile to be the presently active profile by simply typing its address into the address bar.

Reference is directed to FIG. 15, which is an exemplary display screen-shot 300 from a client terminal user interface in an illustrative embodiment of the present invention. The format and layout of the screen 300 are largely determined by the profile presently loaded in the client terminal. The username and current package being received upper in the upper portion 302 of the display 300. Information about the currently playing audio file, and its corresponding channel appear in the main display window 304. In this example, this includes the textural name of the current channel 320, the radio frequency of that channel 324 in megahertz, the date and time of the audio clip capture 322, and the duration 326 of the presently playing audio clip. A graphical audio VU meter 308 indicates audio playback levels. A set of function actuators 306 enable the user to select the Pause, Replay, Skip, Reverse, and More additional functions. The time slider box 312 enables the user to move through time, both forward and back to selected the desired audio content presently being reproduced. A profile address entry box 310 allows the user to navigate to other packages and profiles at will. Certain actuators 314 enhance this navigation capability, similar to Internet browser navigation capabilities. The plural banks of channels 316 of the presently selected profile are presented for quick selection by the user. Note that the color scheme of the banks us used to indicate the presently active bank 318.

A profile is stored in a package located on the host network of the illustrative embodiment NetScanner system, and is located by an address that has the form "package/username/profile", where each field is limited to eight alphanumeric characters. If a user omits the profile name, the name "index" is used. If the user enters only the package name, omitting both username and profile, then "default/index" is assumed. This enables a package administrator define the appearance of the profile seen by users who enter just the package name into the address bar, and provides a suitable operating environment until such time as a user elects to use a more particular profile. Profiles are stored as a text file in a user account's directory, and may only be modified by the profile owner.

Every profile in the illustrative embodiment comprises three major elements. The first major element is the source package. The profile defines a specific source package, which is the package from which the client terminal obtains directory packets by default. This determines the set of channels that are initially available for reception on this profile. The second major element is a default set of user programmable "banks." Each bank is set by the profile author to a specific function. The client terminal software of the illustrative embodiment supports up to 500 active banks, although typically only 12 to 120 will be shown on the screen at one time. The specific number of banks displayed depends on the profile layout and the size of the client terminal display. The profile author defines a descriptive name for each bank, which includes up to 12 alphanumeric characters.

Typically, banks are associated by the profile author with a filter, and individual banks can be turned on and off by the user of the client terminal. Audio content having a channel code that matches the filter of an active bank will be requested, downloaded and reproduced by the client terminal. The particular channels that will be received by a bank depend on the intersection of the filter rule with the set of channels carried on the directory stream specified by the profile. This can be a single channel, a group of related channels, or even all channels carried by the package. Alternatively, banks can be defined by the profile author as links to other profiles, in which case the client user selects the link to load the indicated profile.

The third major element of a profile is the definition of the client terminal user interface display. Each profile contains layout information, defining the appearance, configuration, background image, and color scheme for the client terminal display. These values are set by the author of the profile, and are applied for anyone who loads the profile. Layout information is carried with the profile, not with the client terminal's user account. This is because different profiles are best viewed with different numbers of bank buttons, and the profile author is generally given discretion to select and define the preferred presentation for the profile that is created. When a profile is loaded, if the layout cannot fit on the display, the NetScanner client terminal will downgrade the applied layout through a predetermined sequence until finding an alternative layout that fits on the terminal's display screen. The screen is generated as an image file with each iteration, with drawing of text, shapes and other elements into an image of the designated size for display.

In the illustrative embodiment, profiles are primarily used as reception panels, giving the client terminal's user access to a group of related channels carried on a NetScanner package. However, profiles are additionally used as directories, with lists of interesting profiles indexed in various categories. For example, there may be collections of profiles designed for guiding a NetScanner user to well-designed profiles in any portion of the world. An entry page provides links for each state or country, each link leading to a page that provides greater geographic resolution, leading to pages of links to external profiles created by system users that have been tested and observed to provide quality content. Similar navigation trees segregate content by function type on the opening screen, with following pages either dividing functions more narrowly, or moving to geographic categories. As is typical for webpage directories, there are many ways to organize hierarchal link directories, so users are free to generate their own link pages for popular or reviewed content. Agencies submitting content into the NetScanner system also generate link pages for browsing to related agencies, or other recommended content.

A profile contains plural banks, which are displayed on the client terminal user display. The visual appearance of banks is highly variable, depending on the profile's specified layout and color scheme. In general, color and/or brightness is used to differentiate between several operational states of banks programmed with reception filters. Banks may be shown as a single panel with a background and text color, or a multi-panel design with a background color, a 'bar' color covering part of the design, and a text color. Other variations will be apparent to those skilled in the art, including buttons that appear to change shape when pressed. The two primary states of each bank is "on" and "off", which indicates whether directory packets are compared against this bank's reception filter to determine whether the indicated audio content should be played. "Off" is familiarly expressed as red, and "on" as green. In an alternative embodiment, the function code is read from the reception filter to select a descriptive color for "on" banks. One example being red for fire departments, blue for police departments, in which case "off" banks are shown in black.

In addition to "on" and "off", there are several alternative states available for banks. In a "hold" state, the one bank is selected as the exclusive reception filter, meaning that the reception filters for all other banks are suppressed, and these banks are shown visually as inactive. In a "priority" state, new content matching the "priority" bank is given priority over older content on other active banks, even if the NetScanner client is catching up on queued transmissions awaiting playback. In an "informational" state, the bank is considered inactive, meaning the reception filter is not applied against directory packets to select audio content, but during playback the match is tested, and the bank is illuminated when there is a match. This is useful for visually showing a transmission's membership in a class of channels, without causing reception of all channels in that class as a side-effect. For all these states, variations in color or brightness are selected to give a clear indication to the user of a bank's current state.

Several profile names have special meaning within the NetScanner system. For every client terminal username, "source" and "folder" are automatically generated by the NetScanner system, which do not correspond to any saved or user-generated profile, and "index" has special restricted functions. In addition, for username "admin" in every package, there are several profiles with special functions related to package administration: "accounts", "shared", "import", "geoentry", "combos", "keylist", "visitor", "relay" and "keyshare".

Only links are allowed on the index page, and the user is not allowed to place any banks on this profile that specify channels for reception. When viewing any profile in the NetScanner system, the user has the option to bookmark the profile. This places a link on the user's "index" page. In addition, for every account, links to the special profiles within that account are automatically placed on the account's "index" profile, except that there is no link to "index", since the user when viewing this profile is already there. The user cannot delete these automatically placed links from "index". Also, for every client terminal user account on a package, any links found in "admin/shared" are automatically placed on the user's "index" page. This lets a package administrator create, or find elsewhere, useful profiles of interest to users on that package, and place links to this content on users' "index" page. The profile named "folder" is automatically generated by the system, and provides links to every profile stored in the client terminal's user account.

The profile named "source" is automatically generated by the system, and provides banks for every channel carried on the package. Channels that a user is not allowed to receive, under security restrictions set by the package administrator, are excluded from this list. The "source" profile also includes any reception banks found in the "admin/combos" profile, intended as a way for the package administrator to define useful combinations of channels for easy reference by package users, or by other NetScanner users programming a profile that monitors this package's directory stream. The "source" profile also includes any links found on the user's index page, including bookmarks and content automatically imported from "admin/shared". Note that the utility of a user's "source" is diminished if the package is not used for transmission, since in that case, there will be no channels carried on the user's home package, and hence no channels in the source profile. However, the administrator of such a package may provide links to the source profiles of other transmission packages through "admin/shared".

There is a need to control access to information stored and transferred within the NetScanner system. The approach to security administration in the illustrative embodiment does not employ security restrictions that block client terminal access to any profile in the entire NetScanner system. Conversely, secure content is restricted by blocking the delivery of directory packets, so that the client terminals are not aware of any transmissions on restricted channels. When a client terminal connects to a directory stream, the directory server provides the client with a formal filter that is administratively applied by the server to directory stream content, when writing to this particular stream. When the package has no security restrictions for this client terminal, then the filter will be fully inclusive, for example, "?", the single-character "everything matches" wildcard filter. If there is secure content prohibited to this client terminal, then the filter will be more complex, or possibly exclude everything.

In the case of typical banks, with filters specifying matching channel content, such information is not displayed unless there exists at least one channel code within the bank's programmed filter that should be passed by the server's administrative filter. If all content within the scope of a bank's filter is blocked by the server, then the bank itself is obscured on the NetScanner client terminal display. The bank's descriptive name is also not shown, and the bank itself is shown in a neutral gray color. This scheme suppresses information about the secure content, so the user of the client terminal is not even given a description of what is being blocked.

At the time a profile is initially loaded, the client terminal has no information regarding what content may be passed by the server. Until the client terminal receives the administrative filter, which occurs shortly after a directory stream connection is established to a directory server in the indicated package, the client terminal presumes that no content will be allowed, and so all banks corresponding to channel content are shown in this neutral gray. Bank names, and normal appearance, are only presented when the client has verified that there may be allowed content within the filters programmed onto those banks. Banks programmed as links re always displayed, as the client has no information regarding the programming of the target profile, and there are no restrictions against navigating to any profile in the NetScanner system.

Attention is now directed to the procedures for creating profiles. The user of a client terminal can create a new profile by going to the "folders" profile in his account, selecting a "programming" button, and choosing an option to create a new profile. The NetScanner client terminal asks for the name of the profile, which is the last field of the address, as package and username are defined, and then loads this address. If the profile already has content, this is equivalent to jumping to the profile. Otherwise, the profile is blank. In either case, the user will press "programming" to begin programming this profile. If it is a new profile, then when programming the first bank position, the client terminal asks the user for the name of the directory stream that should be monitored for content. A "source" page from the indicated package is then offered as a set of options for programming banks. When browsing the NetScanner system, the user can save any profile into his account. If the user wants to make modifications to an existing profile, regardless of whether or not he authored the existing profile, this is a suitable way to start the new profile.

The illustrative embodiment includes a special type of profile, called a "playlist", that has a significantly different function than an ordinary profile. The function of a playlist profile is conceptually similar to a playlist in a music player (e.g. a "M3U" file), in that it defines a sequence of audio files for playback. In a playlist, the NetScanner client terminal does not make a stream connection to obtain directory packets, and there is no real-time audio content. Instead, the profile author specifies a specific group of directory packets, corresponding to specific audio content, and saves a profile that encapsulates the ordinary profile elements, the bank definitions, layout control, and name of the package that issues security permissions, together with the selected set of directory packets. After reading this playlist profile, the NetScanner client terminal has a complete directory index of all relevant audio content.

For the purpose of maintaining the integrity of information security, the originating package, where the authoring user originally captured the directory packets, is consulted before a NetScanner client terminal is provided with the directory packets in a playlist profile. The originating package provides an administrative filter appropriate to this user, which indicates what content would be allowed to this user in a real-time directory stream, and the server process providing the playlist profile then only releases directory packets to the client if they match this administrative filter. When using NetScanner to receive content on an ordinary profile, the user creates a playlist by entering a "playlist generation" mode. All audio content played to completion while in this mode, and not skipped during playback, is entered into the new playlist. Alternatively, the user may selectively enter individual transmissions, pressing a "playlist" button to add the most recently played transmission to the playlist. When complete, the user may trim the playlist, switching to an offline state where the playlist contents are presented in isolation, and no new directory packets are received. At this point, the user has the option of saving the playlist as a profile. When this is done, any reception banks matching no transmissions in the selected content are automatically deleted from the saved playlist profile, so as to reduce clutter unrelated to the profile's limited contents.

The illustrative embodiment NetScanner systems and methods are designed to advantageously utilize the time relationship of information, particularly considering the real-time dissemination of information and the potential overlap of real time transmissions, the natural desire to review information in time-ordered fashion, and the need to review historical information in proper time sequence. In the NetScanner client terminal playback system, audio files are played in time ordered sequence, even if the original content was captured at the same time, for instance, at different feed sources, simultaneously monitoring different radio frequency broadcast channels. Unlike traditional radio scanning systems, no content is lost due to simultaneous broadcast. Since playback is not fixed to real time, it is necessary for the client to keep track of the current playback point in the sequence of transmissions carried on a directory stream, so that it moves sequentially through transmissions during playback.

The NetScanner client terminal routinely applies an algorithm to determine what audio content is to be next played, given the state of the NetScanner client terminal. The state includes the scan and priority indices, if not in a hold mode, or the hold index, if in a hold mode. The state also includes specification of the leading time-edge of current playback within the sequential ordering of content carried by the source package. For selected banks, the requested mode of reception (e.g. standard, priority or scan), determining which banks are evaluated in conjunction with each leading time-edge index, and for these selected banks, the filter in the bank definition as programmed, which specifies what content carried by the source package is currently selected for reception.

If a directory packet matches the filter of any bank in a certain reception mode, scan, priority or hold, then the directory packet is said to match the filter of that mode (e.g. the "priority filter"). In a hold state, where reception is limited to directory packets matching a single selected filter, the algorithm seeks the first directory packet following the hold index that matches this hold filter. Otherwise, in normal reception, the algorithm first searches for directory packets matching the priority filter, and if none is found, searches for directory packets matching the scan filter. If a directory packet matches both the scan and priority filters, which is possible if the transmission's channel code falls within the filter scope of two selected banks, where one bank is selected for priority reception, and the other is selected for scan reception, then the packet is deemed to match the priority filter but not the scan filter. This prevents double-playing of the transmission, as could happen if the priority index encounters the transmission, and thereafter, without user action, the scan index passes through the same point.

During operation in each mode, if it is determined that no directory packets match the corresponding filter between the index and the most recent directory packet carried on the directory stream, then the index is advanced to this last packet. In effect, the time mark for that mode's reception is caught up to the present time, and there is no need to evaluate earlier packets for that mode. Similarly, if it is determined that no directory packets match the corresponding filter between the index and some subsequent directory packet, which does match the filter, then the index is advanced to this matching packet. This "what next?" algorithm is applied when audio is playing, and if the indicated content has not already been downloaded and placed in local memory, then the process of downloading the audio file is initiated. In this way, the network download of subsequent transmission is conducted in parallel with audio playback of a current transmission. This "what next?" algorithm is applied when audio is not playing, and the indicated content has not been buffered, then a request for downloading that content is initiated. In both cases, if a thread managing audio downloads is busy because it is currently downloading content, then this download request is suppressed. If this "what next?" algorithm is applied when audio is not playing, and the indicated content has already been buffered in local memory, then audio playback is initiated. In this case, the index with a mode filter matching this transmission is advanced, so that subsequent applications of the algorithm will search for subsequent content to select for playback.

When a client terminal is searching for directory packets matching mode filters, the client terminal's immediate resource is its own directory index, which is an ordered list of directory packets that have been received from the source package. Without resource limitations, this would be a complete list of all transmissions for which audio content is retained on the NetScanner audio file servers. However, except when using a playlist profile, where the universe of available transmissions has been narrowly defined by the profile author as a fixed set, or when operating under a user account configuration that precludes "go back" reception of transmissions reported more than a short time before the present, it is generally impractical for the client to store a complete list of available directory packets in memory at the same time.

As a general rule in the illustrative embodiment, a client terminal will have complete knowledge of directory packets within certain portions of the source package ordered content sequence, within user permissions. However, packets outside of user permissions will be ignored. For example, if the client terminal connects to a directory stream, and preserves all received packets in its directory index, then the client terminal will have complete knowledge from the time stamp of the first received packet up until "real time", and, until a new packet is received, there will be nothing after the last received packet that could be considered for playback. Similarly, if the client terminal frees memory by deleting the earliest-received packets from the directory stream, this period of complete knowledge will begin at the time stamp of the first preserved packet.

The client terminal can always remember the "trailing edge" of this period of stream, fed complete knowledge that extends to the present time. The client terminal calls this interval a "time window", and the beginning time is termed the "streamside" time boundary, and everything after that time is known, due to content received on the directory stream. More generally, a "time window" is any interval, in the source package content ordering, where the client has complete knowledge of all directory packets in the interval.

In the illustrative embodiment, in the case where the aforementioned "what next?" algorithm attempts to scan into a period outside of all directory index time windows, then the client terminal must populate the directory index with directory packets that cover the desired period. This happens, for example, if the user moves a time index into the past, in which case the required period will begin at the indicated time. Alternatively, if a mode index has been moving through a directory index time window that ends before the present time, the required period will start at the end of this existing time window. To populate the directory index, the client asks the package for a "directory history" starting at this required time, usually with a maximum number of packets specified, in order to keep the received data within the client terminals' memory capacity, and to prevent a long network transaction that could be caused by acquiring more data than is functionally useful. As packets are received in response, a new "time window" is generated with complete directory packet knowledge, extending from the starting time of the "directory history" request to the last received packet in this "directory history" server response. When responding to a directory history request, the interval scanned for packets by the directory server may extend beyond the last packet returned to the client. For example, there may be no packets between the last reported packet and the present time, or a server search limit may be reached before the next packet is located. Since the directory history response is a complete record of packets over the entire interval searched by the directory server, this interval is reported by the client terminal, and is used as a basis for updating the directory index time window endpoint.

The aforementioned time window concept in the illustrative embodiment is managed with certain system capacity and memory constraints. A client terminal will have limited memory resources for storing a directory index. Therefore, when acquiring new content, through either a directory history request, or reception of a directory stream, the client terminal memory will gradually fill and so the client terminal must remove content from time to time in order to make space available. The client terminal of the illustrative embodiment maintains three "time windows" intervals with complete knowledge of directory packets on the source package. One window, referred to as the "stream window", is associated with the directory stream, and has a starting time called the "streamside", and by definition extends to the present time. A second window, referred to as the "scan window", is associated with the scan index, and a third window, referred to as the "priority window", is associated with the priority index.

While a client terminal is receiving content from a directory stream, if the number of packets within the "stream window" exceeds a predetermined limit, then the earliest packets in this window are deleted from the directory index, and the leading edge of the stream window is advanced to the first retained packet in the original window interval. This process has no side-effects concerning the completeness of packet knowledge within the scan and priority time window intervals, because the endpoint of these other windows is never advanced beyond the starting point of the stream window, that is, the scan and priority windows are not allowed to overlap with the stream window.

Another time management scenario is where the client terminal is receiving content from a directory history request, where the request was triggered by an index moving outside its associated time window. For example, if the "what next?" process needs to compare packets from a certain time against the scan filter, but that time is outside all time windows, then by definition the scan index is moving outside the scan window. When this happens, the relevant window interval is erased, that is the endpoint values and not the packets, and the reset to the actual interval scanned by the server in response to the directory history request. If these new and old window intervals are adjacent, it may be advantageous to retain some margin around this boundary, so if the user moves the index back and forth around the boundary time, this action stays within the preserved time window. The directory index is scanned, and directory packets outside all time windows are discarded. Note that the scan and priority windows can overlap, so erasing a window interval does not imply that all packets within that interval will necessarily be discarded.

In the illustrative embodiment of the NetScanner system, two of the indices, scan and priority, have associated time windows, but the third index, hold, does not. As the hold index is moved through time, it may fall outside the recorded time windows, triggering a directory history request. For efficiency, the hold mode borrows the priority time window. Under normal circumstances, the priority index will be very close to real time, and will likely fall within the stream time window. Therefore, the priority index often represents unused directory packet storage capacity. Further, while in hold mode, the scan and priority indices are ignored, and so the contents of the priority window, even if the index falls before the stream window, are not immediately necessary. For these reasons, the priority window is deemed expendable while in hold mode. When a directory history request is initiated due to the hold index, the priority window is erased, and replaced in the normal fashion with new values based on the server's search interval.

Under certain circumstances, a directory history request will produce directory packets reflecting audio content on all channels carried by the source package. In a hold mode, this response is unnecessarily broad in scope. If the hold filter is narrow, such as for a single channel, or small number of channels, then only a small fraction of the directory packets carried by the source package will be of interest. If transmissions within the hold filter are infrequent, then the client terminal may need to initiate history requests very frequently to find additional audio content, slowing down client performance and loading the server. Therefore, in hold mode, the client terminal sends the hold filter to the server, as part of a directory history request. The server will only return directory packets matching the filter. As a result, a single directory history response may create a wider time window, including a reasonable number of transmissions of interest to the user. Although the resulting time window interval will contain a complete record of directory packets matching the hold filter, it will not contain a complete record of directory packets on the source package. Therefore, when exiting hold mode, the client erases the priority window interval values, so as to avoid a false indication of a complete record during this interval.

A similar method for improving the "hit rate" of recorded packets is applied outside hold mode, for instance sending a scan filter along with a directory history request for populating a new scan window interval. However, the validity of the window interval would be lost whenever the user places a new bank into scan mode, as there is the possibility of matching content outside the filter used for the directory history request. Therefore, to avoid the prospect of directory history requests being initiated when the user changes bank selections during normal reception modes, it is preferred to use an unrestricted filter when fetching directory history content in response to the scan or priority indices moving outside known time windows.

The client terminal in the illustrative embodiment further implements a "cadence mode" of operation. In "cadence mode", the client terminal determines a "cadence offset" time offset between a directory packet timestamp and system clock time. Then, when the client terminal determines what audio content to play next, the playback is postponed until the offset between that directory packet timestamp and the system clock is equal to, or greater than, the cadence offset. This effectively inserts silent periods between successive audio content, approximately scaled to reflect the actual time between transmissions, while also preserving the system's capacity for taking transmissions that were actually simultaneous and playing them sequentially.

The client terminal of the illustrative embodiment further implements an "export mode." In "export mode", selected audio content is exported to a WAV file on the client terminal's local computer. If a sequence of transmissions is selected, a short silent gap is interposed between transmissions as a separator.

In the illustrative embodiment NetScanner systems and methods, every client terminal user account is hosted at a specific package. The package administrator creates the user account, can establish certain permissions describing the class of user through the use of "keys" (discussed hereinafter), and may delete user accounts. The package name forms part of the user's full username (e.g. username@package). The specific package in this arrangement is called the user's "home package", and the package registrar that is responsible for account validation is called the "home registrar".

The illustrative embodiment of the present invention contemplates plural service levels for client terminal user accounts. In particular, a user account can operate at one of four service levels; Advanced, Standard, Basic, and Fixed. A package configuration file, listing all accounts in a package, lists a desired service level for each account. Another system issued configuration file specifies the highest service level allowed globally to any users of a package. The actual service level for an account will be the lower of these two values. Users operating at the Advanced level have access to all features of the NetScanner client. Certain specialized features are disabled for Standard level users, such as playlist generation, audio exporting, and cadence mode. However, in Standard mode, the client terminal retains most of its functionality. In Basic mode, the ability to create profiles is removed, so the user must rely on existing profiles for receiving content. The ability to create bookmarks, and select a homepage, is left undisturbed. In Fixed mode, the ability to directly enter a NetScanner profile address in the address bar is removed, so the user is effectively restricted to profiles that can be reached by clicking links from the homepage. With a properly designed package site, this allows for accounts with highly restricted access to specific content.

As a separate parameter in the illustrative embodiment, a user account is issued a maximum "go back" time, indicating the maximum distance into the past that the user is allowed to navigate. Ordinarily, a user may receive any content that is still present in NetScanner's online audio storage repository. If the "go back" time is limited, content over the indicated horizon will be unavailable. As with service level, a maximum "go back" time is specified for each user account, and also globally for a package. The shorter of these two times will be applied to the account.

The illustrative embodiment systems and methods include a particular client terminal user account referred to as a "published account." In the case of a "published account", multiple users simultaneously log into the NetScanner system with the same username of the published user account. The service level is automatically set to "Fixed", so users can only navigate to content linked from the published account's homepage. Duplicate logins are not normally allowed in the NetScanner system. When users log into a published account, each client is actually issued a distinct username, based on the actual account name. For example, if a user logs in as "demo@package", and this is a published account, the client may be issued a new temporary username such as "demo*7@package". This arrangement preserves the principle of a unique username for all clients, useful since username is applied as a key when managing connections. The client at the temporary username will be issued all the same permissions and restrictions as would be expected for the actual login username for the published account.

A central principle of the illustrative embodiment NetScanner system is that information provided by a client terminal is presumed to be untrustworthy, since it would be possible for anyone on the Internet to forge a request seemingly from a NetScanner client terminal, if the format were known to the sender. Each client terminal's username and password is only known to its home registrar. Especially since NetScanner processes may run on numerous physical servers, there is no guarantee that other processes could have access to this authentication information, even if this was desired. However, a client terminal will sometimes need to establish its identity with other processes. For example, when asking for a directory stream, the client must establish that it is a legitimate NetScanner client terminal. Further, so the server can establish the appropriate administrative filter, so that secure content is only provided to authorized client terminals, the server must have a way to establish which particular user is at the other end of the stream connection.

Security for client terminal authentication, so that a client terminal can authenticate its identity to NetScanner server processes after its initial login, is accomplished through action of the client terminal's home registrar, which issues a quasi-random "token" to the client terminal as part of the initial login exchange. The home registrar remembers that this token is associated with the client terminal's username. When the client terminal contacts any server process in the NetScanner system, and wants to establish its identity, it passes this token along with its username. To authenticate the request, the server then directly contact the client terminal's home registrar, and inquires if this client terminal presently holds the supplied token.

Tokens expire, and unless renewed at regular intervals, each token is cleared by the registrar after a timeout period. While a client terminal is connected to a directory stream, the server providing the stream routinely sends a report of the current connection to the client terminal's home registrar. This renews the token while the user is logged in, and this check also provides a secondary method for detecting unauthorized or duplicative stream connections. Expired tokens are purged as part of the housekeeping triggered by receipt of a ping message. To limit server loads associated with a particular customer or service, it is advantageous to limit the number of simultaneous connections associated with user accounts within a certain package namespace. Such limits may be implemented, for example, by setting a maximum number of tokens that may be concurrently valid at a package registrar for usernames authenticated by that registrar. In this case, requests for additional tokens would be rejected with a notice that the maximum number of connections has been reached. Tokens are ordinarily retained at the registrar for a timeout period after the client is no longer known to be connected to any stream. On occasion, a client is not connected to any directory stream, for instance when reviewing a prerecorded playlist (set of archival directory packets prepackaged as a user profile), or when viewing a profile referencing no active directory stream content but providing links to other profile pages. However, if there are limits on the number of simultaneous tokens, retention of unused tokens may unnecessarily restrict this scarce resource. Therefore, in certain illustrative embodiments, the registrar is configured to immediately remove tokens when the client disconnects from a stream. This is most useful for published accounts with a limited navigation range, among a set of pages all monitoring the same directory stream. To allow turnover of connected clients, it may be advantageous to establish a maximum connection time for clients using user accounts within a package namespace. Such limits may be implemented, for example, by recording the time of token generation at the registrar, deleting the token after a predetermined interval, and if that token is still in use for a stream connection, closing that connection while providing a notice that the maximum connection time has been reached.

Package administrators create user accounts by editing an administrative profile within the package named "admin/accounts". In this special bank, the bank names are interpreted as the names of valid user accounts on the package. If the package is also a transmission package, the filter associated with a bank is used to set an administrative filter, determining what content the user is allowed receive from the home package's directory stream. Some additional account information, such as the service level and user's homepage, are stored in other configuration files.

The illustrative embodiment of the NetScanner systems and methods employ a "key" system to control which client terminals can receive what content. As will be more fully described, it is useful to apply an associative layer of abstraction between the list of secure channels and the list of authorized users. For instance, all users who share a certain property, such as having common access to some class of content, are given a "key", and channels that should be accessible to users with that property are accessed through a "lock" that opens for any user with the corresponding key. In this way, the list of authorized users can be changed without any action by the administrator of secure channels, and the list of secure channels may be changed without any action by the administrator of authorized user accounts. This abstraction is particularly useful in package configurations where transmitted content and user accounts may be separately administered.

In the illustrative embodiment of the NetScanner system, a key is owned by a package, meaning that assignment to users is restricted by the administrator of that package, and the package registrar is ultimately responsible for governing who is authenticated to use the key. A key name has the form "package.code", where the first field is the name of the package owning the key, and the second field is a specific code identifying the particular key. On the transmit side, use of keys is entirely open and unrestricted. Any package administrator may associate a key with a filter, defining a group of channels carried on a given package that are automatically allowed to any NetScanner user who contacts this package's directory servers while holding the indicated key. The administrator may do this with any key, he does not need permission from the key owner. In essence, the administrator's action creates a lock over his own content matching the key, and has no effect on the security of any content behind an identical lock at another package. When issuing a key to a user account, permission from the key owner is required. In general, it is not presumed that the key and user account will reside in the same package. When a package owns a key, the administrator may issue the key to local user accounts, or entrust other package administrators with authority to similarly issue the key to user accounts hosted at their own packages, conceptually, this is "sharing" the key with other packages.

To use a key, for the purpose of issuance to users or for locking package content, a package administrator enters the key into the administrative profile at "admin/keylist". Each bank on this profile is interpreted as a key reference, where the name of the bank corresponds to the name of the key, and the bank filter is interpreted as a filter specifying what content is automatically granted to any connecting client terminal holding this key. To issue a key, either one locally owned, or acquired through a keyshare from the owning package, to a user account, the package administrator uses the "admin/accounts" screen, where the keys authorized for issuance will be presented as options alongside locally carried channels for the creation of a permissions filter. A client terminal's user keys are recorded in the filter associated with that username in the "admin/accounts" profile, with each bestowed key grammatically taking the place of an individual filter rule. Note that the structure of a recorded key would not match any content, and has no effect in itself as a filter rule, if it were evaluated as one. Having a key recorded does not, in and of itself, confer key holder privileges on the client terminal user. For keys recorded in this manner, if the package is not itself the owner of the key, the package registrar will routinely check with the registrar of the key owner, and inquire if the key has been shared with this package. Keyholder privileges are extended if the reply is affirmative, that is, the key owner validates that the local administrator is allowed to issue keys to local users. If keyshare permissions are revoked by a key owner, keyholder privileges are lost.

To share a key, the administrator of the package owning a key uses the special administrative profile "admin/keyshare". The names of banks on this profile are interpreted as the names of packages with whom locally owned keys are to be shared. The filter associated with this bank is composed entirely of keys as filter rules, where each key associated with a package is understood as shared with that package. Only the owner of a key is allowed to share the key with another package, and keyshare targets can issue the key to their users but are not permitted to share the key with other packages.

In the illustrative embodiment, the interpretation of keys for allowing transfer of content, the key-to-filter conversion, is done dynamically when the client terminal connects to a package. The client terminal's home registrar passes a list of the client terminal's valid issued keys to a package registrar constructing an administrative filter determining what content falls within the client terminal's permissions at that package. In a typical application, the user may be seeking a directory stream from a package, and the source package registrar must determine what content may be passed to this client terminal. The source package registrar searches its own keylist for reference to any keys held by the client terminal, and if matches are found, attaches the associated filter rules to the client terminal's filter. In effect, this grants permission to receive any content that is allowed to users holding any of the indicated keys. Placing content behind a "lock" does not ordinarily mean that the corresponding key is required for access to the content, only that the key grants access to the content. If the administrator has provided some other way to obtain permissions for the content, that will be honored. For example, an administrator may create two "locks", each granting access to a specific channel. A user may receive this channel if he holds either key, and the fact that two locks are provided for reaching the content does not mean that the user must hold both keys. Similarly, if the administrator gives a permissions filter that includes a channel, it will be provided, irrespective of whether a key would also have been sufficient to access the content.

In an exemplary application of the use of keys and locks, a class of professional NetScanner users such as firefighters are given blanket access to all content on a particular package. A corresponding professional association creates a specific key, for assignment only to firefighters, and shares the key with packages administered by accredited firefighting organizations. These organizations are entrusted to issue the key to firefighters who have client terminal accounts under their management. Then, a transmitting package associate this specific key with a filter rule authorizing the transmission of all content. When this is completed, any accredited firefighter will be granted full access to content on this package, without any special action required on the part of the package administrator. In this embodiment, package administrator does not need to know which client terminals are owned by firefighters. The package administrator does not even need to know what organizations are accredited as firefighting organizations. The abstraction layer provided by keys makes it possible for the two questions, "who is a firefighter?" and "what content should be accessible to firefighters?", to be answered separately by authorities with local knowledge about each question.

In another illustrative application of keys and locks, an agency seeks to share sensitive content with certain officers of their organization, and similar officers in a selected group of neighboring communities. The agency can mint their own key, and share the key with trusted administrators of packages in these neighboring communities. Then, each agency can manage the issuance of keys to the appropriate officers, and manage key issuance separately from content management, determining which channels are considered sensitive. Similar applications may be found within an agency. Since keys are translated to filters dynamically, a package administrator can change the content associated with a key in one place, the "keylist" filter, without any actions specific to each authorized user.

The illustrative embodiment systems and methods of the NetScanner technology also contemplate exclusionary filter rules. Certain filter rules are constructed with grammar indicating that the rule is to be inverted. In this case, the rule is interpreted as a negation, in that if a packet matches the rule, the packet is not transmitted. This is particularly useful when a package carries secure content, and the package administrator wants to mark certain channels as generally withheld, unless the user holds a key granting access. Similarly, this is useful when a user wants to exclude, or lock out, channels not of interest. In certain embodiments, the system administrator assigns a group of keys to an dummy account, or keyshare entry, marking content that should be excluded by default. When the package registrar determines an administrative filter for some outbound connection, the registrar also issues an "exclusion filter" that is evaluated at the same time. The exclusion filter is composed of a series of rules, one for each key in the general exclusion list that is not held by the connecting client terminal, with the remaining keys rewritten as the appropriate filters in accordance with the keylist configuration. As packets are transmitted to this client terminal, the server tests the packets against the client terminal's exclusion filter and does not send matching packets, even if they would otherwise match the client terminal's request filter and the package's administrative filter. In another embodiment, exclusion rules are directly constructed and associated with a client terminal, without use of keys.

As discussed hereinbefore, the NetScanner systems and methods of the present invention can be arranged into a network of processes and processors forming a distribution tree structure. The illustrative embodiment employs a "trace message" that is used to monitor the proper function and general "health" of a content distribution tree, and more generally to verify all network connections. Trace messages are regularly sent across the network paths of the tree structure for the distribution of the package's directory packets. An initial trace message is generated by the primary directory server, and it is sent to each of its relay and stream connections. Every NetScanner process, upon receiving a trace message from a process within its own package, repeats the same algorithm. As a result, the trace message is distributed to every NetScanner server and client that would otherwise currently receive directory packets transmitted by the primary directory server of the package. The original trace message is generated when the primary directory server receives a "ping" message from the physical server's gateway process. In the illustrative embodiment, this occurs every 20 seconds. Every time a trace message is received over a relay connection, an acknowledgement is sent to the upstream node, so processes are aware of the health of their outbound relay connections, including a measurement of round-trip network transfer time. Sending traces to a stream connection ensures a minimal level of stream activity, even if there is no active content being distributed to the client. The trace message also includes a server timestamp, to aid in synchronizing the server's time with the client user interface.

A package in the illustrative embodiment providing transmission of content includes a content distribution tree, that is a constellation of directory servers arranged as a fully connected directed acyclic graph, with the primary server located at the base of the tree. Any server in this tree is capable of fulfilling a connection request, which is, a directory stream connection from a client terminal, or a relay connection where new packets are individually transmitted to another directory server as discrete HTTP/HTTPS transactions. For purposes of assignment, a server requesting a relay connection is considered a client terminal, where the username is the Internet address and port of the server process. Each server is administratively assigned a maximum allocation for the number of concurrent stream targets, including both stream connections and relay destinations, based on the server's intended share of server resources (e.g. bandwidth, memory, and processor time). For some servers, the last portion of the allocation is reserved for relay targets only, as these may be used to seed connections to additional package servers. If server loads differ considerably for stream and relay connections, separate values can be given to each connection type when evaluating remaining server capacity.

During operation of the distribution tree, requests for new connections, stream or relay, are directed to the package registrar, which assigns a specific directory server in the content distribution tree to fulfill each individual request. The registrar's selection of directory server is based on several factors, and a scoring system is applied to make the selection. Only servers with remaining capacity are considered for assignment. Factors affecting a server process score include:

a) Server type (e.g. primary, secondary or extra). Secondary directory servers are preferred to extra nodes, which provide supplementary capacity, for use only as required. The primary directory server is given higher preference for relay connections, and lower preference for stream connections, as it is most efficient to have relay connections near the top of a content distribution tree, since these provide the seeds for growing the tree and allowing more stream connections.

b) Distance of the server node from the primary (e.g. the server's level in the tree). Nodes nearer the primary are preferred, for faster distribution, and less chance of disruption or lost content.

c) Location. For relay connections, it is preferred to obtain content from another process on the same physical computer, for speed and to minimize the network bandwidth for communications between computers.

d) Number of current assignments. For secondary processes, a low number is preferred, to distribute load. For extra processes, a high number is preferred, to concentrate users so the number of required extra processes may be minimized.

Whenever a server process within a package receives a "trace" or "ping" message, it sends an acknowledgement to the package registrar, so the registrar can monitor the health of package processes, and monitor content distribution tree network connectivity. If the registrar has not received both trace and ping acknowledgements within a reasonable time period, for example two minutes, the registrar concludes that the server process is not reliable for providing content at this time. While this error condition remains in effect, the package registrar will not make assignments to this process.

On occasion, a server process within the content distribution tree may become disconnected from its upstream node. This can happen if the upstream node is stopped or restarted, or if network trouble between the upstream and downstream nodes causes the upstream node to conclude that it is unable to communicate with the downstream node. This effectively disconnects a sub tree from the main tree, including the primary. The downstream node will detect that it has become disconnected, for example due to the lack of regularly expected trace messages, and seek a new assignment from the package registrar. To maintain the acyclic and fully connected properties, when making an assignment, the package registrar reviews the upstream path from every evaluated server, and excludes any server where the server requesting assignment is itself found in the reverse path from this node to the primary.

As discussed hereinbefore, for every username, only one assignment to a package directory server is allowed at a time. This prevents duplicate logins, where a username is used for concurrent connections at two separate client terminals, and also detects dropped stream connections where a server may not immediately notice if a client becomes disconnected from a directory stream, so the stream may linger past the loss of connectivity. To enforce this rule, when a package registrar receives a request for assignment, if that username is found in a registrar-maintained list of known assignments (i.e. username/server associations), then the server found in that list is notified that it should drop the connection to that username. This mechanism is applied for both stream and relay connections, which are generally equivalent from the perspective of assignment. If the target is a stream, then the server disconnecting the old stream will print a message reporting the reason, so that a connected client terminal can display a message indicating that the client is disconnected due to another login with the same username. Note that the assignment and token lists are different, and although both are maintained by registrar processes, they operate at different points in the NetScanner system. Assignments are a feature of transmission packages, while tokens are a feature of the receive-side, user account management packages. Both registrars are aware of currently connected users, but for different purposes. A main purpose of the token table is to give other processes a known place to validate the authenticity of a client, and a second purpose is to prevent concurrent connections to different packages. A main purpose of the assignment table is to provide load balancing within a content distribution tree, and ensure that it remains acyclic and fully connected.

When making an assignment, the package registrar reviews the total remaining capacity of package directory servers, and if this falls below a predetermined threshold, the registrar sends a request to the root node requesting assignment of an "extra" directory server process to the package. The root maintains a list of the number of extra processes available on various physical servers, as reported by their gateway processes, and passes the request to a gateway believed to have an unused extra process allocation. The gateway process can then execute an operating system command to start the extra process running, configured as a member of the package making the request for increased capacity. This new process will then report its existence to the package registrar, seek a relay connection so as to join the package content distribution tree, and is then available for new user assignments. If desired, the package registrar, or extra server process itself, may detect when an extra process is no longer required, and terminate the process so that that assignment slot is returned to the pool of extra processes available system wide for assignments to packages needing additional content distribution capacity.

In another aspect of the illustrative embodiment NetScanner systems and methods, a package is configured to delay distribution of content, so that it is not made available in real time, but only after a certain period has elapsed. In this embodiment, the primary directory server holds delayed packets in a table. At regular intervals, or whenever it receives a command, triggering a process opportunity between blocked periods waiting for a socket connection, the primary directory server scans the list for packets that have passed the embargo waiting period. These packets are then transmitted over any stream or relay connections, and written to the files storing content for fulfilling directory history requests. Delayed packets are issued a timestamp by the original processing time, which is the time when entered into the delay list, and not the stream delivery time, which is the time when pulled from the delay list.

In the illustrative embodiment, and in regards to security use of filters for outbound content, directory packets used to report content are only distributed to a client terminal if the client terminal has been authorized by the administrator of the source package to receive the content. Authorization is determined by application of an administrative filter discriminating the content allowed from the content not allowed. This filter is applied to each packet before transmission, and the packet is only sent to the client terminal if the channel code matches the permissions encoded in the administrative filter. For this screening process, the registrar of the source package is responsible for determining the administrative filter that is appropriate for particular client terminals requesting content from the package. If the username is explicitly listed, for instance in the package's "admin/accounts" profile, or in another list such as one giving per-user filters for users with other home packages, then the associated filter is applied. Alternatively, if the client terminal's home package is listed in the source package's administrative page "admin/visitor", as the name of a bank in this profile, then the filter associated with this entry is applied. This is a mechanism for giving blanket permissions to all users from a certain home package.

To further determine the appropriate administrative filter rules, the source registrar examines a list of keys supplied by the user's home registrar. For any reported key listed in "admin/keylist", to the previously determined rule, the source registrar appends the filter rules specified for that key.

The illustrative embodiment of the NetScanner systems and methods provide a means for enabling "subscriptions". Within a NetScanner directory server, a "subscription" is a list of packages from which the server is supposed to receive content. Each entry is associated with the address of an assigned upstream server node, a filter specifying what channels are requested, and a "last message received" timestamp indicating when the last content was received from the upstream server node. The "last message received" parameter is updated upon receipt of a trace message, or a directory packet, from the indicated package. For all secondary and extra server processes, the subscription table has a single entry, referencing its own package. In this case, the filter specifies that all content should be received, such as by using the wildcard filter "?". For primary server processes, the subscription list can be empty, or can include a list of remote packages from which the package administrator has requested the importation of directory packets, which is a mechanism for bringing audio content from one package onto another package.

Subscribed content is gathered by obtaining a relay connection from a directory server at the source package. This forwards all directory packets referencing audio content on specified channels. If the upstream server attempts to contact the target of a relay connection, for instance to send a packet or trace message, and the socket transaction is not successful, the sending server can remove the target from its list of current relay targets. This accommodates situations where the target has stopped, or network trouble precludes a connection. A downstream node will notice the absence of a functional relay connection, due to the absence of trace or packet messages fulfilling the subscription request. When a downstream node determines that it should reconnect to the upstream package, it transmit the timestamp of the last received packet, and upon connection the upstream package will transmit all matching packets recorded in the interval since this timestamp. This prevents loss of information at the downstream package due to missing transmissions in the event of a network or server problem temporarily preventing normal relay transmissions.

The illustrative embodiment of the NetScanner systems and methods provide for the importation of content from one package to another. To import content from another package, the downstream package administrator creates an "import filter", specifying what channel content is requested from the upstream package. To establish the inter-package feed, the primary process of the downstream package obtains an assignment from the upstream package registrar for a relay connection, which is a relay from a directory server in the upstream package to the primary process in the downstream package. While connected, the upstream package evaluates all of its directory packets as they are processed, and relays packets that match the downstream package's request filter, and also the upstream package's administrative filter governing relay transmissions to the downstream package, thereby excluding unauthorized content.

As viewed from the channel perspective, a channel is not restricted to a single package, it can be carried on any number of packages. While there is a unique "injection" package for each channel, which is the directory package where channel transmissions are reported by the file monitor, distribution rules may bring this channel onto any number of NetScanner packages. When a directory packet is imported, it is rewritten so that the timestamp provides the time when the primary directory server processed the packet, not the original time. This ensures that consecutive packets in a directory stream have consecutive timemarks, which is a property useful for maintenance of the "stream window" in the client's directory index. In an alternative, the timestamp can be left intact upon receipt.

Whenever a directory packet is received at a directory server, the server scans a list of recent packets, and compares the URL of the audio content reported by the new directory packet with the URL of audio content reported by the previously transmitted directory packet. If a match is found, the new directory packet is disregarded, and not transmitted to any relay or stream. This method prevents infinite loops, since the URL in a packet remains static regardless of the path history of the directory packet. The rule applies to both inter-package communications, such as import, and intra-package communications, such as relay connections within a content distribution tree.

There are a number of useful applications of the content importation capabilities of the NetScanner system. A first us of content importation is for security purposes. A package administrator may want to segregate higher security content from more ordinary content. One solution is to administer two packages. The higher security content would be injected to package A, while the ordinary content is injected to package B. Then, package A imports all content from package B. Now, the directory stream of package A will contain all content, both higher-security and ordinary channels, while package B will only contain the ordinary channels. At this point, stringent security rules can be established controlling who is given permission to access any content from package A, without affecting use of package B in any way. Profiles referencing package A can access any content, while profiles referencing package B can only access the ordinary content. By controlling which package receives content from a new feed source, the package administrator can easily control whether the channel will be treated as a secure or ordinary channel, with no need to verify or administer channel-oriented rules.

A second use of content importation is for merging content. A package administrator may choose to import content from related agencies or organizations, so that the content can be directly monitored in conjunction with the package's native content. This enables agencies or organizations administer their own independent packages, while also achieving highly integrated content sharing and interoperability.

A third use of content importation is to create a regional association of merge content from affiliated sources. In this manner, local agencies maintain their own packages, but the regional association manages a package bringing together local content that is of broader interest.

A fourth use of content importation is to bring together content of similar interest. For example, an agency can use a package as a kind of temporary patch panel, for bringing together content of interest. This is especially relevant as a tactical working space, such as for tactical interoperability requirements, or for circumstances where an agency ordinarily divides its content into multiple packages, but may sometimes need a different combination brought together for temporary use during a particular agency operation.

A fifth use of content importation for separation of capture and utility layers. In this scenario, feed sources are injected into a group of packages, where the particular package for a channel is selected for structural reasons. For example, content from one feed source owner. Then, logical groupings of channels are constructed in a different layer, and assembled without regard to the particular origin. This allows for independent administration of feed sources and functional channel groupings.

A sixth use of content importation is to allow for the division of channels into groupings based on various criteria. For example, one group of packages can isolate content by originating city jurisdiction, a second group of packages may pool content from the same state and function type, where a typical package draws some but not all content from each city package.

A seventh use of content importation enables an individual package to import content from various packages to assemble content of personal interest, not otherwise found commonly grouped onto a single transmission package.

An eighth use of content importation is the creation of a delayed mirror, where the content is identical to, or a less secure subset of, another package. But, directory packets are embargoed for a period of time, and only released after a delay period has elapsed. This allows for the release of information that may be of public interest, but where there is a compelling reason to preclude real time public access to the information.

The illustrative embodiment of the NetScanner system and methods also enable the use of at least two administrative profiles that can used to configure the content importation process. For every package, the "admin/import" profile is read to automatically configure the primary directory server's subscription table. Internally, the profile is an association of bank names with filters. The name of an upstream package is used as a bank name in "admin/import", and the filter associated with this bank is used as the requested filter for the upstream package when establishing a relay connection to an upstream directory server. When programming "admin/import", the client is presented with a list of sources generated by the upstream package, as indicated by the bank name, as an aid in the creation of an appropriate import filter.

For every package, the "admin/relay" profile establishes permissions for outbound relay connections, which is the import of present package's content by another package. The name of a downstream package is used as a bank name in "admin/relay", and the filter associated with this bank is used as an administrative filter for determining what directory packets may be delivered to the downstream package. A special bank name is available to indicate a default setting, with that filter establishing what a package not explicitly named may import from this package. When an import relay link is established, only packets matching both filters, what the downstream package requests, and what the upstream package allows, are transmitted over this connection. Package configuration files limit or control the functionality of these administrative pages. For example, the system administrator can set a package to a "public" state, where no security restrictions are applied, and all relay and stream connections are granted any requested channel content.

With respect to content distribution control in the illustrative embodiment, under ordinary circumstances, once a directory packet has been released to another package, that package has full ownership and can re-distribute the packet at will. If this is not desired, the "max hops" counter is used to control the depth of distribution of a directory packet. If set to the lowest level, any receiving package can send the packet to a client terminal using a directory stream, but that package is barred from passing to any other package using import. The counter can be set to a higher value, to accommodate particular configurations of chained packages, but still limiting the total number of packages in the chain.

In the illustrative embodiment of the NetScanner systems and methods, there exists a practical limit to any package's content carrying capacity. This limit typically relates to the maximum practical directory stream bandwidth to client terminals operating through a network connection of limited quality. More particularly, this creates an upper limit on the allowable frequency of directory packet reports, as can be stated in packets per second, or Hertz. If a package's packet frequency exceeds the bandwidth limit, it becomes impossible for each client terminal to receive all content on a directory stream. The standard approach for overcoming this limit is to divide the content into multiple packages. However, a package administrator also has the option of letting a package exceed this content capacity, and urge client terminals not to request unfiltered directory streams when the network quality will not support a deluge of directory packets. For example, a client terminal can assemble a filter based on the banks programmed into a profile, so that the received content is limited to a practical quantity.

The advantage of this bandwidth managing approach is that profiles can be created with any arbitrary collection of channels from a given package, and due to the large quantity of content, this confers great flexibility for profile design. However, if client terminals request filtered streams, and the filters differ between profiles, the client terminal cannot trust the completeness of the directory index after a profile change, and will need to purge the directory index, and either re-connect to the source package, or send a command to the currently connected directory server changing in user request filter. A package carrying more content than can be practically conveyed on a directory stream is termed a "super-saturated package", and will usually be created by importing content from several sources into a common pool. This is particularly useful for interoperability applications, because providing a fairly arbitrary assortment of channels for concurrent reception on a profile is reasonably straightforward.

In the illustrative embodiments of the NetScanner systems and methods, a "feed source" is the entry point for raw audio content that is managed and distributed. One implementation is the connection of a feed source to a radio receivers. In this embodiment, at a "feed source", a computer and radio frequency receiver are configured so as to capture the raw audio content of radio transmissions. The raw audio output from the receiver is brought to an analog input on the computer, where incoming audio is digitized and translated into a standard audio format (e.g. WAV, OGG, MP3 or SPEEX). A second connection, for bidirectional digital data, is established between the computer and radio receiver. Software on the computer queries the receiver at regular intervals, and the receiver responds with a report indicating squelch status, which is a yes/no indication of signal presence on the presently tuned radio frequency, and tuning information, which identifies the presently tuned radio frequency. On the basis of squelch information, the software activates and terminates an audio capture process, so as to generate a digital audio file representation of each single radio transmission. If not originally captured in a preferred audio file format, the software translates the captured audio filed into the preferred digital audio file format, such as a WAV to OGG translation using the SOX audio conversion utility.

In variations on the audio capture and digital file production process, the feed source software can monitor the audio input from the radio receiver to determine squelch status, either to determine the presence of signal on the monitored radio frequency, or the presence of voice or other content on the audio channel, in place of a separate data communications channel that provides a squelch signal. The feed source computer and radio receiver can may also be connected by a digital signal line carrying a continuous digital report of the squelch status. If the receiver is fixed to a single channel, or scanning frequencies where specific source identification is not important, the software can be pre-programmed with a channel description in place of information provided by the radio receiver.

The digital audio file is given a filename containing certain information about the transmission, including the capture time, according to the feed source computer clock, the channel identity ("channel ID"), for example, a tuned frequency or talkgroup code, and a text-tag channel description, obtained from the receiver, the measured duration of the transmission, an identity of the particular feed source capture process, and an identity of the particular directory stream to which a directory packet reporting this transmission should initially be reported. This file is then uploaded via SFTP (secure file transfer protocol) to a file server, so that the audio file will be made available on the Internet, and once transferred, deleted from the feed source computer. The following text strings are exemplar filenames for two audio files, as generated by the radio capture feed source software of the illustrative embodiment. Note that the section near the end, between '#' and '.ogg', represents a partial channel code describing the transmission source.

ns_000_alpha~~~_01_1219897903490_00001703_
   Somrvl~FIRE~~~~~_~~~~~~~~~~~~~_FIRE_#U
   SMA0104-F..G4._483.3875.ogg
ns_000_alpha~~~_01_1219898216738_00001302_
   Somrvl~POLICE~~~_Police~~~~~~~~~~~~_#US
   MA0104-PD.G4._470.5375.ogg With respect to configuration of the feed source software in the illustrative embodiment, the feed source software provides several fields for operator input. These fields include a "package name", an identity of a particular directory stream to which directory packets reporting transmissions should initially be reported, a feed source identity, which may be used to distinguish between different receivers, and a feed source password, for verifying authorization to submit content to the indicated directory stream. The software may optionally accept fields for describing audio content from this source with text description, frequency information, or a formal channel code. When the feed source software is initialized, it contacts a server related to the indicated directory stream, which is as "registrar" process, as defined below, and supplies the feed source password. If this password is recognized by the registrar, it replies with a list of file servers to which audio content can be uploaded. For each server, this reply specifies a username/password for the SFTP connection, and the target directory for placement of the audio content. This is a transfer directory, for passing audio content to a file monitor process, and not necessarily the file's final storage location.

Since locally administered clocks at the feed source computers may not be trustworthy, the registrar reply also includes the system time. The feed source software notes the difference between the computer's local clock and the time reported by the registrar, and generates a time offset that is applied to timestamps placed in the filename of subsequently captured audio content. To adjust for network latency in the query process, the computer notes the local time at the time of query transmission and response reception, and bases the time offset on the midpoint of this exchange. Application of a time offset corrects for errors in clock or time zone configuration on the local computer, provided that the registrar has an accurate clock. If the local computer is known to have an accurate clock, the application of the time offset is suppressed. The timestamp placed in the filename has a low practical significance in the illustrative embodiment, for as discussed, the primary timestamp associated with a transmission is actually based on the time when the directory packet is injected into the directory stream. However, the capture timestamp applied by the feed source computer is preserved in the audio filename, and may be used for a more accurate display of transmission times, or in forensic analysis of a communications record. In a variation on the preferred embodiment, this capture time is used as the primary timestamp for sequencing transmissions.

In addition to the aforementioned feed source structures and functions, the illustrative embodiments contemplate other feed source variations. Stated more generally, radio is an exemplary audio source, and other types of sources are envisioned within the scope of the present invention, such as console audio output, voice operated (VOX) microphones, importation of audio content from other audio sources, networks, and computer or software applications, and other sources as may be known to those skilled in the art.

In the illustrative embodiment, channels are registered. This is necessary because in order to apply channel codes to individual transmissions, the NetScanner system must recognize that a transmission is associated with a logical channel, and know the correct channel code for describing that channel. There are several mechanisms available for applying channel codes to audio content. First, the feed source operator can place a channel code in a text field of a radio receiver, so that the receiver reports the channel code to the NetScanner system feed source with every transmission, as described hereinbefore. Second, an instance of the feed source software can be configured with a specific channel code, such as through a screen text box in the user interface, which is then applied to all subsequently captured audio content. Third, a text file associated with the file monitor package, or the package where a directory packet is first reported, can associate text tags with channel codes or unregistered audio content, such as that submitted without a channel code, or can have the channel code stamped into the directory packet by the server process in accordance with these associations. The text file are configured through the client, using the "admin/geoentry" profile, an automatically generated profile, which is not saved, or existing in normal profile format, for associating text tags to channel codes. Special client options from this profile allow for setting a channel code at the package.

Some of the data fields in the channel code can be fixed by the circumstance, such as the name of the package to which audio content is initially reported, and the identity of a feed source. These fields may be omitted from a user-supplied channel code definition, if they will be automatically entered. For example, if a receiver provides only the first 15 characters of a channel code, a feed source may complete the remaining fields, such as by using the receiver's frequency, the feed source identity, and the feed source package, in the channel code. Similarly, if a channel code is constructed by a server process, it can apply its package name to the package ID field.

In order to accommodate unregistered channels, that is, audio content from sources that have not been given an explicit channel code, the NetScanner file monitor server assembles a geocode with default information in many of the fields, using the receiver's frequency, the feed source ID, and the package name to uniquely mark the channel with a provisional channel code, even without any descriptive information. Unregistered channels are later given a normal channel code, or at a downstream package, directory packets reporting audio content with a provisional channel code can be modified to apply a normal channel code defined at that package.

Similarly, a downstream package can alter the text tags associated with a channel, based on a transmission's channel code, in accordance with its configuration.

The illustrative embodiment NetScanner systems and methods store audio files for access and distribution through the host network. When hosting audio content files for Internet access by NetScanner client terminals, a particular challenge relates to supporting the delivery of audio content to a large number of client terminals that may converge on particular channels, for instance due to an event of widespread interest. Such an action can quickly exceed the audio file delivery bandwidth and processing power of the network audio file server hosting the audio content. For efficient load balancing, the system takes advantage of the fact that audio content is usually divided naturally into short discrete transmissions, so users following a channel are actually downloading a series of short related audio files. Feed sources in a package are associated with a "ring", which is a set of servers available for the hosting of audio content. Individual transmissions are sent to different servers, such as sequential through the list, or randomly selected. As a result, the traffic load will behave as a moving peak, where each transmission creates a cresting wave at a particular server, but the peak sits on a lower-level background with surplus capacity, and it is acceptable for the file server responses to be somewhat slow. Any response delays can effectively delay when each client terminal downloads the next transmission, in effect spreading out the wave of traffic at following servers and reducing the wave's peak height. As NetScanner client terminals will generally not fall into lock-step synchronization because client terminals are typically reproducing recent transmissions where the offset from real time is variable, the system has a natural tendency to create broad and low peaks in the audio file download rate.

In the case where audio download traffic is so great that more download bandwidth is required, the file monitor process transfers additional copies of the requested files to a selected set of other audio file servers, and then reports an audio content URL specifying a domain name that resolves through DNS to any of these valid servers. Channels with particularly high download request rates are determined through automatic review of Apache server logs, and a request for content storage on additional servers is generated if the loads from individual transmissions on individual servers exceed predetermined thresholds (e.g. bandwidth, downloads per second, etc). For these methods of increasing download capacity for high-demand channels, it is beneficial to have a large pool of audio file servers that can be used, if necessary, for any channel. For this reason, it is generally preferred that all feed sources pool their resources and store content on a common pool of audio file servers. This reduces the risk that any particular server will become overloaded during times of high interest in particular content, improving system and package reliability. A configuration file for each package, set by the system administrator, specifies the ring to be used by feed sources affiliated with that package. A system administration file defines the particular set of audio file servers associated with the particular ring.

The illustrative embodiment NetScanner systems and method provide certain measures directed to audio file security. These are for preventing unauthorized access to protected NetScanner content, and there are two primary layers of audio file security The first layer of security prevents the Internet URL's of audio content files from being disclosed to unauthorized users and terminals, and from being independently discovered by unauthorized users. The second layer of security prevents unauthorized download of audio content files, even if the URLs for such content otherwise becomes known. For both layers of security, the concept of "knowledge" or "disclosure" of a URL includes the non-explicit case where only the user's NetScanner client terminal software is aware of the URL of audio content file. The two layers of security operate independently, and are administered independently. Any particular security rule within NetScanner relate to one of these layers of security, but not the other. The capabilities of the two security layers are entirely different, and are not to be interpreted as two layers for obtaining the same kinds of access restrictions.

The first layer of audio content file security is protection of the audio content file Internet URL. This technique prevents unauthorized reception of audio content with a NetScanner client terminal, meaning an authorized NetScanner client terminal incorrectly accessing secure content that is carried somewhere on the system. The primary line of security exists in that a directory server will not write a directory packet reporting the secure content to a stream associated with the unauthorized client terminal's system username. Therefore, the unauthorized client terminal will never be aware of secure content outside the user's permissions, as established by the system administrator for the transmission package carrying the secure content.

It is important to note the security implications of the "import" process, whereby content may be carried on multiple packages. When a directory packet is relayed from one package to another, it leaves the security scope of the upstream package. With the exception of the "max hops" counter, any security restrictions established by the upstream package have no effect on restricting the distribution of this directory packet from the downstream package. If the downstream package is configured to allow fully open access, where any NetScanner client terminal can receive the channel when connecting to its directory stream, the only way the upstream package can close this security hole is to block the relay of content to this downstream package. Therefore, when allowing inter-package content relay, an upstream system administrator must trust the downstream system administrator to properly secure the content.

With respect to preventing unauthorized reception of audio content files without a NetScanner client terminal, for example, directly accessing audio files through a web browser, the primary technique for security is that the Internet URL's are highly obscure. Audio URLs are unpublished, and only distributed over secure connections using HTTPS protocols to the client terminals. The client terminal never discloses the URLs for audio content being downloaded, buffered or played. Audio content file is downloaded over a secure connection (HTTPS), with only the domain name exposed in clear text during transfer. The URLs of audio files are not made available to any user, or any person observing the network communications. The URLs for audio content files are accessible through NetScanner server process administration web pages, in the system logs of those packages that have handled the associated directory packet, but access to these web pages requires a system or package administrator password.

Additionally, with respect to obscure audio content file URL's, guessing a URLs is highly ineffective, since timestamps to millisecond accuracy are required to construct a URL, even if the file format becomes otherwise known. If audio contents from a single channel are distributed on a ring to multiple servers, then the URL for a specific audio file, even with a specific timestamp, could actually reside on any file server on the ring, making guessing even more difficult. And even if one transmission were located through a lucky guess, the unauthorized user would be starting from scratch when trying to locate the next subsequent audio file of a second transmission, and so on. If audio content is stored in files and directory paths that do not include fields identifying the source channel, then without directory packets, an individual with a collection of URLs or audio files would have no way to reassemble conversation threads or identify transmissions of related content. Transmissions from numerous sources are effectively co-mingled, and the directory packets are the only effective index for making sense of the collection. For this reason, storing content in obscure and non-informative filenames provides additional security.

The second layer of audio content file protection is enabled through use of the Apache access code. This layer of protection covers all access to NetScanner audio files, including both categories of unauthorized access, such as through the NetScanner client terminal or through a web browser. Directories holding audio content include an ".htaccess" file, so the Apache web server requires an access code from the requesting party before the file download will be initiated. An access code is provided by the home registrar via HTTPS to the client terminal software, at the time of user authentication, and this code is used by the client terminal for all audio download requests while connected to a NetScanner package, irrespective of what transmission package's directory stream provided a directory packet.

The NetScanner system of the illustrative embodiment supports numerous access codes, but the logic of application is specific. A feed source process files content under an "audio group" code. When the file monitor server process places the audio in its final destination, it uses this code as a folder name portion of the path leading to the audio content. Access permissions, specified in the ".htaccess" file in this folder, specify a set of access codes that are used to initiate a download of content within the folder. Therefore, the audio files can only be downloaded by users whose home packages hold one of these access codes. For protection against unauthorized access by NetScanner client terminals, this gives substantial power to the originating package, which is the package associated with the feed source, to which the content was initially reported. In a typical application, a professional agency stores content under an audio group folder requiring an access code that is only granted to packages administered by agencies in the same profession. This effectively blocks reception of this audio content by any user who is not in this profession. In a variation, client terminals at a package are issued different access codes, so that permissions at this layer are assigned with finer distinctions. In another variation, client terminals are given more than one access code, with instructions for use when receiving different content, for example, differentiated by audio group, package name, or some other characteristic.

The illustrative embodiment of the NetScanner systems and methods contemplate the deletion of the audio content files over time. Since storage capacity is limited, it is useful to delete unnecessary accumulated audio content files from the audio file server. As a general matter, audio content is retained for a limited period of time, for example, for seven days, unless there is a compelling reason to preserve the information. To automatically delete expired content, a "cron job" is automatically executed at regular intervals, for instance, once a day during overnight hours, deleting all content found within, or below, a certain folder, if that content is older than the specified maximum age. Other retention period durations for specific types of content is contemplated. This is supported using the audio group code, which segregates content by code, into separate directory trees on each audio file server.

The cron script points to the directory tree for each audio group, and executes the automatic deletion process with an administratively defined retention period threshold, set independently for each audio group code. Therefore, selection of an "audio group" depends on both the desired Apache access permissions and the desired retention period for that content.

On the other hand, with respect to audio file retention and deletion, if specific content should be retained permanently, it is moved to a parallel directory tree structure. Ordinary audio is stored under a particular directory path, for example "audio/group-code/package-name/time-interval . . . ". Audio files to be saved are moved to different directory path, for example "saved-audio/group-code/package-name/time-interval . . . "". In the parallel directory tree, equivalent ".htaccess" files are placed to maintain equivalent access restrictions, but the cron script for automatically deleting content leaves the audio files undisturbed. When a playlist profile is recorded, it is useful to send commands to copy or move all referenced audio files into the appropriate "saved-audio" folder location, so that the playlist content is automatically retained. This is done, for example, by sending commands from the package registrar to store the playlist profile to a server process operating on the computer with the audio content, as located by directory packet URL, where the server can preserve the selected content through execution of an operating system command.

In addition to the aforementioned storage of audio content files, the illustrative embodiment contemplates that directory packets reference audio content files stored an at any conventional Internet address, and not merely content hosted at a server operating as part of the NetScanner system. In general, a directory packet references a URL, and audio is submitted into the NetScanner system through the injection of a packet referencing externally hosted audio content. This is particularly useful for sources desiring to keep physical custody of the storage media of their audio content, or for advertising, announcement or reminder messages that use a standard recording to be replayed on numerous occasions. If the server is configured to reject repeat submissions of the same URL, it is advantageous to store external audio in a form that is accessed through various URL's, for instance, by appending a final portion of the URL that is ignored by the external audio server.

In the illustrative embodiment of the NetScanner systems and methods, communications are hosted through the Internet. NetScanner servers are responsive to HTTP queries to their Internet address, and are accessed through standard HTTP access methods, including web browsers. For the typical NetScanner functionality of monitoring audio content, access through a NetScanner client terminal is required for proper audio selection and playback. Through use of a web browser, an authorized NetScanner user can access individual files of audio content, send various administrative commands, and monitor status logs reporting server health and other activity. The NetScanner servers receive all communications in the form of standard HTTP requests, usually in GET format, currently the most common format for Internet webpage requests, where all commands and substantive information are sent within the URL. The behavior is non-standard with respect to formal specifications for HTTP/GET, in that there is no attempt to avoid server "side-effects" (i.e. changes in state), although this behavior is consistent with common Internet usage. Indeed, many server commands designed to produce a change in state are transmitted via HTTP/GET. An alternative format, HTTP/POST, is only used for limited purposes where a substantial quantity of data must be sent to the server, for example, when saving a profile. For logging purposes, the NetScanner client terminal includes its username as a "cookie" in all HTTP transactions with NetScanner servers. The servers record this information in their access logs, however, the cookie value is not used in determining the response, and is not presumed to be an accurate assertion of the client's username. As noted hereinbefore, all information from any client terminal is presumed to be potentially forged and unreliable.

Although the NetScanner servers of the illustrative embodiment are only responsive to HTTP, the secure format HTTPS is preferred for server/client communications, since all content, except for domain names and IP addresses, is encapsulated within an encrypted Internet transmission. To provide a secure channel, each NetScanner physical server is equipped with a small proxy, implemented as a PHP program that is invoked through an incoming Apache SSL (Secure Sockets Layer) request. When a client terminal contacts a NetScanner directory server, it sends an HTTPS query to the proxy co-located on the same physical server, and specifies the desired target by port number along with the desired HTTP/GET request. The proxy contacts the NetScanner server, passes along this request, and in turn passes the server's response back to the client. The unencrypted portion of the transaction between the proxy and NetScanner server is entirely local within the physical server, so there is no clear text on the network during client/server communications.

The proxy PHP software, unlike the NetScanner server processes, is not continuously free-running. Instead, a new instance of the server is initiated for every incoming client/server connection. Many of these connections are brief, but some are sticky, for instance when obtaining a directory stream. In these cases, a proxy process is left active, for encrypting the directory stream as it is sent to the client. Server inter-process communications are not routed through the proxy, but are implemented as direct HTTP server-to-server transactions. If the physical servers are co-located and connected with a local area network, these unencrypted communications are segregated from the Internet. When servers are located at greater distances, encrypted inter-process communications, such as through proxies on both sender and receiver computers, are preferred. In an alternative embodiment, the NetScanner directory servers are directly implement SSL, and thereby send and receive HTTPS without use of a proxy.

In the illustrative embodiment of the NetScanner systems and methods, the command format is carried through the Internet. The URLs expected by a NetScanner directory server follow a specific format. Fields are separated by a '/' symbol, and fields where the actual contents may include a '/' or space ' ' are subject to base64 encoding. The first field is a validation string, used to determine whether the sender has authority to issue the command or request. The second field specifies the command type. Depending on the command type, additional fields may be supplied. A list of command types is provided hereinafter.

The illustrative embodiment also addresses the authenticity of inter-process communications. In the NetScanner system, there is a constant patter of communication among NetScanner servers, for a variety of content distribution, administration and system maintenance functions. The NetScanner server software is implicitly trusted, so it is presumed that inter-process commands carry no risk of fraud or forgery, so long as it is absolutely certain that the sender was another instance of the NetScanner server software. This is determined through use of a "salted hash", known to those skilled in the art, that is transmitted along with the command, so the target server may confirm that the command was generated by another NetScanner server instance, and also, that the command has not been altered or corrupted during transmission. A hash is not a method of encryption. Rather, it is transmitted alongside data, to verify data integrity, and, in the case of salted hashes, to verify that the sender is someone aware of the salt. To generate the salted hash, the server applies the MD5 hashing algorithm to a string including the desired server command, which is the remainder of the following the validation field, the current timestamp, which is in milliseconds since the standard epoch of the Unix timestamp, and an undisclosed salt, which is a random string sequence known only to the NetScanner server processes, and never revealed. A validation string is constructed from the timestamp and MD5 hash, and placed in the appropriate field of the URL to produce a hash-validated command.

Having clear the hashing process, such a command can be safely passed through insecure communications channels, or even buffered on the client without violating the principle that information from the client is deemed untrustworthy. Since the receiving server process knows the secret hash ingredient (i.e. the undisclosed salt), it can independently calculate a genuine validation string from the claimed timestamp and server command. If this matches the provided validation string, then it is presumed that the command was originally assembled by some instance of the NetScanner server software, and has not been tampered with in any way. Without knowledge of the salt, a hash-validated command cannot be forged, since there is no way to determine a valid salted hash. If a genuine hash-validated command is intercepted by a third party, it is possible to re-issue this specific command, making it execute a second time. However, verification strings expire. The receiving server compares the timestamp from the validation string to the current time, and if these differ by more than a predetermined amount, the command is considered invalid. The [predetermined expiration time is set to be greater than anticipated variation between server clocks, thusly accounting for any timekeeping errors. Therefore, even if a fully constructed inter-process URL is intercepted by a third party, it cannot be re-issued successfully after a short period of time. The salt is changed periodically, particularly since commands validated by a salted hash will expire, so there is no need to recognize valid verification strings of arbitrary age. When salts are changed, it is preferred that the servers be aware of both the current and previous salt, so that inter-process communications are unaffected during the transition.

The illustrative embodiment of the NetScanner systems and methods also addresses the authenticity of client issued server commands. Client terminals send commands to NetScanner servers for a variety of reasons, such as requesting stream connections, uploading profiles, and changing account settings. Since access to the executable client terminal software is unrestricted, the method for validating server-authored commands is not applicable to client-authored commands. Many server commands are only appropriately issued by another NetScanner server process, and in these cases, no validation methods are recognized except the use of a salted hash. However, alternative validation methods are recognized for commands that are legitimately issued by a client. Many sensitive client terminal authored commands, such as saving profiles or account settings, are directed exclusively to the user's home registrar. For these commands, the client terminal creates a validation string from the username and token. Since the home registrar keeps the current token for every logged-in client terminal, it can directly verify the username/token relationship. Username/token validation cannot be forged without knowledge of the client terminal's current token, which expires when the terminal is not connected to a directory stream for longer than a predetermined timeout period. Note that client/server communications are encrypted via SSL, and this discussion is directed solely to validating the authenticity of a client terminal authored commands.

Additionally, a number of server commands are left open, and are executed without significant validation. Examples include asking for the Internet address of a particular package, requesting assignment to an available historian or directory server, and connecting to a directory stream. However, specific validation steps are provided for client terminal authored commands that request directory packets. When the client terminal requests a directory stream, the immediate effect is the establishment of an essentially inactive server/client communications channel; the server sends no directory packets over this connection until the user's home registrar validates the authenticity of the client terminal, based on a token supplied by the client terminal when making the connection. When requesting a directory history or a playlist profile, with embedded directory packets, actions that immediately produce content, instead of opening a stream connection for subsequent use, a server process with reason to believe the request is authentic generates a server-authored command sequence, and passes this preformatted URL to the client, which then uses it to fetch the content from an appropriate server with access to that content. Since hash-validated commands are protected against tampering, specific permissions embedded in the URL cannot be modified without invalidating the command. A similar technique is used wherever a server wants to authorize a client for the execution of a particular command at another server node.

In a particular form of message in the illustrative embodiment, inter-process communications may lead to a process passing a communications message to itself. For example, consider a circumstance where a primary directory server sends a message to the package registrar, where the package is configured to use a unified server node, which serves as both primary directory server and registrar. In this case, the sender and recipient are the same process. For generality, the command is still processed in the normal fashion, although it is passed internally without a socket transaction. As this example illustrates, steps described as communications between processes over socket connections will sometimes actually be local transactions not requiring a socket or network communication.

Having disclosed the arrangement of physical servers, NetScanner processes, network connections, protocols, communications and security measure of the illustrative embodiment, it is useful to consider a sequence through a connection exchange. The following annotated log excerpt illustrates a typical series of messages generated as a user client terminal logs into the NetScanner system, showing the user authentication process, assignment to a directory server, connection to a directory stream, and determination of a content filter. The first part of this transaction relates to the user's home package 'alpha', implemented as a single-process NetScanner package. The second part of the transaction shows what happens when the user loads a profile at a different package, the 'omega' package, implemented as a four-process NetScanner package including one registrar, one primary directory server, one secondary directory server, and one historian process. For communications from the client terminal software, the username is shown as reported by cookie, for logging purposes only. The validation string, which is part of the URL in each server command, is omitted for clarity. Note that in this scenario, the user has previously submitted a username/password, through an encrypted form, to a PHP script that generated a webpage referencing the NetScanner client Java Applet, and passing a salted hash of the password to the Java Applet through the HTML applet frame. Both transactions, sending username/password and receiving the HTML page with an embedded NetScanner applet, were encrypted through HTTPS/SSL. And now, the transaction sequences:

a) The client contacts the root node, and asks for the Internet address of the registrar of package 'alpha'
20:58:05 EDT -0400 polaris.rangecast.com:11780 admin@alpha /index/alpha b) The client (username admin@alpha) contacts their home registrar, and for authentication, submits a salted hash of the user's password
20:58:05 EDT -0400 polaris.rangecast.com:11779 admin@alpha /userid/token/admin@alpha/1219798589001-57b664fec1c4d496d0ed306d8871d251 c) The client obtains account settings established by the package administrator
20:58:06 EDT -0400 polaris.rangecast.com:11779 admin@alpha /config/alpha/admin d) The client seeks assignment to a historian for downloading profile 'alpha/admin/index', a file including user-configurable account settings
20:58:06 EDT -0400 polaris.rangecast.com:11779 admin@alpha /userid/pauth/admin@alpha/alpha/admin/index e) The client downloads profile 'alpha/admin/index' (which includes a reference to the user's homepage)
20:58:06 EDT -0400 polaris.rangecast.com:11779 admin@alpha /profile/alpha/admin/index/%3F f) From the content of 'alpha/admin/index', the client determines the user's homepage is 'alpha/admin/demo', and seeks an assignment for download.
20:58:14 EDT -0400 polaris.rangecast.com:11779 admin@alpha /userid/pauth/admin@alpha/alpha/admin/demo g) The client downloads profile 'alpha/admin/demo'
20:58:14 EDT -0400 polaris.rangecast.com:11779 admin@alpha /profile/alpha/admin/demo/%3F h) The client requests assignment to a directory server for stream 'alpha' (referenced in 'alpha/admin/demo as the source package for content)
20:58:16 EDT -0400 polaris.rangecast.com:11779 admin@alpha /assignment/point/admin@alpha i) The client establishes a connection to the assigned directory server
20:58:17 EDT -0400 polaris.rangecast.com:11779 admin@alpha /stream/connect/admin@alpha/3ac2a41bbe5543065ae6696ef0860e5e/+ j) The directory server contacts the user's home registrar, to ask if the client-supplied token is valid (authenticate the user)
20:58:17 EDT -0400 polaris.rangecast.com:11779 /userid/validate/admin@alpha/polaris.rangecast.com:11779/alpha/3ac2a41bbe5543065ae6696 ef0860e5e k) The user's home registrar responds, confirming that the token is genuine
20:58:17 EDT -0400 polaris.rangecast.com:11779 /userid/confirm/admin@alpha/ l) The directory server contacts the source package registrar, to report that the user has connected to a stream, and to ask for an administrative filter
20:58:17 EDT -0400 polaris.rangecast.com:11779 /userid/present/admin@alpha/polaris.rangecast.com:11779/ m) The source package registrar responds, providing the administrative filter that should be used to screen outbound content (blocking secure content)

20:58:17 EDT -0400 polaris.rangecast.com:11779 /userid/pass/admin@alpha/%3F n) The directory server notifies the user's home registrar that the user is connected, and preventing the user's token from expiring due to inactivity 20:58:33 EDT -0400 polaris.rangecast.com:11779 /userid/report/admin@alpha/polarissangecast.com:11779/alpha/3ac2a41bbe5543065ae6696ef 0860e5e o) The directory server notifies the source package's registrar that the user is connected 20:58:33 EDT -0400 polaris.rangecast.com:11779 /assignment/report/admin@alpha/polarissangecast.com:11779 p) The user navigates to a new profile, 'omega/test/demo', so the client wants to find out how to contact package 'omega'

20:58:52 EDT -0400 polaris.rangecast.com:11780 admin@alpha /index/omega q) The client asks the source registrar for an assignment to a historian for downloading profile 'omega/test/demo'

20:58:53 EDT -0400 polaris.rangecast.com:11776 admin@alpha /userid/pauth/admin@alpha/omega/test/demo r) The client downloads profile 'omega/test/demo'

20:58:53 EDT -0400 polaris.rangecast.com:11777 admin@alpha /profile/omega/test/demo/USMMA%3AUSNH%3AUSVT s) The client asks the source registrar for an assignment to a directory server 20:58:55 EDT -0400 polaris.rangecast.com:11776 admin@alpha /assignment/point/admin@alpha t) The client establishes a connection to the assigned directory server (a secondary process in package Omega)

20:58:55 EDT -0400 polaris.rangecast.com:11781 admin@alpha /stream/connect/admin@alpha/3ac2a41bbe5543065ae6696ef0860e5e/+ u) The directory server contacts the user's home registrar, to ask if the client-supplied token is valid (authenticate the user)

20:58:55 EDT -0400 polaris.rangecast.com:11779 /userid/validate/admin@alpha/polaris.rangecast.com:11781/omega/3ac2a41bbe5543065ae66 96ef0860e5e v) The user's home registrar responds, confirming that the token is genuine 20:58:55 EDT -0400 polaris.rangecast.com:11781 /userid/confirm/admin@alpha/ w) The directory server contacts the source package registrar, to report that the user has connected to a stream, and to ask for an administrative filter 20:58:55 EDT -0400 polaris.rangecast.com:11776 /userid/present/admin@alpha/polaris.rangecast.com:11781/ x) The source package registrar responds, providing the administrative filter that should be used to screen outbound content (blocking secure content)

20:58:55 EDT -0400 polaris.rangecast.com:11781 /userid/pass/admin@alpha/USMMA%3AUSNH%3AUSVT y) The directory server notifies the source package's registrar that the user is connected 20:59:12 EDT -0400 polaris.rangecast.com:11776 /assignment/report/admin@alpha/polarissangecast.com:11781 z) The directory server notifies the user's home registrar that the user is connected, and preventing the user's token from expiring due to inactivity 20:59:12 EDT -0400 polaris.rangecast.com:11779 /userid/report/admin@alpha/polarissangecast.com:11781/omega/3ac2a41bbe5543065ae6696 ef0860e5e aa) The directory server at 'alpha' notices that the stream has closed to this user, and reports to the package registrar 20:59:19 EDT -0400 polaris.rangecast.com:11779 /assignment/gone/admin@alpha/polaris.rangecast.com:11779/1219798697086 bb) The directory server at 'alpha' reports the client's total connection time to the 'alpha' directory stream 20:59:19 EDT -0400 polaris.rangecast.com:11779 /meter/alpha/admin@alpha/62.061/polaris.rangecast.com:11779/74.208.16.164:49579 cc) The client shuts down the Java applet, and the directory server at 'omega' notices that the stream has closed to this user 21:00:58 EDT -0400 polaris.rangecast.com:11776 /assignment/gone/admin@alpha/polaris.rangecast.com:11781/1219798735643 dd) The directory server at 'omega' reports (to the source registrar) the client's total connection time to the 'omega' directory stream 21:00:59 EDT -0400 polaris.rangecast.com:11776 /meter/omega/admin@alpha/123.328/polaris.rangecast.com:11781/74.208.16.164:57743 ee) The directory server at 'omega' reports (to the user's home registrar) the client's total connection time to the 'omega' directory stream 21:00:59 EDT -0400 polaris.rangecast.com:11779 /meter/omega/admin@alpha/123.328/polaris.rangecast.com:11781/74.208.16.164:57743

The illustrative embodiment of the NetScanner systems and methods also includes a command syntax with corresponding definitions. A command listing is presented below. This is a listing of command types recognized by the NetScanner servers. Commands may include varieties specified by following fields.

/packet—Sends a directory packet for processing, which may include forwarding to clients or other servers.

/index—Requests the Internet address of certain processes within a package.

/relay/connect—Requests a relay for forwarding of directory packets from the target server.

/relay/filter—Sets the administrative (i.e. security) filter for an outbound relay from the target server.

/relay/verify—Requests verification that another package is authorized to import content via relay.

/relay/close—Closes an existing outbound relay from the target server.

/stream/connect—Requests a directory stream from a client, to a directory server.

/stream/close—Closes an existing outbound stream from the target server.

/userid/token—User login—supply username and password, receive token and other setup information.

/userid/validate—Requests verification that a client-supplied user token is authentic.

/userid/confirm—Confirms that a client-supplied user token is authentic.

/userid/report—Reports that a user is still logged into the system, suppresses token expiration.

/userid/present—Report from directory server to registrar when a user establishes a stream connection.

/userid/filter—Requests the administrative (i.e. security) filter applied for a particular username.

/userid/pass—Sets the administrative (i.e. security) filter for an outbound stream from the target server.

/userid/historian—Client request for assignment of a historian process, where another query will be directed.

/userid/hauth—Client request for authorization to receive a directory history.
/userid/pauth—Client request for authorization to receive a profile for normal format profiles.
/userid/archive—Client request for authorization to receive a profile for playlist format profiles.
/userid/ring—Client request for the address of a server where audio content may be uploaded.
/userid/pwdset—Change user's login password.
/assignment/clear—Indicates that a directory server has been started, prior connections deemed invalid.
/assignment/trace—Acknowledgement to package registrar of a trace message received at a package node.
/assignment/report—Report that a user is still connected to a package node.
/assignment/gone—Report that a user connection has terminated.
/assignment/point—Request for assignment to a directory server, for provision of a stream or relay connection.
/keyshare/check—Request for validation that a key owned by target package may be assigned to users of originating package.
/keyshare/valid—Validation that a key owned by originating package may be assigned to users of target package.
/subscription/connect—Notifies a server requesting a relay connection of its assignment where a relay may be obtained.
/subscription/report—From registrar to primary, report of an import subscription in package settings.
/subscription/reload—Reloads from file a list of desired subscriptions for this package.
/trace/trigger—Initiates a trace at a primary directory server for verifying integrity of package content distribution tree.
/trace/new—Trace event at a directory server.
/trace/ack—Acknowledgement of a received trace, directed to the upstream node.
/ping/trigger—Initiates a ping at root or gateway for triggering housekeeping operations and verifying system health.
/ping/new—Ping event at a NetScanner server process.
/ping/ack—Acknowledgement of a ping received.
/ping/status—Report of a ping received, directed to the package registrar of the NetScanner process.
/meter—Report of a user's connection time to a directory stream.
/history—Returns a list of directory packets previously archived into text file storage.
/hlinks—Equivalent to 'history', but returning content in HTML format, with links to audio files.
/preserve—Requests the preservation of audio content with copy to saved-audio folder.
/channel/setcode—Registers a channel recognized by text tag, sets a geocode to be applied to its transmissions.
/channel/clear—Clear accumulating records of channel activity, including number and duration of transmissions, etc.
/exists—Tests to see if a profile exists, for instance, to provide overwrite warning when saving to that name.
/profile—Requests a profile in reply body.
/sethome—Sets a user's home page with initial profile loaded automatically upon login.
/bookmark—Sets a bookmark with link to a profile.
/config—Reads account configuration information.
/rename/profile—Renames a profile.
/upload/profile—Stores a profile, which is attached as POST content.
/upload/audio—Submits audio content, which is attached as POST content, typically 'talknet' content from a client microphone.
/talknet/signal—Sends a test message to a NetScanner 'talknet' channel, and in the case of a new channel, causes it to be entered into channel list.
/bulletin—Transmits a text message to a primary directory server, for distribution on the package directory stream.
/source—List of channels carried on a package.
/computer/ring—Returns a list of servers to which audio files may be uploaded, and related information.
/computer/time—Reports the clock time, according to the server.
/computer/refresh—Triggers the reloading of table listing Internet addresses of NetScanner processes from file.
/computer/rht—Report, historian to registrar, that a historian process has completed executing a command.
/computer/extra—Requests that an 'extra' process be allocated to a package, command directed to root.
/computer/allocate—Requests that a gateway process allocate an 'extra' server process to a package, command from root to gateway.
/computer/closing—Reports that the sending server process is shutting down.
/computer/start—Executes a command line operation to start another NetScanner server process on the same computer.
/computer/stop—Executes a command line operation to stop another NetScanner server process on the same computer.
/computer/kill—Executes a command line operation to immediately terminate another NetScanner server process on the same computer.
/cascade—Distributes a command for execution by all NetScanner server processes.
/execute—Executes a command script, obtains a file, and executes commands from file as if received normally.
/status—Returns status reports, in HTML or TXT format, designed for viewing through a standard web browser, with many subtypes.

The illustrative embodiment of the NetScanner systems and methods employ a particular channel code format. The channel code is an internal reference code, not normally seen by a NetScanner client terminal user. The channel code format is intended to be comprehensible, assuming the format is known, in order to simplify manual creation and transcription of codes by experienced users. However, it is to be noted that this is not intended as a channel description that would ordinarily be encountered or used by a NetScanner system user. The following channel code format listing is exemplary in the illustrative embodiment, and other codes will be envisioned by those skilled in the art. However, the structural elements of the channel codes should be maintained as new codes are added from time to time, and, the meaning of fields should not be changed ad hoc, and the meaning of particular values in those fields after they have been pressed into service should not be changed.

The illustrative embodiment channel code basic format is presented below, however, it omits certain trailing fields that identify a corresponding feed source.

Chanel Code Format: 'rrrruuuu-ffatoo-cccccc'
where the data fields are defined as follows:
rrrr Region (country/state-province)
uuuu Unit (geographical subdivision, e.g. county/city/prefecture)
ff Function (type of activity on channel)
a Application (tactical function of channel)
t Type of Owner (government, commercial, etc)
oo Owner ID (specific operator of channel)
cccccc Unique ID for specific channel (frequency, talkgroup, serial number)

A suitable database is employed for the Region data field that lists geographic region/unit codes for the United States, based on Census Department information. This information is used for the region/unit code for transmissions originating in the United States. Lists of county and city units are sorted by population, based on information available at the time of table creation, with higher-population units receiving a lower code number. When over 99 units exist at a certain level (e.g. counties in Texas), code numbers with a letter-number format are applied for the overflow (e.g. '99' then 'A1'). Similar databases are created for other nations. Sorting by population is optional, and may be done if convenient, but alphabetical sorts are equally useful. The standard ISO two-digit country code is used as the first two characters of the region code, followed by an evident geographic subdivision (e.g. state or province). A special alternate class of geographic identification is airports, which have a standard set of identification codes (e.g. 'MCO' for Orlando International Airport). These are used in place of a county/city code, by placing a dash and the three digit airport code in the four-character unit field. For example, USFL-MCO would be the proper geographic code for the Orlando airport. Certain applications exists where there is no evident national designation, and therefore a reserved the prefix "NS" for NetScanner-defined parameters is used in the region/unit field For example, "NSTK" is used for "talknet" channels with no defined geographic association. The prefix "XX" is also reserved for undefined channels.

The Function code identifies the primary function of the broadcasting entity (e.g. police, railroad, etc). The Application code identifies the role of the channel within that agency (e.g. dispatch, field operations, transportation, etc). The following list presents currently defined Function codes:

E—Events
    (no standard definitions)
EN—News media
    (no standard definitions)
    (other codes are available for temporary assignment)
F—Fire and Emergency Services
    FA—ambulance
    FF—fire
G—Government
    GA—animal control
    GB—lifeguards
    GC—civil defense
    GE—executive
    GF—forestry/land management
    GJ—jails/corrections
    GL—legislature
    GM—mosquito control
    GS—woil & water conservation
    GZ—courts/Legal
L—Locations
    LA—housing and apartments
    LB—office buildings
    LC—convention center
    LE—stadium
    LF—farming/agriculture
    LG—parking garages and facilities
    LH—hospitals
    LJ—hotels
    LL—libraries and museums
    LM—manufacturing plant/facility
    LN—nursing homes
    LP—parks and recreation
    LQ—liquor stores
    LR—malls/shopping centers/retail
    LS—schools (K-12, etc)
    LT—theme park/fairgrounds
    LU—universities and colleges
P—Police
    PX—general use
Q—Public Use
    QA—amateur radio
    QC—citizens band
    QF—frs/murs (unlicensed content)
    QG—gmrs/(mixed-use licensed content)
    QM—wireless microphones
T—Transportation
    TA—airlines/airports
    TC—taxi
    TD—postal service/package delivery
    TE—racing/special event
    TH—highway/traffic lights
    TL—limo
    TP—passenger transit (subway/bus, intercity)
    TR—railroad (freight)
    TS—space (launch and satellites)
    TT—trucking
    TW—automotive emergency service/towing
U—Utilities and Regional Services
    UA—alarm companies
    UC—cable services
    UD—drainage
    UE—electric/power
    UG—gas supply
    UL—solid waste/landfill
    UP—petroleum
    US—sewerage
    UT—telephone
    UW—water supply
X—Unclassified
    (no standard definitions)
Y—Miscellaneous
    YB—misc. business
    YP—production (movie/video)
    YS—security (private/non-deputized)
Z—Package Defined Content
    (no standard definitions)

The Application cod portion of the Chanel Code is a single letter describing the role of the channel in its host communications system. Many letters are pre-defined for typical roles found in many types of systems. The predefined Application codes follow:

A—
    B—
    C—
    D—dispatch/control
    E—event (short duration application)
    F—fire
    G—paging/emergency alert
    H—medical services
    J—interconnect/patch
    K—facilities
    L—local/field site/short-range operation
    M—mobile (field operations)
    N—
    P—police/security
    Q—operations
    R—search & rescue
    S—services
    T—transportation
    U—engineering/maintenance
    V—
    W—mutual aid X—unclassified/no classification
Y—misc.
Z—

The Type of Owner code portion of the Chanel Code is created and maintained as a "owners", who are typically radio station licensees, so that consistent channel codes are applied system wide. For governmental agencies, the Owner Type is a level of government, which are defined as follows:

1—Federal/National
2—State/Province
3—County
4—City/Town
5—Special District
6—Quasi-Governmental District
7—Military
8—International Agency
9—Package-Defined Government Unit There is a list of standard Owner ID codes for each level of government, then for each function code, (e.g. 'PX'—Police). This list includes agency or department names commonly found in many districts (e.g. 'Highway Patrol'). For major agencies, to allow discrimination between internal departments, a block of 10 'owner ID' codes is assigned. Of course, not all agencies and departments will fit a standard nationwide template. A block of Owner ID' Codes is reserved for unique assignment within a particular jurisdiction, to handle these special cases. For example, under "Police" there might be an entry for "Highway Patrol/Traffic Enforcement—2x". Analogous entries might include standard police, park rangers, capitol police, etc. As the state-level police with highway enforcement responsibility, the Nevada highway patrol would have the code USNVxxxx-PXx22x. The first "xxxx" is used to identify particular locations; the second "x" is used to identify a channel function (e.g. dispatch, mobile); the third "x" is used to identify a department within the highway patrol. Then, Nevada highway patrol dispatch would therefore be:

USNV0100-PXM220 (xxxx allows id of the location)

This code reads as "Within US/Nevada, safety/police/state police, mobile channel for the highway patrol, with a transmitter in county/city xxxx".

In the case of private radio station licensees, the Owner Type identifies a particular licensee list to be consulted for interpreting Owner ID. The coding scheme supports a list for each level of jurisdiction in the geographic code, including:

W—Worldwide List
N—National List
S—State/Province List
C—County List
T—City/Town List The Unique ID portion of the Channel Code is used to uniquely identify a particular communications channel, within the scope of a particular licensee and channel function, a specific ID field is necessary. This is an arbitrary sequence, and may be a serial number or other simple identifier. In practice, it is often convenient to use a broadcast frequency (e.g. 123456 for 123.456 MHz), a trunked radio system talkgroup code (e.g. E01234 for EDACS talkgroup 01-234), or similar established code. Additional attention to ensure unique codes is advantageous in particular circumstances, such as effective channels only differentiated by PL tone, in the rare circumstance when they are used by a single licensee, or when there are separate feed sites for monitoring the same frequency in different locations with otherwise identical channel descriptions, for example, for short-range FRS communications. In many of these cases, however, feeds can be discriminated by feed source ID or package ID, so the channel codes used for internal representation are still distinct, even if no attention is given to providing distinct channel ID codes.

The following list presents some examples of three-letter codes in certain applications:

Maritime:
TMK—harbors (facilities)
TMM—non-commercial (mobile)
TMP—coast guard (security)
TMQ—port operations (operations)
TMT—commercial (transportation)

Aircraft:
TAD—air traffic control
TAK—airport facilities
TAQ—airline operations
TAR—search & rescue
TAS—flight service Space:
TSK—launch facilities (facilities)
TSM—satellites (mobile)
TSQ—launch operations (operations)

News Media:
END—news desk (dispatch)
ENM—remote sites (mobile)

The following list presents some examples of more complete channel codes for certain applications, including the geographic, function, owner and channel ID fields:

| | |
|---|---|
| Boston Fire Dispatch | USMA0401-FFD410-483162 |
| Boston Police Delta Ops | USMA0401-PXQ410-460500 |
| Somerville Fire Dispatch | USMA0104-FFD410-483162 |
| San Francisco Airport Tower | USCA-SFO-TAD601-120500 |
| Nevada Highway Patrol Vegas | USNV0100-PXD220-E08001 |
| San Diego PD - West Dispatch | USCA0301-PXD410-M01616 |

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A method of obtaining and reproducing audio content by client terminals that are coupled through the Internet to receive directory streams of directory packets from directory servers, wherein each directory packet includes a channel identity, a timestamp, and a network address of a discrete audio file stored on a network audio server, and wherein the discrete audio files are produced by audio source interfaces that are coupled to receive intermittent sequences of raw audio from the audio sources, and wherein the discrete audio files are isolated from the intermittent sequences according to a squelch status of the audio sources, and wherein the network audio servers generate corresponding directory packets for each stored discrete audio file that are communicated to the directory servers for serving to client terminals within the directory streams, the method comprising the steps of:

receiving a first series of directory packets in a first directory stream, thereby notifying a first client terminal that a first series of discrete audio files are available for download from a first series of discrete network addresses on a first network audio server;

identifying matching portions of the first series of directory packets by comparison with filter criteria;

requesting, from the first network audio server, a first series of discrete audio files according to a first series of network addresses within the matching portions of the first series of directory packets;

receiving the requested first series of discrete audio files from the network audio server, and reproducing, by the first client terminal, at least a first discrete audio file from said received first series of discrete audio files.

2. The method of claim 1, further comprising the steps of:

storing the first series of directory packets in a directory index of the first client terminal, and sequentially recalling the first series of directory packets from said directory index for said identifying matching portions step.

3. The method of claim 1, and wherein the channel identities comprise a first portion provided by the audio source and a second portion provided by the audio source interface.

4. The method of claim 1, and wherein the timestamps, the network addresses, and a portion of the channel identities are added to isolated discrete audio files by the audio source interface in producing the directory packets.

5. The method of claim 1, and wherein said identifying matching portions step further comprises the steps of:

comparing individual data fields within the first series of directory packets with the filter criteria, and identifying matching portions of the first series of directory packets when there is an exact match between the filter criteria and the individual data fields.

6. The method of claim 5, and wherein the filter criteria comprises wild card characters that are defined to match every individual data field, and further comprising the steps of:

identifying matching portions of the first series of directory packets when there is either an exact match between the filter criteria and the individual data fields or there is a wild card character for any given individual data field.

7. The method of claim 1, and wherein the channel identities comprise at least two codes selected from; a channel code, a geographic code, a function code, an owner code, a frequency code, a squelch control code, and a text tag code, and wherein:

said requesting matching portions of the first series of directory packets is based on an exact match with at least two of the channel identity codes and the filter criteria, and further comprising the step of;

reproducing, by the first client terminal, plural discrete audio files from said received first series of discrete audio files based on an exact match with at least two of the channel identity codes and the filter criteria.

8. The method of claim 7, and wherein the audio sources are radio receivers monitoring intermittent radio broadcasts from land mobile radio systems serving end users of radio communications, and wherein:

the channel code uniquely identifies an audio source;

the geographic code identifies a political jurisdiction of an end user radio of communications;

the function code identifies a particular service type of an end user of radio communications;

the owner code identifies the owner of an end user of radio communications;

the frequency code identifies the radio frequency of operation of a land mobile radio system that is serving an end user of radio communications;

the squelch control code identifies the squelch control code of a land mobile radio system that is serving an end user of radio communications, and the text tag code is a text field inserted by the audio source interface.

9. The method of claim 1, and wherein the timestamp further comprises a start time and a duration time for each of the discrete audio files that are isolated from the intermittent sequences of raw audio.

10. The method of claim 1, and wherein:

at least a first audio source is a scanning radio receiver monitoring plural land mobile radio broadcasting systems;

at least a first audio source interface is a Internet connected personal computer interfaced to receive a receiver audio signals from the scanning radio receiver, and at least a first intermittent sequence of raw audio is the receiver audio signal from the scanning radio receiver that is delineated by the squelch gate of the scanning radio receiver.

11. The method of claim 10, and wherein:

the scanning radio receiver squelch gate delineates the intermittent raw audio by carrier squelch, a digital squelch code, or a trunked radio system talk group code.

\* \* \* \* \*